(12) United States Patent
Yamamoto et al.

(10) Patent No.: US 9,003,631 B2
(45) Date of Patent: Apr. 14, 2015

(54) POWER GENERATION ASSEMBLIES AND APPARATUS

(76) Inventors: Shigeyuki Yamamoto, Medford, MA (US); Warren E. Colburn, Mystic, CT (US)

( * ) Notice: Subject to any disclaimer, the term of this patent is extended or adjusted under 35 U.S.C. 154(b) by 1148 days.

(21) Appl. No.: 12/777,233

(22) Filed: May 10, 2010

(65) Prior Publication Data
US 2010/0219645 A1    Sep. 2, 2010

Related U.S. Application Data

(63) Continuation-in-part of application No. 11/938,318, filed on Nov. 12, 2007, now Pat. No. 8,578,586, which is a continuation-in-part of application No. 10/904,040, filed on Oct. 20, 2004, now Pat. No. 7,293,960, which is a continuation-in-part of application No. PCT/US2008/083145, filed on Nov. 11, 2008.

(60) Provisional application No. 60/481,547, filed on Oct. 23, 2003, provisional application No. 61/313,706, filed on Mar. 13, 2010.

(51) Int. Cl.
| E02D 23/00 | (2006.01) |
|---|---|
| B23P 11/00 | (2006.01) |
| F03D 1/04 | (2006.01) |
| F03D 1/00 | (2006.01) |
| F03D 9/00 | (2006.01) |
| F03D 11/04 | (2006.01) |

(52) U.S. Cl.
CPC *F03D 1/04* (2013.01); *F03D 1/001* (2013.01); *F03D 9/008* (2013.01); *F03D 11/04* (2013.01); *F03D 11/045* (2013.01); *F05B 2240/40* (2013.01); *F05B 2240/93* (2013.01); *F05B 2240/95* (2013.01); *Y02E 10/725* (2013.01); *Y02E 10/727* (2013.01)

(58) Field of Classification Search
CPC ............ B63B 2035/446; B63B 35/003; F03D 35/003; F03D 1/005; F03D 11/045; E02B 17/04; E02B 17/06; E02B 17/08; F05B 2240/93
USPC .............. 29/525.01; 290/55; 405/224; 416/85
See application file for complete search history.

(56) References Cited

U.S. PATENT DOCUMENTS

| 4,683,832 A * | 8/1987 | Dysarz .......................... 114/258 |
| 7,075,189 B2 * | 7/2006 | Heronemus et al. ............ 290/44 |

(Continued)

FOREIGN PATENT DOCUMENTS

| DE | 10332382 A1 * | 2/2005 |
| GB | 2327970 A * | 2/1999 |

(Continued)

*Primary Examiner* — Jacob Cigna
(74) *Attorney, Agent, or Firm* — David J. Cole

(57) ABSTRACT

A floating power generation assembly has at least three floating units (3400) provided with power generation means (3402, 3404) and floating in a body of water. At least one of the three floating units (3400) is a tension leg platform. The assembly also comprises first anchors secured to a surface beneath the water, and first cables (3414, 3416) connecting the buoyant body (3400) to the first anchors. Second anchors are secured to the underwater surface and connected by second cables (3412) to the floating units (3400). The floating units (3400) are arranged substantially at the vertices of at least one triangle or quadrilateral.

9 Claims, 70 Drawing Sheets

(56) References Cited

U.S. PATENT DOCUMENTS

| | | | |
|---|---|---|---|
| 7,112,010 B1 * | 9/2006 | Geiger | 405/195.1 |
| 8,316,614 B2 * | 11/2012 | Soe-Jensen | 52/745.17 |
| 2004/0262926 A1 * | 12/2004 | Hansen | 290/44 |
| 2010/0140949 A1 * | 6/2010 | Pitre et al. | 290/55 |
| 2010/0143046 A1 * | 6/2010 | Olsen et al. | 405/209 |
| 2011/0058925 A1 * | 3/2011 | Springett et al. | 414/785 |

FOREIGN PATENT DOCUMENTS

| | | | |
|---|---|---|---|
| WO | WO 02052150 A1 * | 7/2002 | |
| WO | WO 2009068038 A9 * | 9/2009 | |

* cited by examiner

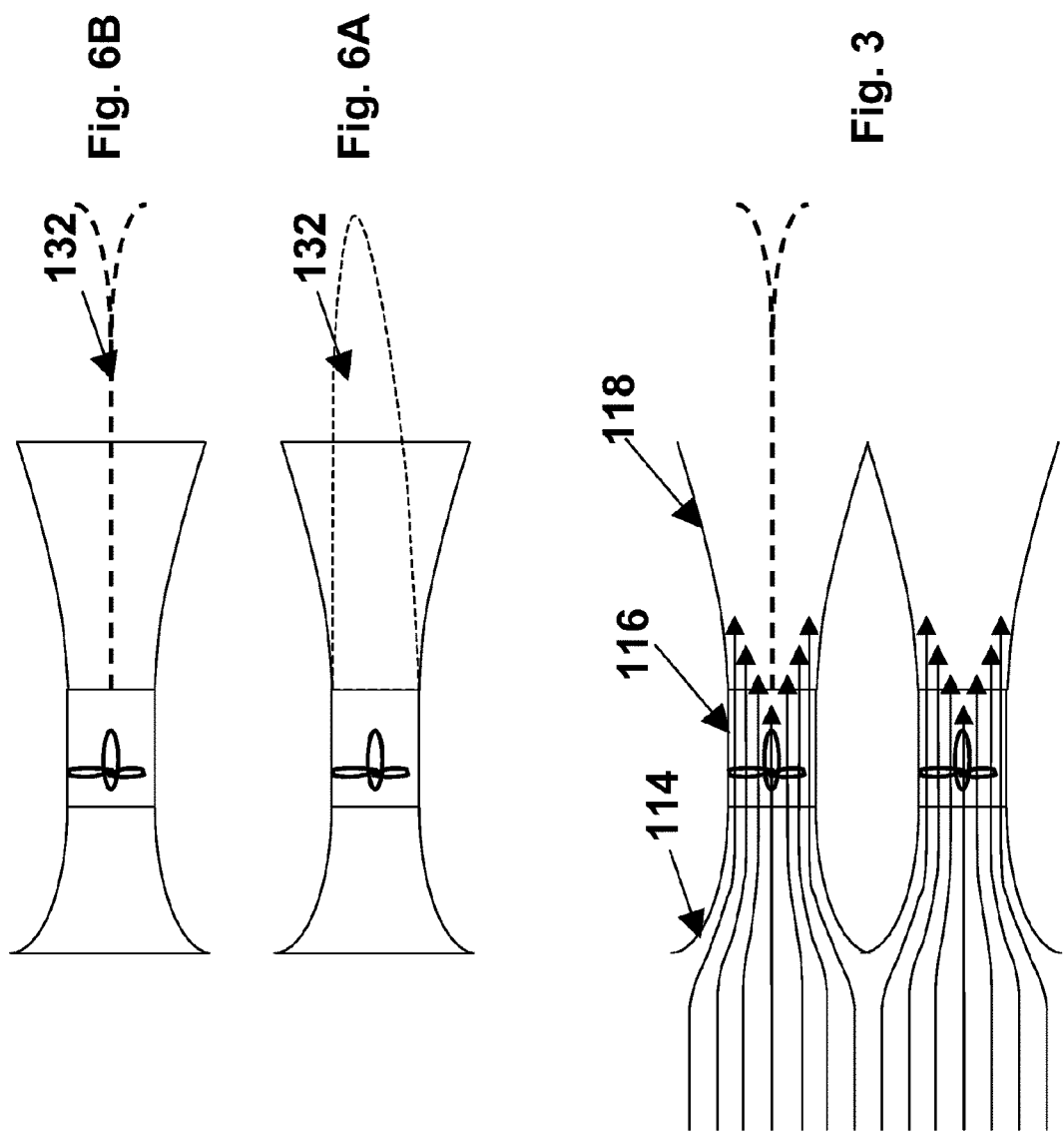

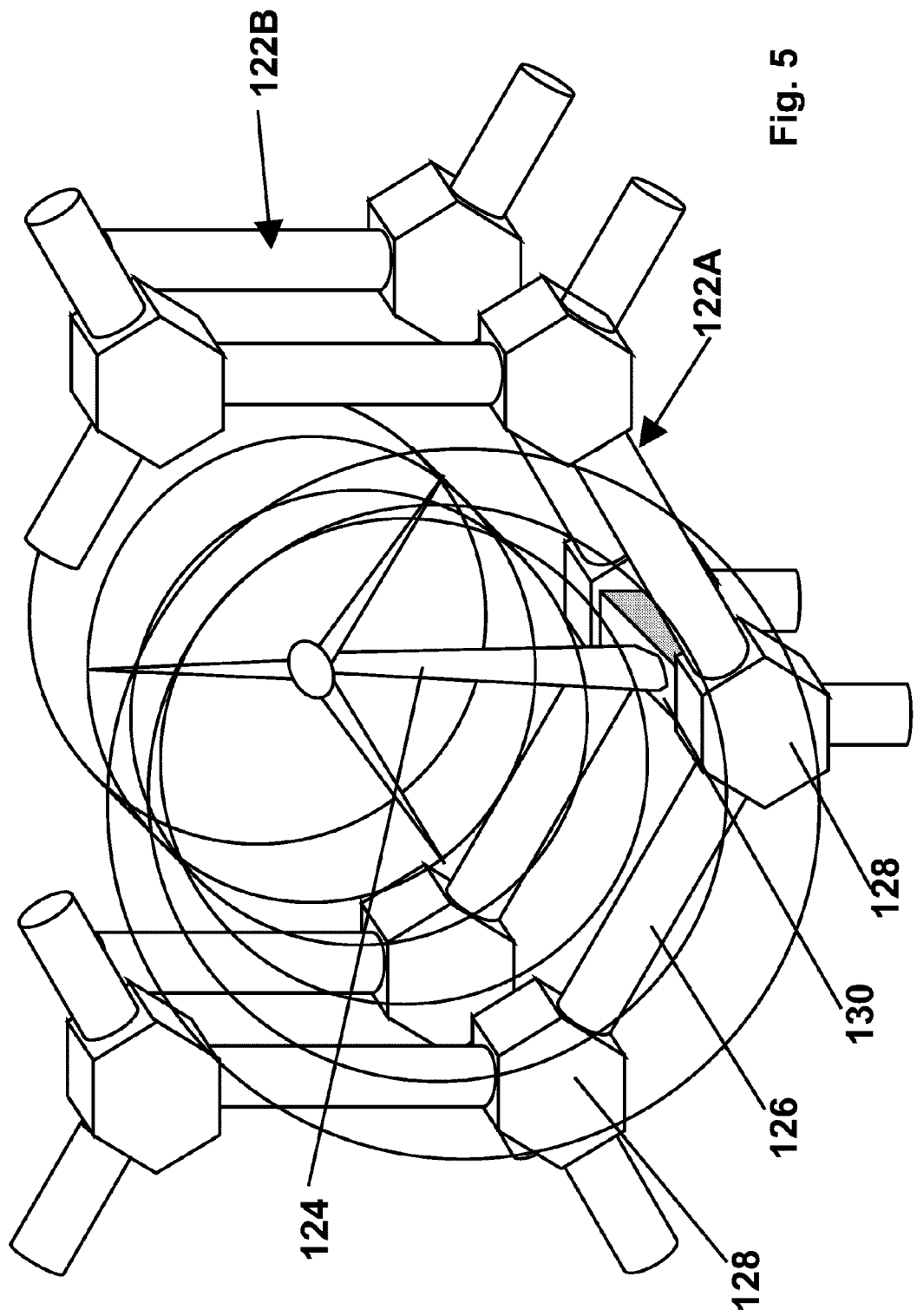

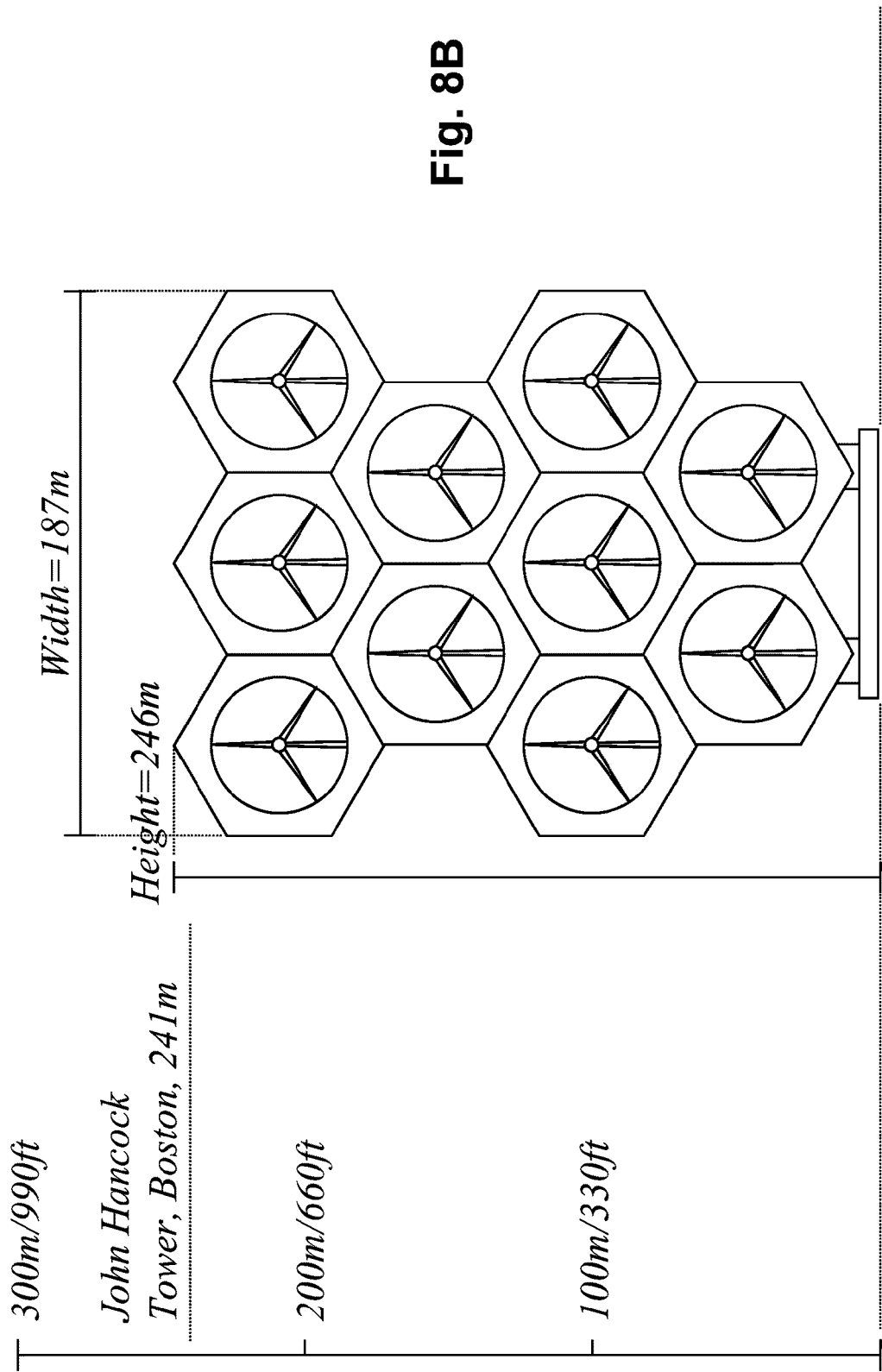

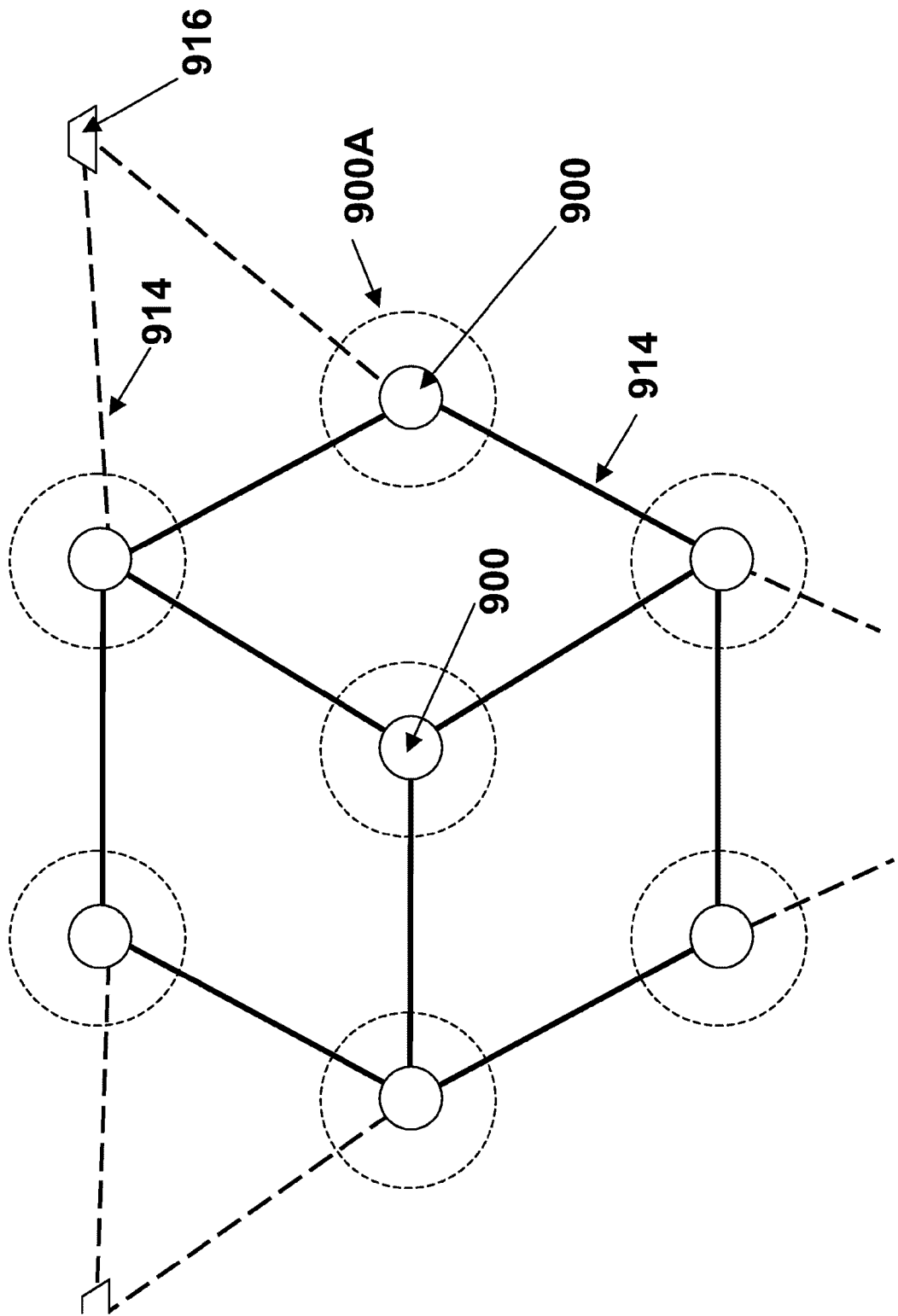

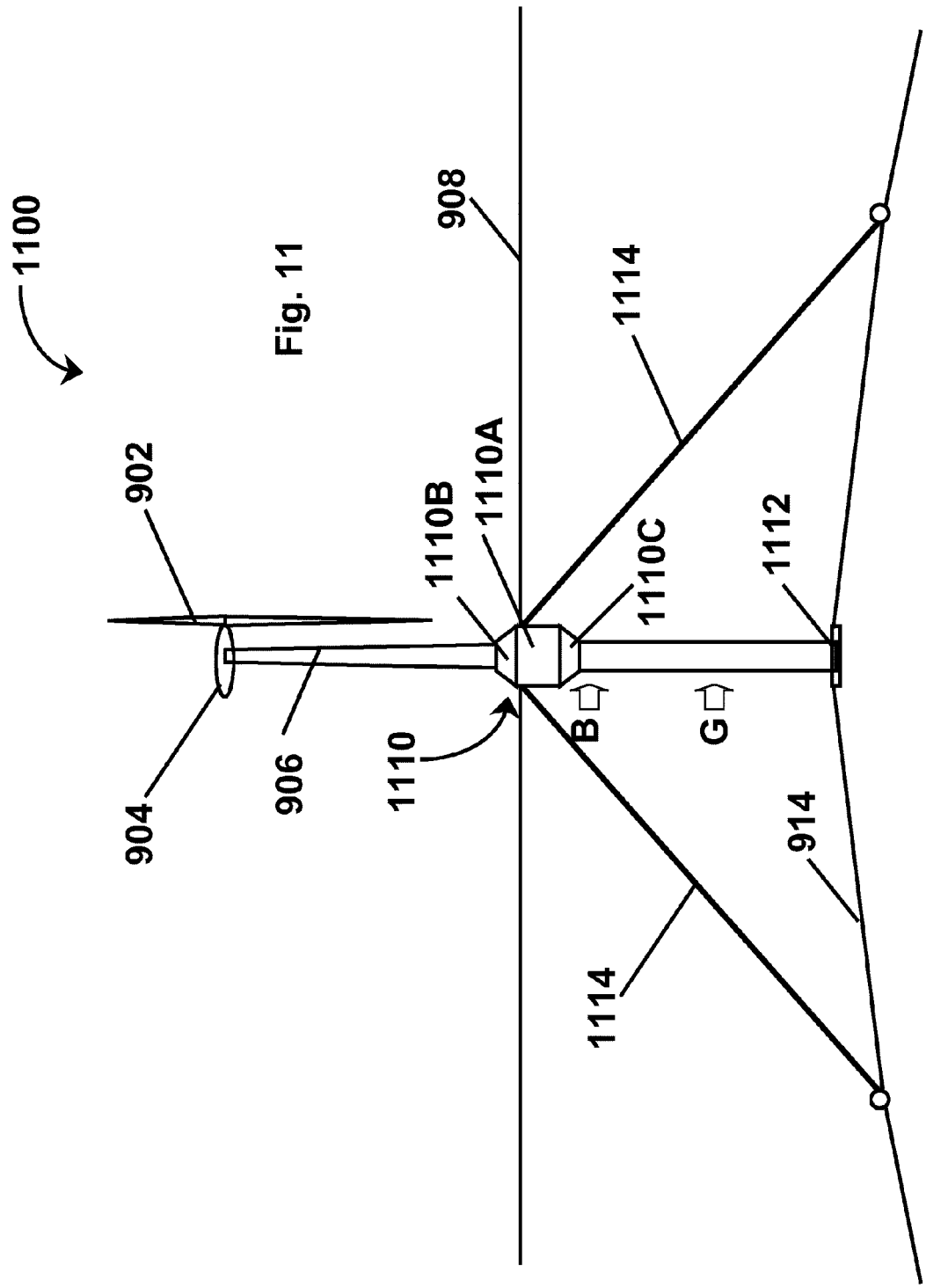

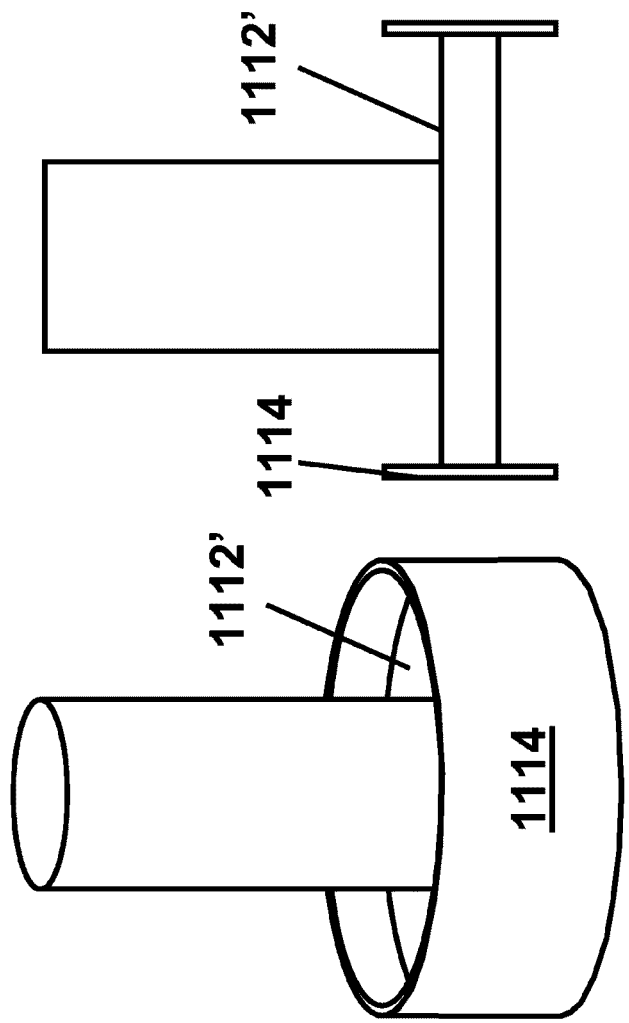
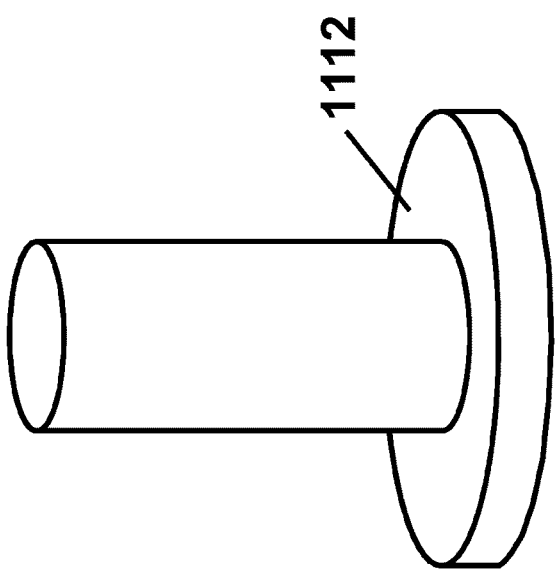
Fig. 12C   Fig. 12B   Fig. 12A

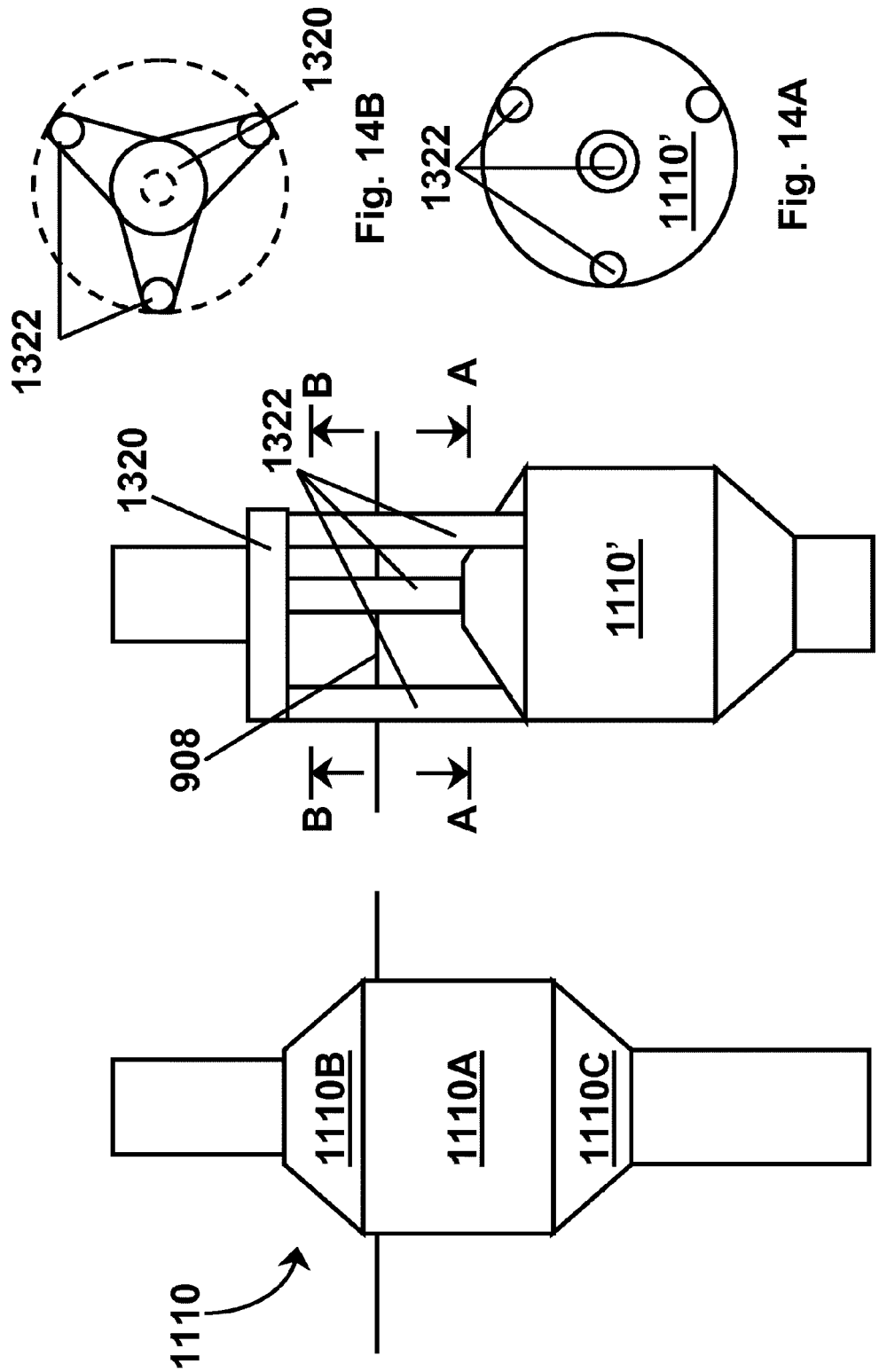

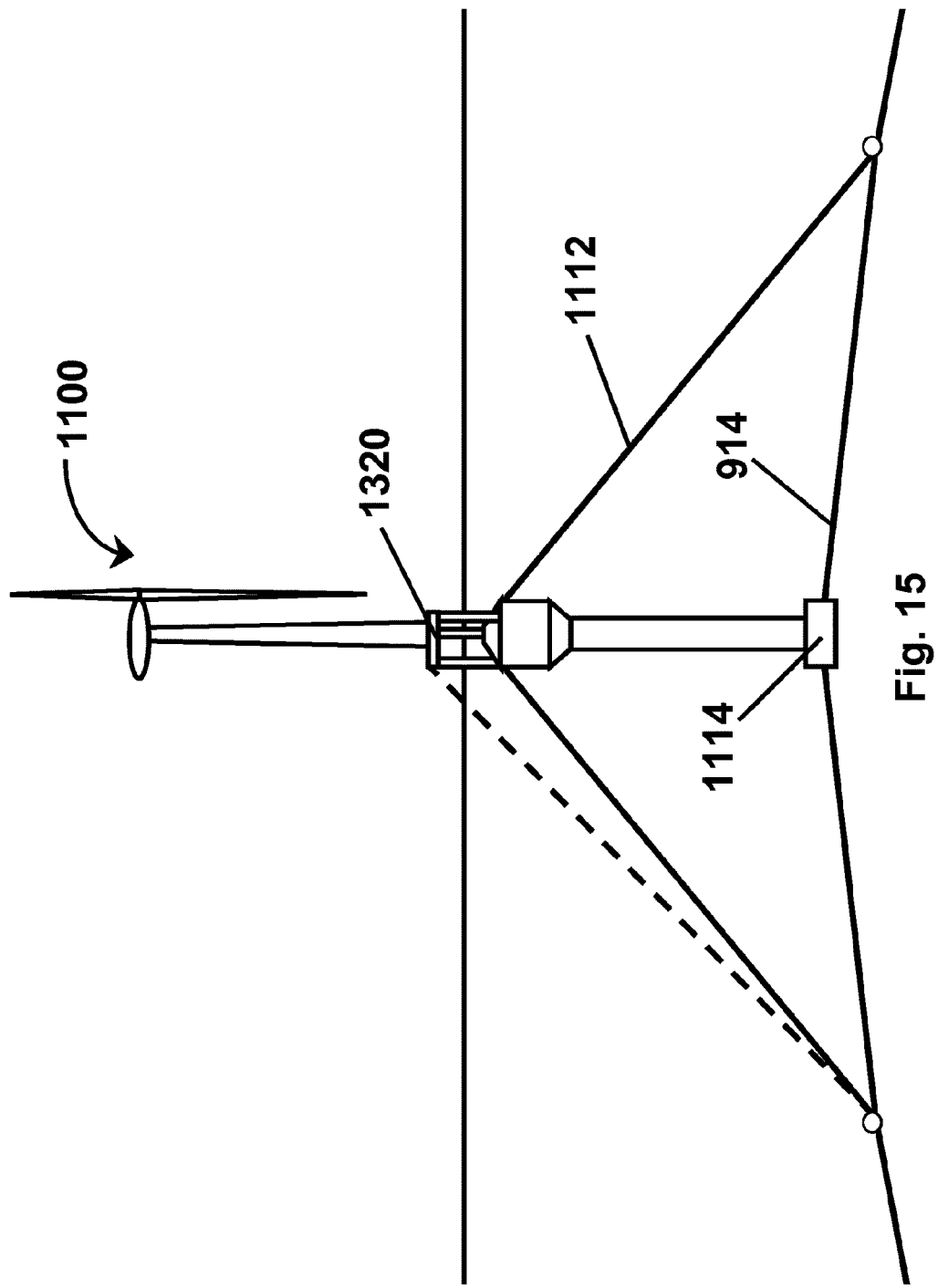

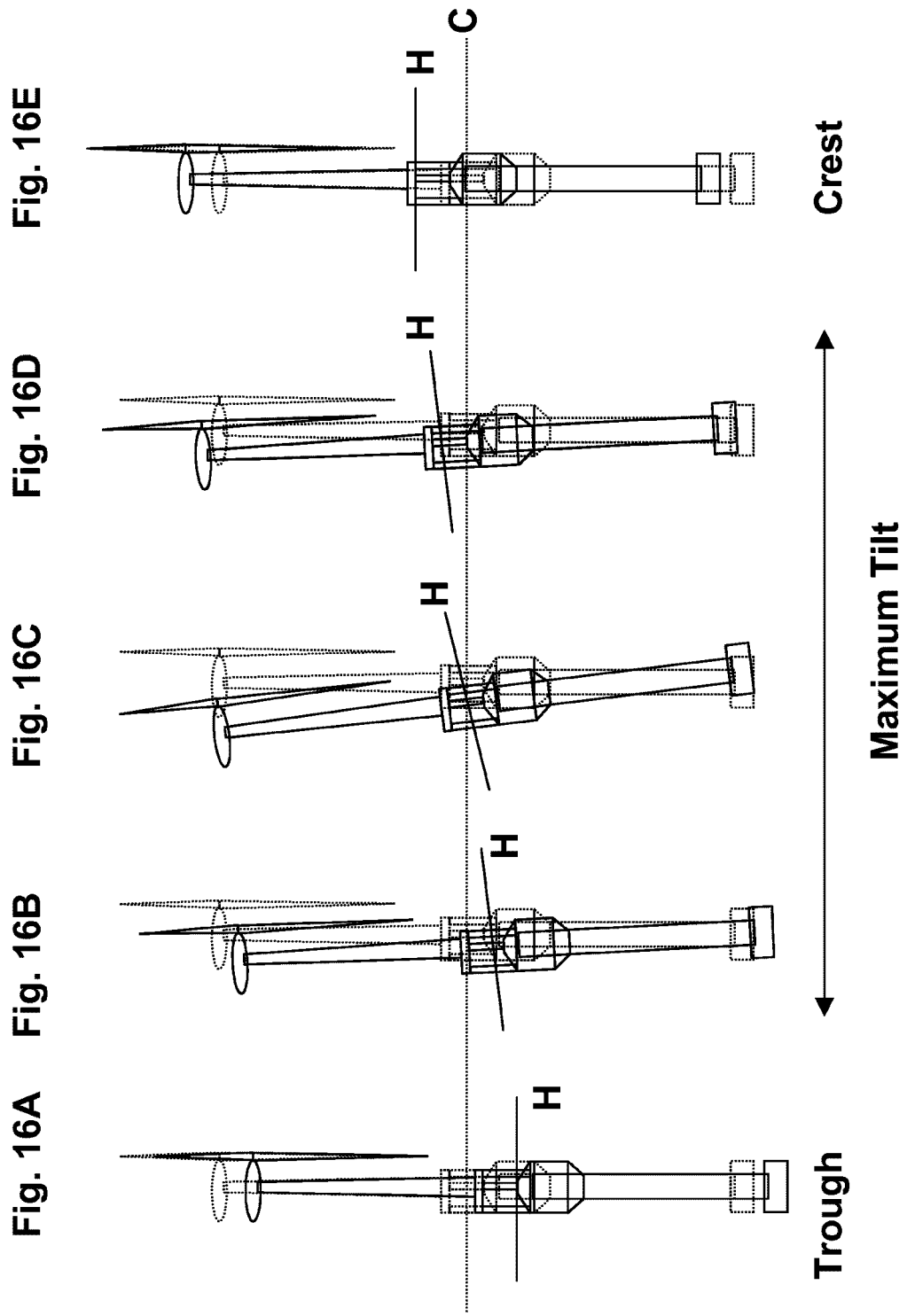

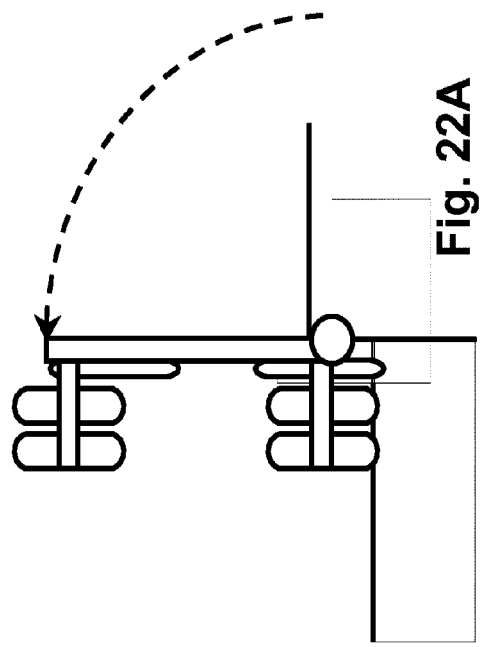
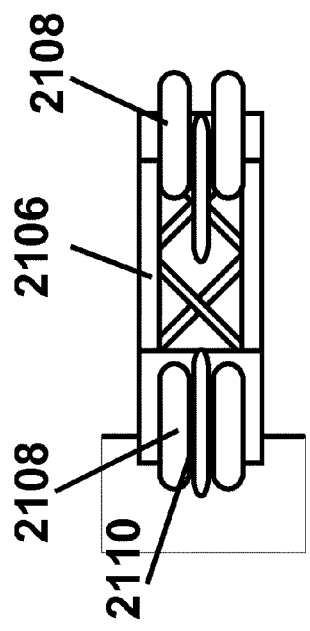
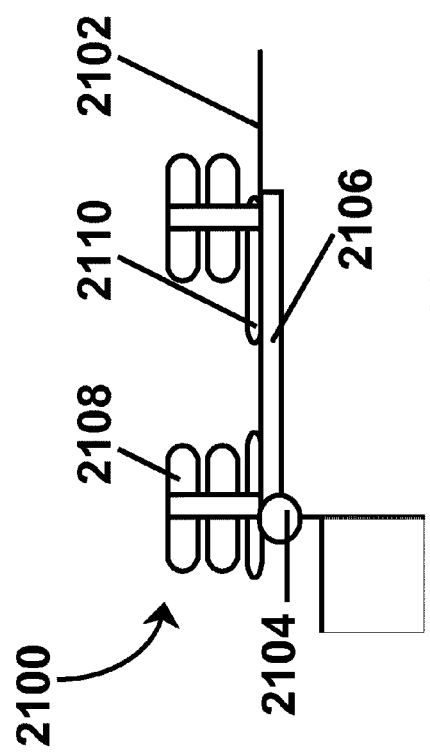

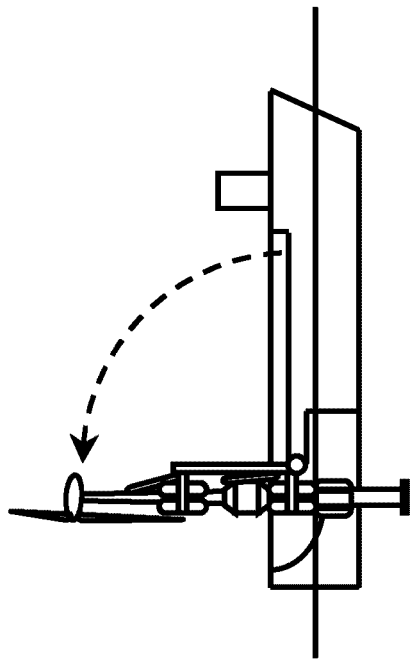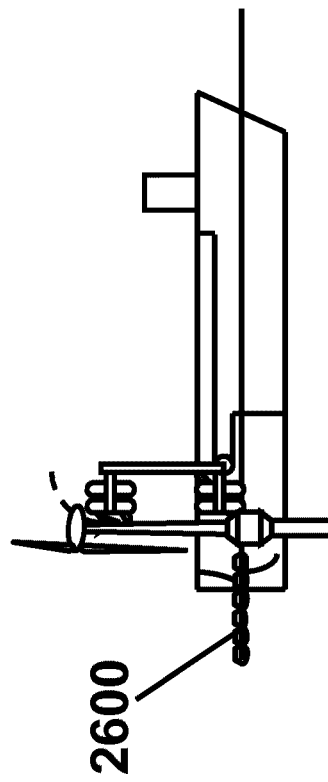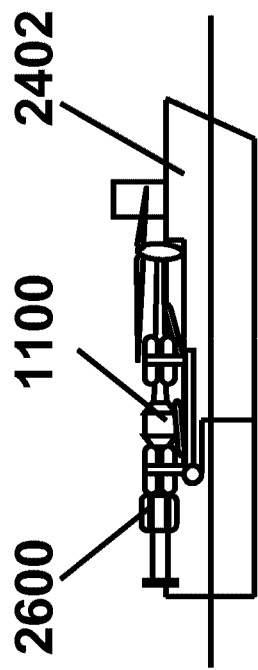
Fig. 26B
Fig. 26C
Fig. 26A

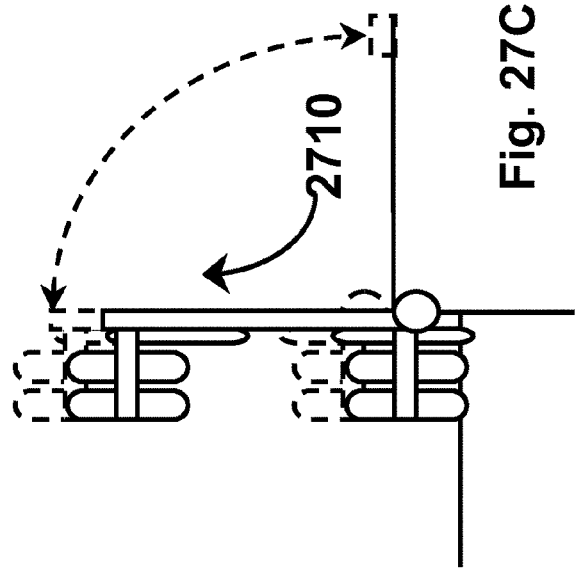
Fig. 27C
Fig. 27D
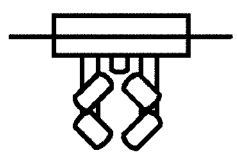
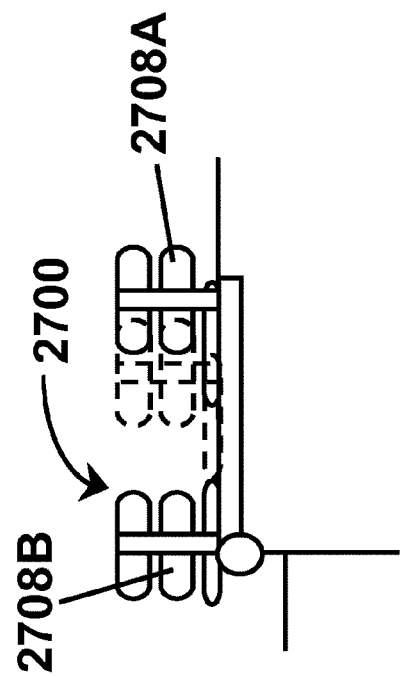
Fig. 27A
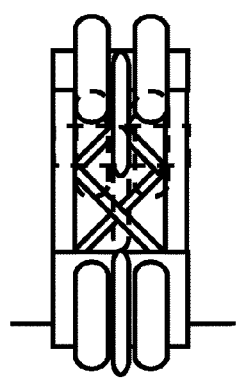
Fig. 27B

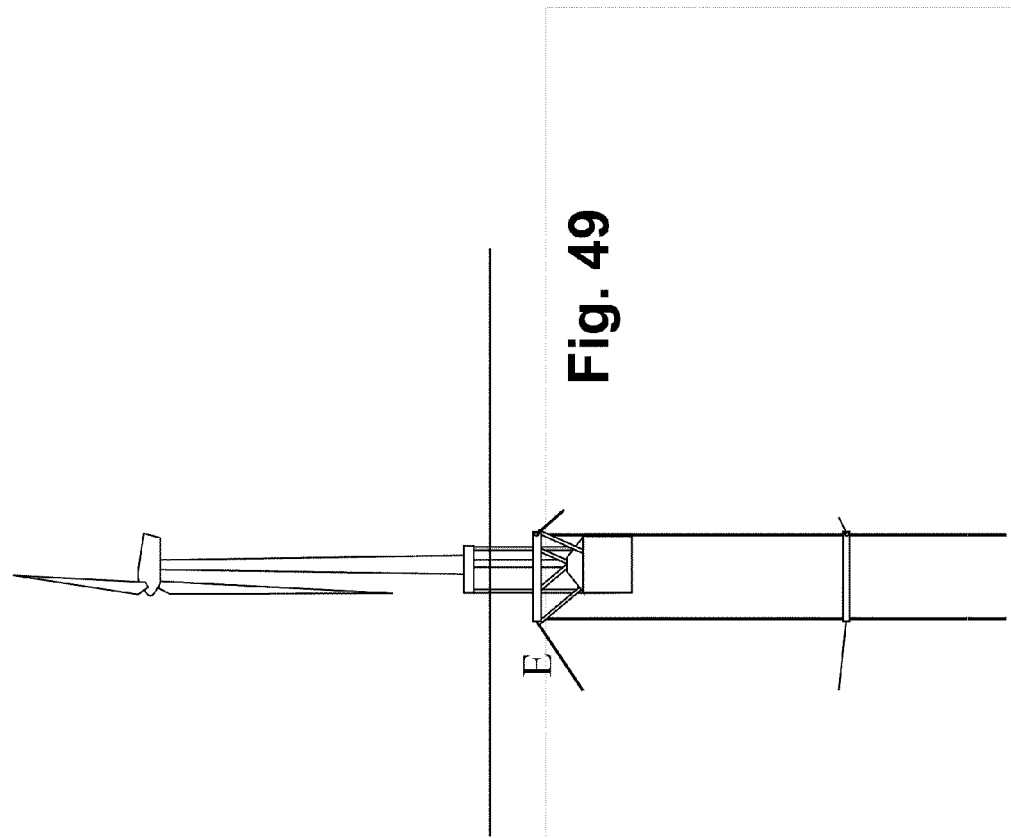
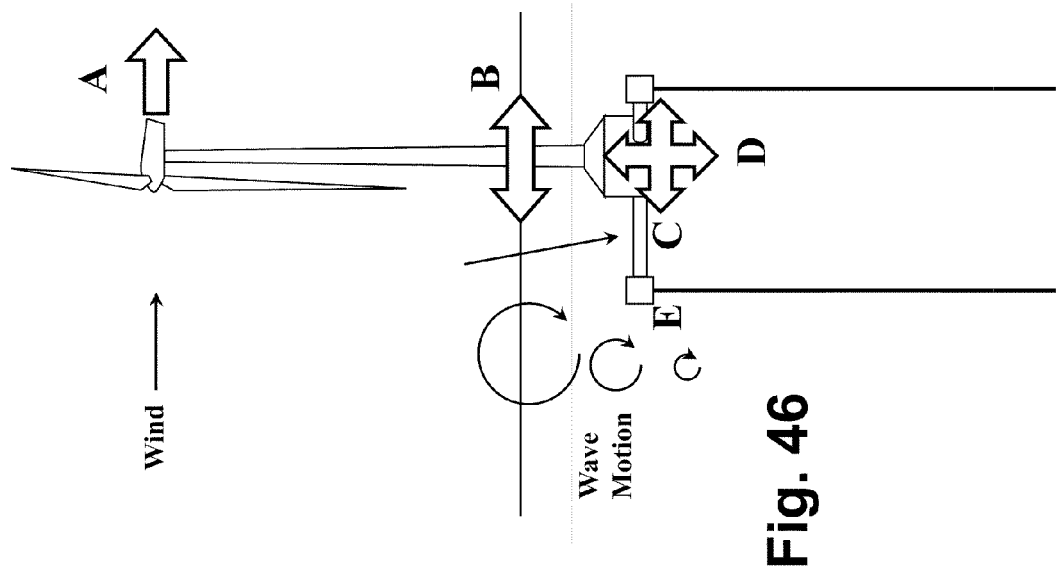

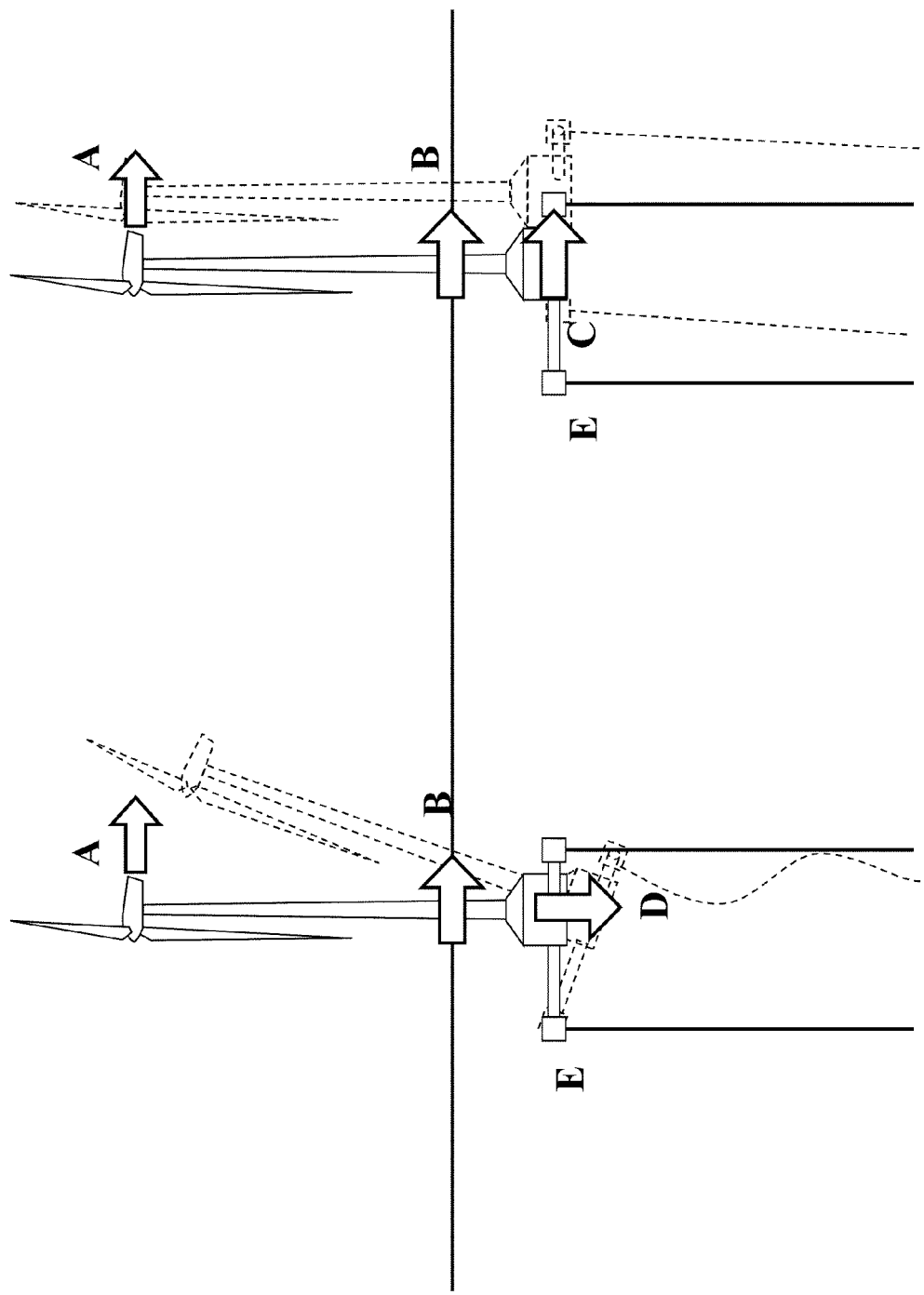

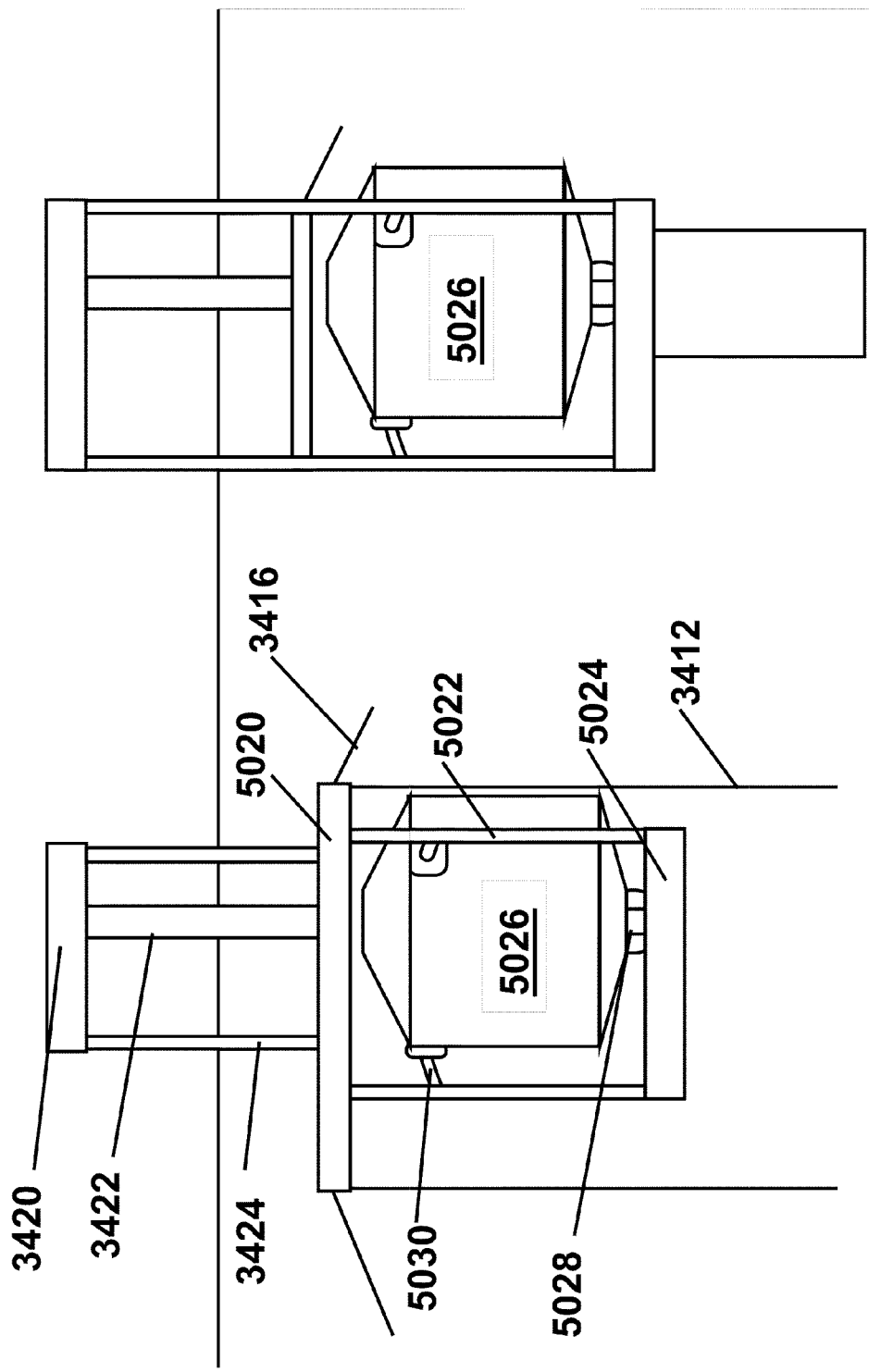

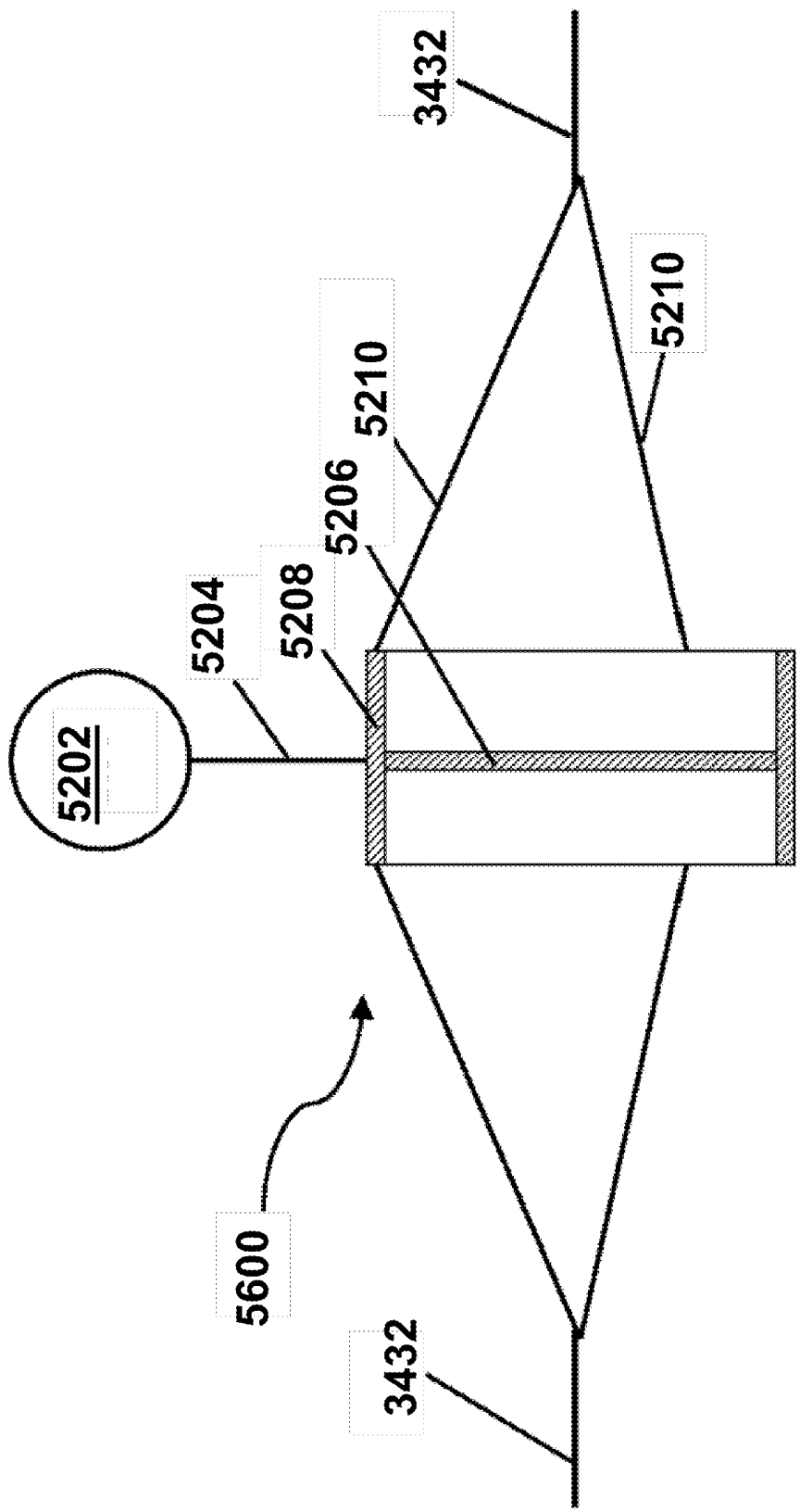

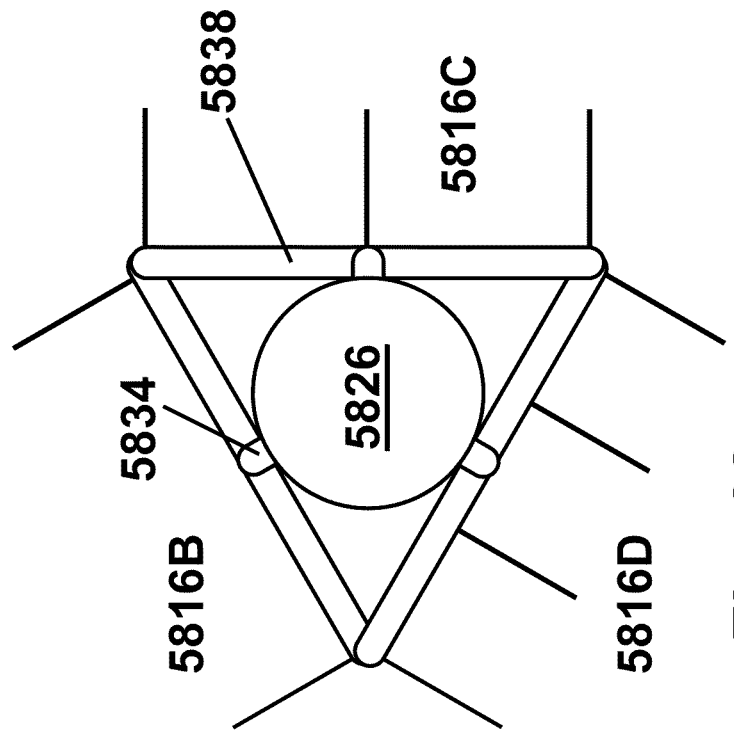
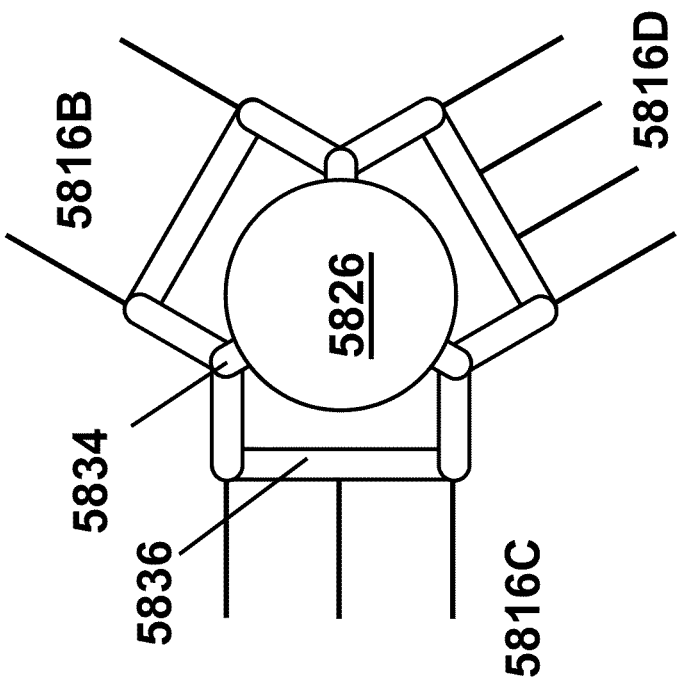

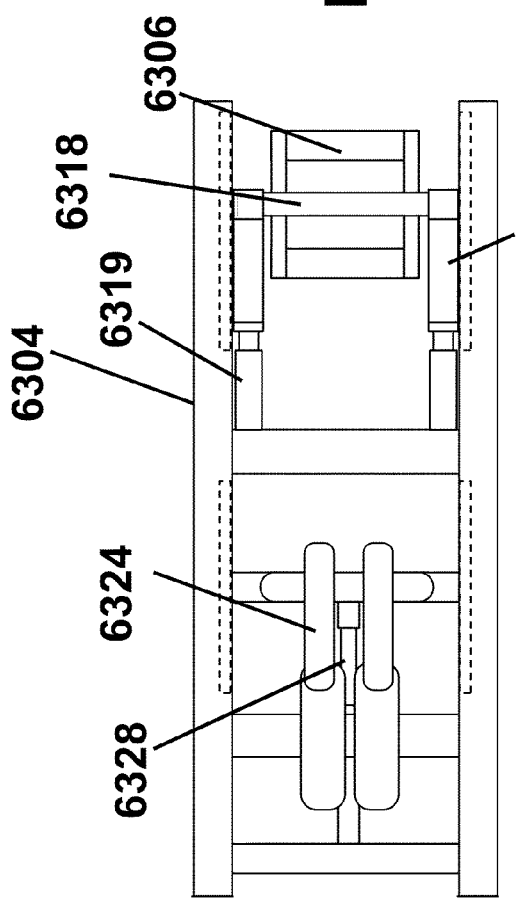
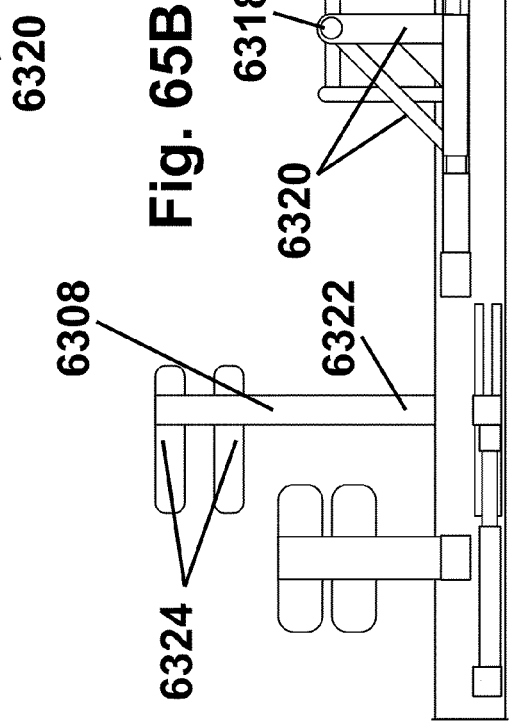
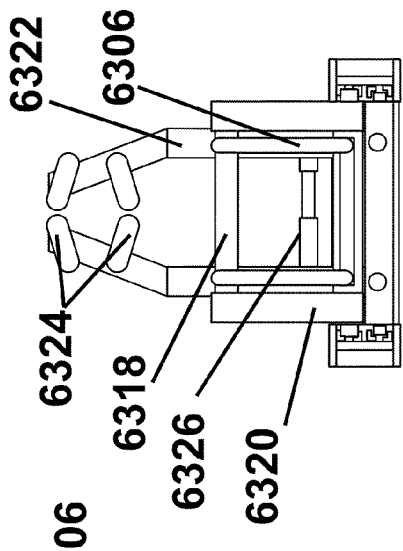
Fig. 65A
Fig. 65B
Fig. 65C

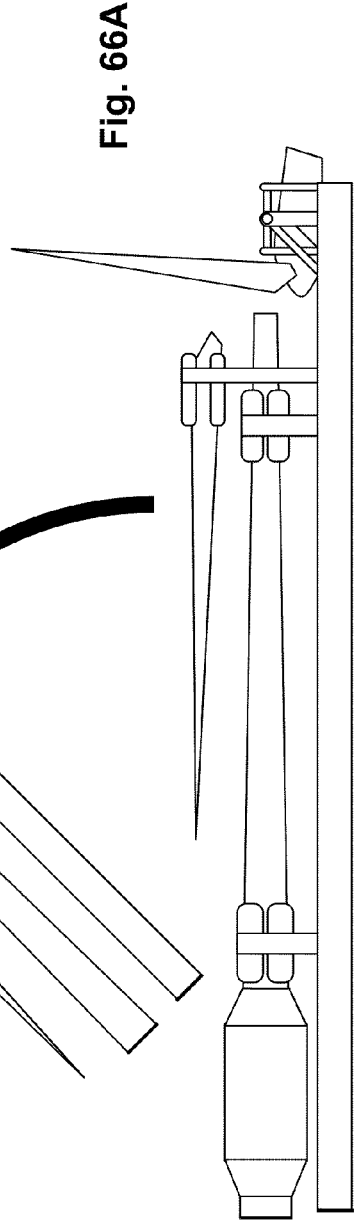
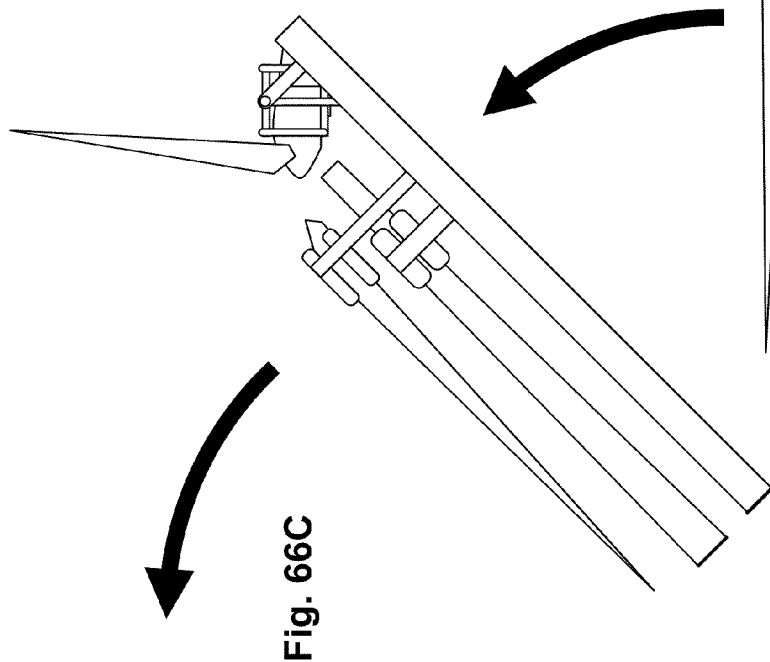
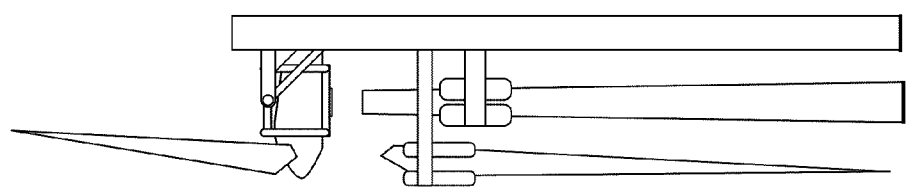
Fig. 66A
Fig. 66B
Fig. 66C

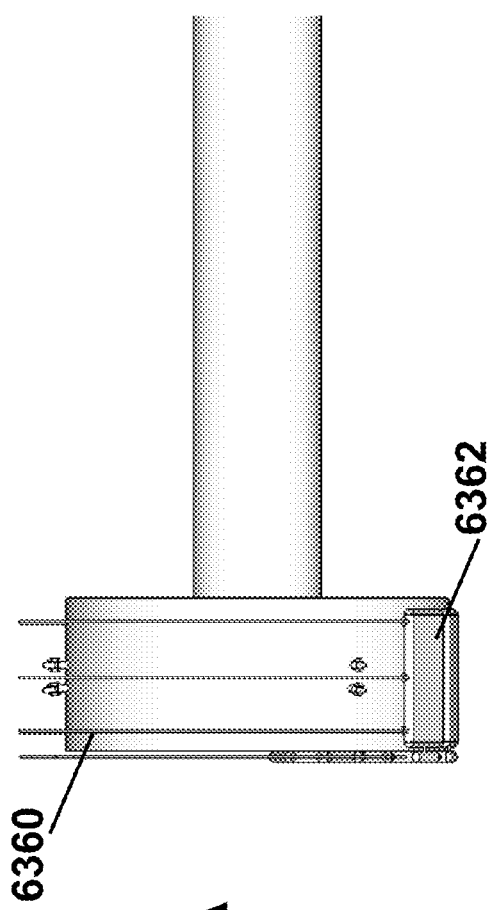
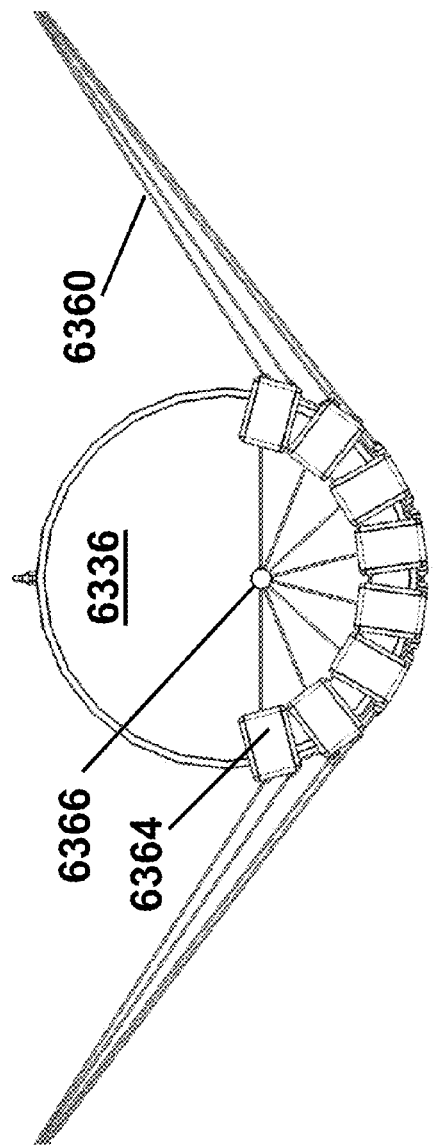
Fig. 69A
Fig. 69B

POWER GENERATION ASSEMBLIES AND APPARATUS

REFERENCE TO RELATED APPLICATIONS

This application is a continuation-in-part of application Ser. No. 11/938,318, filed Nov. 12, 2007 (now U.S. Pat. No. 8,578,586, issued Nov. 12, 2013), which is a continuation-in-part of application Ser. No. 10/904,040, filed Oct. 20, 2004 (Publication No. 2006/0171798, now U.S. Pat. No. 7,293,960), which itself claims benefit of provisional Application Ser. No. 60/481,547, filed Oct. 23, 2003. This application is also a continuation-in-part of International Application No. PCT/US2008/083145 (Publication No. WO 2009/064737), which claims benefit of the aforementioned application Ser. No. 11/938,138 and of provisional Application Ser. No. 61/106,571, filed Oct. 18, 2008. This application also claims benefit of provisional Application Ser. No. 61/313,706, filed Mar. 10, 2010. The entire contents of all the aforementioned applications are herein incorporated by reference.

BACKGROUND OF INVENTION

This invention relates to power generation assemblies, and apparatus for use therewith. More specifically, this invention relates to (a) a floating power generation assembly; (b) a process for placing a floating unit on water, this process being especially, although not exclusively, intended for use in deploying certain components of the floating power generation assembly of the invention; and (c) a multiple wind turbine assembly.

As concern over the environmental consequences of conventional power plants, including their carbon dioxide emissions, has increased in recent years, greater attention has been focused upon so-called "green" or environmentally advantageous power plants which use renewable sources of energy and do not cause substantial emissions of carbon dioxide or other pollutants. Potential green power plants include photovoltaic plants, which generate energy from sunlight, and plants which derive energy from tides, ocean currents and wave action.

One type of green power plant which has already been shown to be commercially viable is the wind turbine or windmill. So-called "wind farms" having multiple wind turbines have been constructed in several parts of the world and have made significant contributions to electricity production. In 2002, total wind farm capacity in the European Union was about 23,000 MW, and in the United States about 5,000 MW.

Unfortunately, although wind farms are environmentally advantageous in the sense of not emitting pollutants, they can create opposition due to their visual impact. To be economically viable, wind farms need to be situated where high average wind velocities are expected. On land, such sites are often on mountain ridges or on flat plains, and in either location conventional wind farms, using individual rotors 30 meters or more in diameter mounted on masts about 30 meters high, are conspicuous for miles. Furthermore, such mountain ridges or plains are often in areas celebrated for their natural beauty and such wind farm projects can face stiff opposition, resulting in higher project costs.

Accordingly, interest has recently shifted to off-shore wind farms. The first such off-shore wind farms have been established in shallow water (typically 15 meters or less deep) close to shore, and the equipment used has been essentially the same as in land-based wind farms, with the masts supporting the rotors mounted on the seabed and lengthened as necessary to keep the rotors at the desired height above the water. However, such shallow water wind farms have attracted the same types of controversy as land-based wind farms. For example, a recent proposal to place a large wind farm of more than 100 units in Nantucket Sound off the coast of Massachusetts has led to objections that the wind farm will have too much visual impact on ocean views. It has also been alleged that the rotors may kill or injure substantial numbers of birds.

Public controversy relating to wind farms would be reduced by moving off-shore wind farms a greater distance off-shore, although the maximum distance off-shore where wind farms can be located is limited by the expense of the undersea high voltage cables required to bring the electricity generated on-shore; such cables can incur very significant costs. Moreover, the choice of suitable off-shore locations for wind farms, even relatively close to shore, is limited by water depth. If wind farms are required to operate in deeper waters, say 100-200 meters, as the water depth increases, it becomes increasingly impracticable, from both engineering and economic view points, to continue with seabed mounted masts bearing single large rotors. Clearly at some point, it becomes necessary to base the wind farm upon one or more floating or tension leg platforms. However, to justify the high costs of deeper water wind farms, such farms will typically be required to have high power outputs, and the conventional type of single mast/single rotor wind turbine with very large rotors may not be well adapted for mounting upon a floating or tension leg platform. In one aspect, this invention seeks to provide a novel type of wind turbine assembly. The wind turbine assembly of the present invention may be useful in off-shore wind farms or other contexts, for example some land-based wind farms.

The present invention also relates to improvements in off-shore power generation assemblies, especially wind farms, to enable such assemblies to be sited in deep water without mounting a rigid structure on the sea bed or other underwater solid surface. Finally, this invention relates to a process for placing floating units on water, this process being especially intended for use in the deployment of the off-shore power generation assemblies of the present invention.

The power generation assemblies or wind farms described in the aforementioned application Ser. No. 11/938,138 use vertically-free-floating ("VFF") units, that is to say buoyant units which float freely without any tension leg connecting them to the sea bottom; the cables used in the wind farms are used to provide horizontal tension support from multiple directions, thus making the VFF unit more stable against horizontal forces. The cables also ensure that the VFF units do not drift away from the predetermined locations, and maintain correct position relative to each other. While such VFF units can produce good results, the need to ensure that the center of gravity of each floating unit is a substantial distance below the water surface and that each unit has a substantial metacentric height (the distance between its centers of gravity and metacenter) of several meters, coupled with the need to mount a relatively heavy wind turbine and generator high above the water surface, means that in practice the VFF units must be heavy, typically of the order of several hundred to a couple of thousand tonnes. Such heavy VFF units require large quantities of construction materials and hence are costly to produce, especially in view of the recent substantial increases in the costs of construction materials such as concrete and steel due to increased energy costs.

It is known that wind turbines and other devices which it is desired to use at sea can be mounted on a tension leg platform (TLP). A tension leg platform comprises a buoyant body connected to at least one, and typically three or more, cables or similar connecting devices which are anchored to the sea bed. The cables are kept under substantial tension, and the buoyant body is effectively tethered to the seabed.

TLP's can be made more stable than VFF units of the same height, but, as discussed in more detail below with reference to FIGS. 46 to 48, they can undergo catastrophic tipping under large horizontal forces than VFF units, and this susceptibility to horizontal forces poses problems with mounting apparatus which requires locating units of substantial weight, such as rotors and generators, on TLP's at substantial distances above the water surface, since the mounting of substantial weight high above the water surface exacerbates the tendency of TLP units to suffer catastrophic tipping.

It has now been found that if some or all of the VFF units in the wind farms described in the aforementioned applications are replaced by TLP's substantial advantages accrue; the TLP's can be lighter and less expensive than similar VFF units, while the interconnections between the floating units provided by the anchors and cables of the wind farm itself (as opposed to anchors and cables associated with any individual TLP) reduce the sensitivity of the TLP's to tipping and horizontal forces and hence render the TLP's a more stable mounting for rotors and generators used for power generation.

SUMMARY OF THE INVENTION

In one aspect, this invention provides a floating power generation assembly having as components at least three floating units floating on a body of water, and at least three anchors secured to a solid surface beneath the body of water, each of the floating units being provided with power generation means, each of the anchors being connected by cables to at least one of the floating units, and each of the floating units being connected by cables to at least two other components, the floating units being arranged substantially at the vertices of at least one triangle.

This aspect of the present invention may hereinafter be referred to as the "anchored floating assembly" of the invention. In such an anchored floating assembly, each power generation means may comprises at least one of a wind turbine and a means for extracting power from waves or marine currents. The three anchors may be arranged substantially at the vertices of a triangle with the floating units arranged within, or along the sides of, this equilateral triangle. In one form of the anchored floating assembly, intended for use where rough weather and/or strong currents may cause problems, each of the floating units is connected by cables to at least three other components of the assembly. The anchored floating assembly may comprise at least six floating units arranged substantially at the vertices of a hexagon, typically with a seventh floating unit disposed at the center of the hexagon.

In a preferred form of the anchored floating assembly, at least one of the floating units comprises:

a mast extending from above to below the water surface;
a wind turbine comprising a plurality of blades and rotatably mounted at or adjacent the upper end of the mast such that the blades do not contact the water as they rotate;
a buoyancy section provided on the mast adjacent the water surface and arranged to provide buoyancy to the assembly; and
a base section provided on the mast below the water surface and having the cables attached thereto, the base section being weighted such that the center of gravity of the floating unit is substantially below the water surface.

Desirably, in such an anchored floating assembly, the center of gravity of the floating unit is at least about 30 meters below the water surface. and the floating unit desirably has a metacentric height (the distance between its centers of gravity and buoyancy) of at least about 10 meters. Also, the anchored floating assembly may further comprise at least two auxiliary cables extending from the buoyancy section to the cables connecting the base section to other components of the assembly, or to other components of the assembly (including other floating units). The base section of the mast may be provided with a peripheral hoop arranged to increase the hydrodynamic mass of the floating unit and to lengthen the natural heave period thereof. The mast may have a portion of reduced cross-section at the water surface, and the portion of the mast lying below the water surface may be provided with at least one ballast tank.

This invention also provides a modified form of the floating power generation assembly defined above, this modified form being adapted (as described in detail below) to cope with a location having a wind which is predominantly in one direction. The modified assembly has as components at least three floating units floating on a body of water, and at least three anchors secured to a solid surface beneath the body of water, each of the floating units being provided with power generation means, each of the anchors being connected by cables to at least one of the floating units, and each of the floating units being connected by cables to at least two other components (including other floating units), the floating units being arranged substantially at the vertices of at least one triangle formed by elongating an equilateral triangle along one axis while leaving the triangle unchanged along the other axis.

In another aspect, this invention provides a process for placing a floating unit in water, the floating unit comprising a mast which, when floating, extends from above to below the water surface, the process comprising:

providing a vessel having a deck and a pivotable unit rotatably mounted on the deck for rotation about a horizontal axis adjacent an edge of the deck, the pivotable unit comprising a base member and two clamping members mounted on the base member and spaced apart from the each other;
clamping the mast with the clamping members, thereby holding the mast in a substantially horizontal position above the deck;
transporting the vessel and mast to a location where the floating unit is to be deployed;
pivoting the pivotable unit and mast until the mast is in a substantially vertical position; and
releasing the mast from the clamping members, thereby allowing the floating unit to float.

In this "deployment process" of the present invention, the mast may comprise at least one ballast tank and the process may further comprise at least partially filling the ballast tank with water after pivoting the mast to a substantially vertical position but before releasing the mast from the clamping members. The deployment process may further comprise placing an external floatation device on the mast while the mast is in its substantially horizontal position above the deck, and releasing the external floatation device from the mast after the floating unit is floating. Also, at least one of the clamping members may be movable relative to the base member, thereby allowing the spacing between the clamping members to be varied. Finally, the vessel may be provided with means for varying the position of the axis of rotation of the pivotable unit relative to the deck.

This invention also provides a wind turbine assembly comprising a plurality of cells, each cell having substantially the form of a hexagonal prism with a horizontal axis, each cell having a turbine mounted for rotation about an axis substantially coincident with the axis of the cell, the cells being disposed adjacent each other with their axes substantially parallel, each cell having a wall defining a passage through the cell, the turbine of the cell being located with this passage, the cross-section of the passage varying from a substantially hexagonal inlet to a substantially circular portion of minimum cross-sectional area adjacent the turbine, such that wind entering the inlet is accelerated before passing the turbine.

In such a "cellular wind turbine assembly", the diameter of the substantially circular portion of minimum cross-sectional area adjacent the turbine is desirably not greater than about 95 percent, preferably not greater than 80 percent, of the diameter of the circumcircle of the substantially hexagonal inlet. The cellular wind turbine assembly may further comprise a base member on which the cells are rotatably mounted and control means for maintaining the cells pointed into the wind being experienced. The cellular wind turbine assembly may also comprise an outer casing enclosing all the cells.

Finally, this invention provides a process for assembling a floating power generation assembly having as components at least three floating units floating on a body of water, and at least three anchors secured to a solid surface beneath the body of water, each of the floating units being provided with power generation means, each of the anchors being connected by cables to at least one of the floating units, and each of the floating units being connected by cables to at least two other components, the process comprising:

placing the anchors in the desired positions, with each anchor having attached thereto a cable, means for varying the length of the cable, at least one temporary connector capable of interconnecting at least two cables, and floatation means capable of keeping the end of the cable remote from the anchor at the water surface;
  interconnecting the cables by means of the temporary connectors to provide the connections between cables required in the final assembly;
  replacing the temporary connectors with the floating units; and
  reducing the length of at least one cable to produce the final assembly.

This invention also provides a floating power generation assembly having as components at least three floating units provided with power generation means and floating in a body of water, the assembly being characterized in that at least one of the three floating units is a tension leg platform comprising a buoyant body, the assembly also comprising at least one first anchor secured to a solid surface beneath the body of water, and at least one first cable maintained under tension and connecting the buoyant body to the first anchor, the floating power generation assembly further comprising at least three second anchors secured to the solid surface beneath the body of water, each of the second anchors being connected by second cables to at least one of the floating units, and each of the floating units being connected by cables to at least two other components, the floating units being arranged substantially at the vertices of at least one triangle or quadrilateral.

This aspect of the present invention may hereinafter be referred to as the "TLP assembly" of the invention. Also, for convenience the first anchors and first cables associated with the TLP's may be referred to as the "TLP anchors" and "TLP cables", while the second anchors and second cables which serve to restrain the entire assembly in position may referred to as the "assembly anchors" and "assembly cables". In such a TLP assembly, the floating units may all be TLP's, or some of the floating units may be TLP's and others VFF units. Each power generation means may comprise at least one of a wind turbine and a means for extracting power from waves or marine currents. The three assembly anchors may be arranged substantially at the vertices of a triangle with the floating units arranged within, or along the sides of, this equilateral triangle. In one form of the anchored floating assembly, intended for use where rough weather and/or strong currents may cause problems, each of the floating units is connected by assembly cables to at least three other components of the assembly. The TLP assembly may comprise at least six floating units arranged substantially at the vertices of a hexagon, typically with a seventh floating unit disposed at the center of the hexagon.

When VFF units are present in a TLP assembly, desirably at least one of the VFF units comprises:

a mast extending from above to below the water surface;
  a wind turbine comprising a plurality of blades and rotatably mounted at or adjacent the upper end of the mast such that the blades do not contact the water as they rotate;
  a buoyancy section provided on the mast adjacent the water surface and arranged to provide buoyancy to the assembly; and
  a base section provided on the mast below the water surface and having the cables attached thereto, the base section being weighted such that the center of gravity of the floating unit is substantially below the water surface.

Desirably, in such an assembly, the center of gravity of the VFF unit is at least about 30 meters below the water surface, and the VFF unit desirably has a metacentric height (the distance between its centers of gravity and metacenter) of at least about 10 meters. Also, the TLP assembly may further comprise at least two auxiliary assembly cables extending from the buoyancy section to the cables connecting the base section to other components of the assembly, or to other components of the assembly (including other floating units). The base section of the mast may be provided with a peripheral hoop arranged to increase the hydrodynamic mass of the floating unit and to lengthen the natural heave period thereof. The mast may have a portion of reduced cross-section at the water surface, and the portion of the mast lying below the water surface may be provided with at least one ballast tank.

The TLP assemblies of the present invention may be deployed by methods exactly analogous to those used for VFF-only assemblies, subject of course to the need to deploy the TLP anchors and cables.

This invention also provides a floating power generation assembly having as components at least three floating units floating on a body of water, and at least three anchors secured to a solid surface beneath the body of water, each of the floating units being provided with power generation means, each of the anchors being connected by cables to at least one of the floating units, and each of the floating units being connected by cables to at least two other components, the assembly being characterized in that the floating units are arranged substantially at the vertices of at least one quadrilateral.

In such a "quadrilateral" power generation assembly, each power generation means may comprise at least one of a wind turbine and a means for extracting power from waves and/or currents. Also, each of the floating units may be connected by cables to at least two other components of the assembly. At least one of the floating units may comprises: a mast extending from above to below the water surface; a wind turbine comprising a plurality of blades and rotatably mounted at or adjacent the upper end of the mast such that the blades do not contact the water as they rotate; a buoyancy section provided on the mast adjacent the water surface and arranged to provide buoyancy to the assembly; and a base section provided on the mast below the water surface and having the cables attached thereto, the base section being weighted such that the center of gravity of the floating unit is substantially below the water surface. In such a mast-containing floating unit, the center of gravity of the floating unit may be at least about 30 meters below the water surface, and the assembly may further comprise at least two auxiliary cables extending from the buoyancy section to the cables connecting the base section to other components of the assembly, or to other components of the assembly. The assembly may have at least four floating units disposed at the vertices of a rectangle or square. At least one base section may be provided with a peripheral hoop arranged to increase the hydrodynamic mass of the floating unit and to lengthen the natural heave period thereof.

The present invention also provides:
(a) a simplified form of TLP unit for use in wind farms;
(b) a modified form of cable interconnection between adjacent units of the wind farm using multiple parallel cables; and
(c) an improved apparatus and method for deployment of the VFF and TLP units.

BRIEF DESCRIPTION OF DRAWINGS

FIG. 3 is a schematic horizontal section through two cells of the cellular wind turbine assembly shown in FIGS. 1 and 2, showing the air flow through these cells.

FIG. 5 is an enlarged schematic three quarter view, from in front and to one side, of one cell of the cellular wind turbine assembly and support structure shown in FIG. 4.

FIG. 6A is a schematic top plan view of one cell of the cellular wind turbine assembly shown in FIGS. 1 and 2 modified with a means for keeping the assembly facing into the prevailing wind.

FIG. 6B is a schematic side elevation of the cell shown in FIG. 6A.

FIGS. 7, 8A and 8B are schematic front elevations, generally similar to that of FIG. 4, of three further cellular wind turbine assemblies of the present invention, together with their support structures.

FIG. 10A is a schematic top plan view of a floating power generation assembly comprising seven wind turbines of the form shown in FIG. 9 and three anchors.

FIG. 11 is a schematic side elevation, generally similar to that of FIG. 9 showing a modified version of the wind turbine of FIG. 9 provided with auxiliary cables.

FIG. 12A is an enlarged three quarter view of the base section of the wind turbine of FIG. 11.

FIG. 12B is an enlarged three quarter view, generally similar to that of FIG. 12A, of a modified base section which can be substituted for that shown in FIG. 12A.

FIG. 12C is a section, in a vertical plane including the axis, of the modified base section shown in FIG. 12B.

FIG. 13A is an enlarged side elevation of the buoyancy section of the wind turbine shown in FIG. 11.

FIG. 13B is a side elevation, generally similar to that of FIG. 13A, of a modified buoyancy section which can be substituted for that shown in FIG. 13A.

FIGS. 14A and 14B are horizontal sections in the planes indicated by arrows A and B respectively in FIG. 13B.

FIG. 15 is a schematic side elevation, similar to that of FIG. 11, of a modified wind turbine including the modified buoyancy section of FIG. 13B, FIG. 15 showing alternative locations for attachment of auxiliary cables.

FIGS. 16A to 16E are schematic side elevations, similar to that of FIG. 15, showing how the wind turbine of FIG. 15 reacts to wave motion.

FIG. 21A is a schematic side elevation of a preferred apparatus for carrying out the deployment process of the present invention, the apparatus being mounted on the deck of a ship.

FIG. 21B is a schematic top plan view of the apparatus shown in FIG. 21A.

FIG. 22A is a schematic side elevation, similar to that of FIG. 21A, showing the apparatus pivoted to a vertical position.

FIGS. 26A to 26C are schematic side elevations, similar to those of FIGS. 25A to 25D, showing a modified placement process using an external floatation device on the wind turbine.

FIGS. 27A to 27G show various modified forms of the apparatus shown in FIGS. 21 to 23.

FIGS. 46-48 illustrate schematically the forces acting upon a TLP unit and the failure modes thereof.

FIG. 49 is a schematic side elevation of a preferred TLP unit for use in the assemblies of the present invention and illustrates the manner in which this unit reduces forces tending to cause failure of the unit.

FIG. 50 is a schematic side elevation of a modified TLP unit in which the floatation chamber can move relative to other components of the unit.

FIG. 51 is a schematic side elevation of part of a VFF unit in which the floatation chamber can move relative to other components of the unit.

FIG. 56 shows a side elevation (partly in section) of a modified form of the cable stabilizer unit shown in FIGS. 52 and 53.

FIGS. 58-62 illustrate multiple cable connections which may be used in TLP assemblies of the present invention.

FIG. 65A is a top plan view of the portion of the deployment apparatus shown in FIGS. 63 and 64 carrying a nacelle holder and a blade holder.

FIG. 65B is a side elevation of the same portion of the deployment apparatus as shown in FIG. 65A, looking from below in that Figure.

FIG. 65C is an end elevation looking from the right in FIG. 65B.

FIGS. 66A-66F show various stages in the raising of parts of the deployment apparatus shown in FIGS. 63-65 to a vertical position.

FIGS. 69A to 69C are views similar to FIGS. 68A to 68C but showing a weighted base in a second modified form of the deployment apparatus shown in FIGS. 67A and 67B.

DETAILED DESCRIPTION

As already indicated, the present invention has three main aspects, namely a floating power generation assembly, a deployment process, and a cellular wind turbine assembly. These three aspects of the invention will mainly be described separately below, but it will be appreciated that a single assembly or process may make use of multiple aspects of the invention. For example, a floating power generation assembly may include cellular wind turbine assemblies of the invention, and the floating units of the floating power generation assembly may, and indeed are primarily intended to be, placed on site by the deployment process of the invention.

Figure 2:
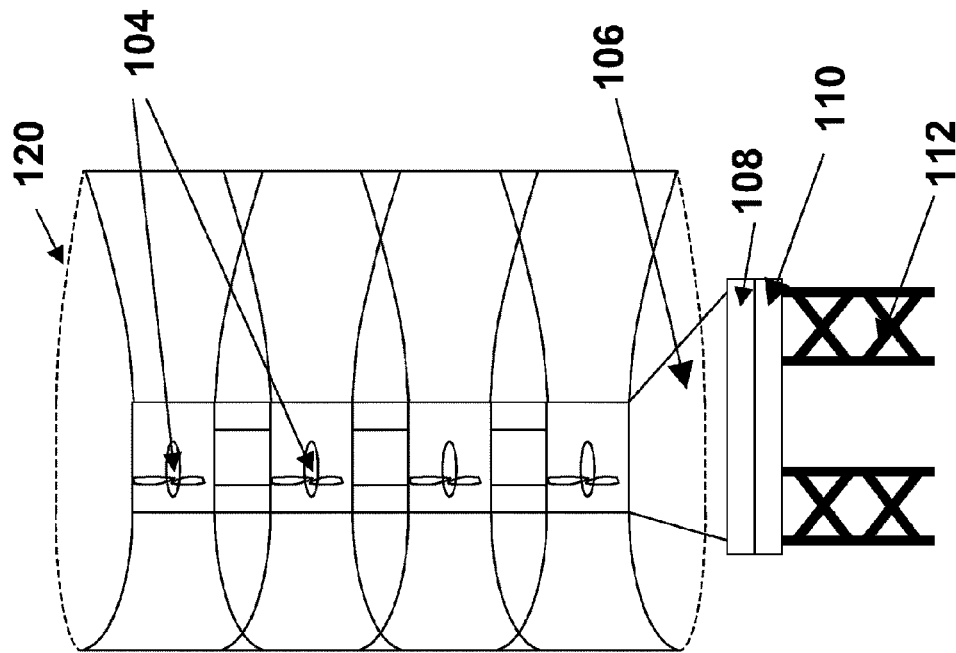
FIG. 2 is a schematic side elevation of the cellular wind turbine assembly shown in FIG. 1.
Figure 1:
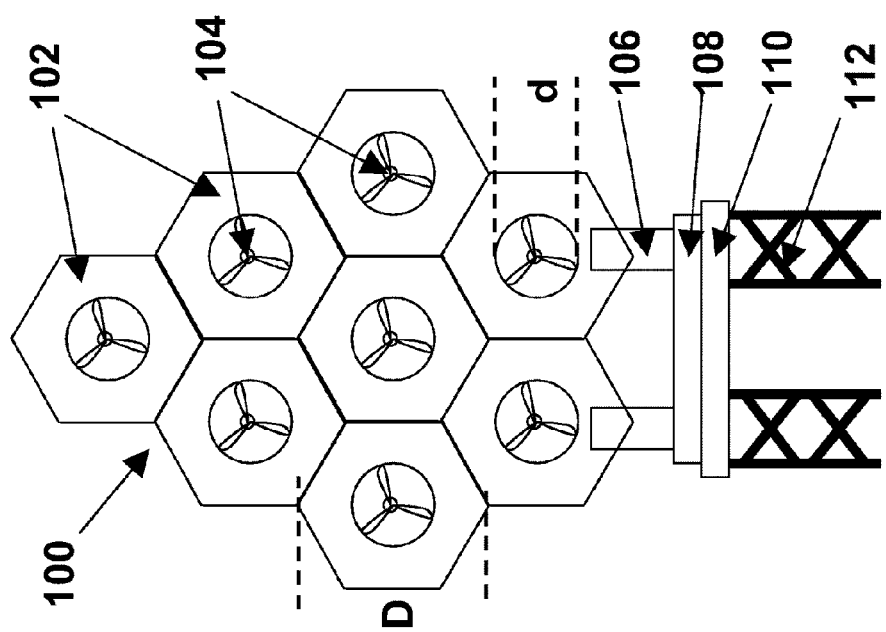
FIG. 1 of the accompanying drawings is a schematic front elevation (looking from the inlets of the cells) of a cellular wind turbine assembly of the present invention.

One form of the wind turbine assembly of the present invention, which might be used in a land-based wind farm, will now be described in detail with reference to FIGS. 1 to 3 of the accompanying drawings, in which FIG. 1 is a schematic front elevation of the preferred wind turbine assembly (generally designated 100), FIG. 2 is a schematic side elevation of the assembly 100 and FIG. 3 is a schematic section taken in a horizontal plane through two adjacent units of the assembly 100 and showing the air flow through these units.

As shown in FIGS. 1 and 2, the wind turbine assembly 100 comprises a plurality of individual unit or cells 102, each of which contains a single turbine 104 mounted for rotation about a horizontal axis. The cells 102 have the form of hexagonal prisms with horizontal axes. The wind turbine assembly 100 further comprises support pillars 106 mounted upon a yaw control (rotatable) base 108, which is in turn supported upon a fixed base 110 supported by support members 112, which can be of any convenient type and are indicated in only the most schematic manner in FIGS. 1 and 2. The yaw control base 108 permits the wind turbine assembly 100 to rotate so as the face the wind being experienced.

The size of the cells 102 and the turbines 104 can vary widely; the turbines 104 may be of substantially the same size as those used in conventional single mast/single rotor units (with a rotor say 30 to 47 meters in diameter) or they may be substantially smaller. For example, the diameter d of each turbine 104 might be about 8 meters, while the height D of each cell 102 (i.e., the diameter of the circumcircle of the hexagonal front elevation of the cell 102) might be about 10 meters.

Each cell 102 comprises an airfoil member best seen in FIG. 3. The airfoil member could be made, for example, from carbon-fiber reinforced polymer, in the case of smaller cells, or aluminum or stainless steel in the case of larger cells. The airfoil member has an intake section 114, a cylindrical section 116 within which the turbine 104 of the cell 102 is located, and an outlet section 118. The intake section 114 may have a complex, substantially frustopyramidal/frustoconical form which transitions from a hexagonal intake (as seen in FIG. 1) to a circular cross-section adjacent the cylindrical section 116. (The diameter of the cylindrical section 116 is of course essentially the same as that of the turbine 104, since to maximize power output from the turbine, there should be minimal clearance between the tips of the turbine blades and the inner surface of the cylindrical section 116.) Alternatively, the intake section may have a form which is essentially of circular cross-section throughout, making a smooth transition from the circular cross-section adjacent the cylindrical section 116 to the circumcircle of the hexagonal intake, but with the circular cross-sections truncated by the sides of a hexagonal prism extending perpendicular to the edges of the hexagonal intake. Such a "truncated conical" intake section will have forward edges which are concave as viewed from the same position as FIG. 1. In another alternative construction, the airfoil member could have an internal form which provides one continuous curve extending throughout the full length of the airfoil member, so that there would not be discrete intake, cylindrical and outlet sections. The intake section 114 serves an as air intake for the turbine 104, collecting moving air provided by wind impinging upon the assembly 100 and accelerating the velocity of this moving air before it reaches the turbine 104, thus providing the turbine 104 with an effective wind speed higher than that of the prevailing wind and increasing the output from the turbine 104 above the output which would be achieved simply by exposing the turbine 104 to the prevailing wind. The taper of the intake section 114 and the resultant acceleration of the moving air entering this intake section enable the turbines 104 to make use of all the wind impinging upon the front face of the assembly 100 even though the combined area of the circles traversed by the blades of the turbines 104 is only about one-half of the area of the front face of the assembly 100. (The ratio between the area of the circles traversed by the blades and the area of the front face of the assembly 100 can vary considerably; see the discussion of the ratio d/D below.) The exact form of the inner surface of each intake section 114 resembles the upper surface of an airplane wing, and is aerodynamically designed to maximize the wind velocity experienced by the associated turbine 104 and minimize drag on the air passing through the cell 102.

The wind speed experienced by each turbine 104 depends upon the ratio d/D, where d and D are as already defined. The ratio d/D can be varied depending upon economic considerations and site conditions, including the maximum wind velocities which the assembly 100 may need to withstand. Increasing d/D reduces drag within the intake section 114 and thus enables the use of a lighter support structure (as described below), while lowering d/D increases the wind speed experienced by the turbine 104 and thus enables the same power output to be obtained from smaller, lighter turbines running more efficiently. Thus, in at least some cases, it may be desirable to vary the d/D ratio within a single assembly, the cells 102 near the base of the assembly having a low d/D ratio and the cells 102 near the top of the assembly having a higher d/D ratio. Typically d/D will not be greater than about 0.95. Preferably, d/D will not be greater than about 0.8.

The acceleration of wind velocity provided by the intake section 114 is important in increasing the power provided by the turbines 114. For example, consider a hexagonal cell of the type shown in FIG. 1 with a d/D ratio of 0.65. The area of the hexagonal intake will be $0.6495D^2$, while the area of the circular section in which the turbine rotates will be $0.7854d^2$, which is equal to $0.33 D^2$. The ratio of these two areas is 1.96, and thus (ignoring frictional and viscous losses) this will be the maximum factor by which the wind velocity can be accelerated. A reasonable estimate of losses would suggest an acceleration factor of about 1.72, and since the power available from a turbine is proportional to the cube of the wind velocity an acceleration factor of 1.72 would achieve a five-fold increase in power output. For example, there is a commercially available turbine with a 47 meter diameter rotor rated at 660 kW. Placing a slightly modified version of this commercially available turbine in an airfoil in accordance with the present invention and with an acceleration factor of 1.72 would boost the output of a single turbine to 3.3 MW, so that an assembly of only ten of such turbines could produce 33 MW, as illustrated in FIG. 8B discussed below.

The provision of the outlet section 118 of the airfoil member is optional, and in some cases it may be convenient to omit this section and simply allow air passing through the turbines 104 to pass unhindered out of the rear (downwind) surface of the assembly 100 thus avoiding the cost of the providing the outlet sections 118 and the increased weight of the assembly caused by these outlet sections. However, omitting the outlet sections 118 means that air leaving the turbines 104 does so over only a small fraction of the area of the rear surface of the assembly 100, which may lead to significant turbulence adjacent this rear surface, and varying stresses upon adjacent parts of the assembly 100. Hence, it is generally desirable to provide each cell with an outlet section 118, in a form generally similar to the inlet section 114, namely a substantially frustoconical form linking the circular outlet end of the cylindrical section 116 to a hexagonal outlet on the rear surface of the assembly 100. The inner surface of the outlet section 118 should be aerodynamically designed to minimize drag.

As indicated in a highly schematic manner in FIG. 2, an outer casing or shell 120 may be provided to cover the outer surfaces of the assembly 100 and to prevent turbulence caused by wind passing over the external surfaces of the airfoils of the cells 102 which lie adjacent these external surfaces. Although the provision of the shell 120 is optional, and the shell may be omitted to reduce the overall cost and weight of the assembly 100, provision of the shell 120 is generally desirable to avoid turbulence around the edges of the assembly 120, and consequent stresses and drag upon parts of the assembly, especially when it is installed in a location which may be subjected to high winds.

Figure 4:
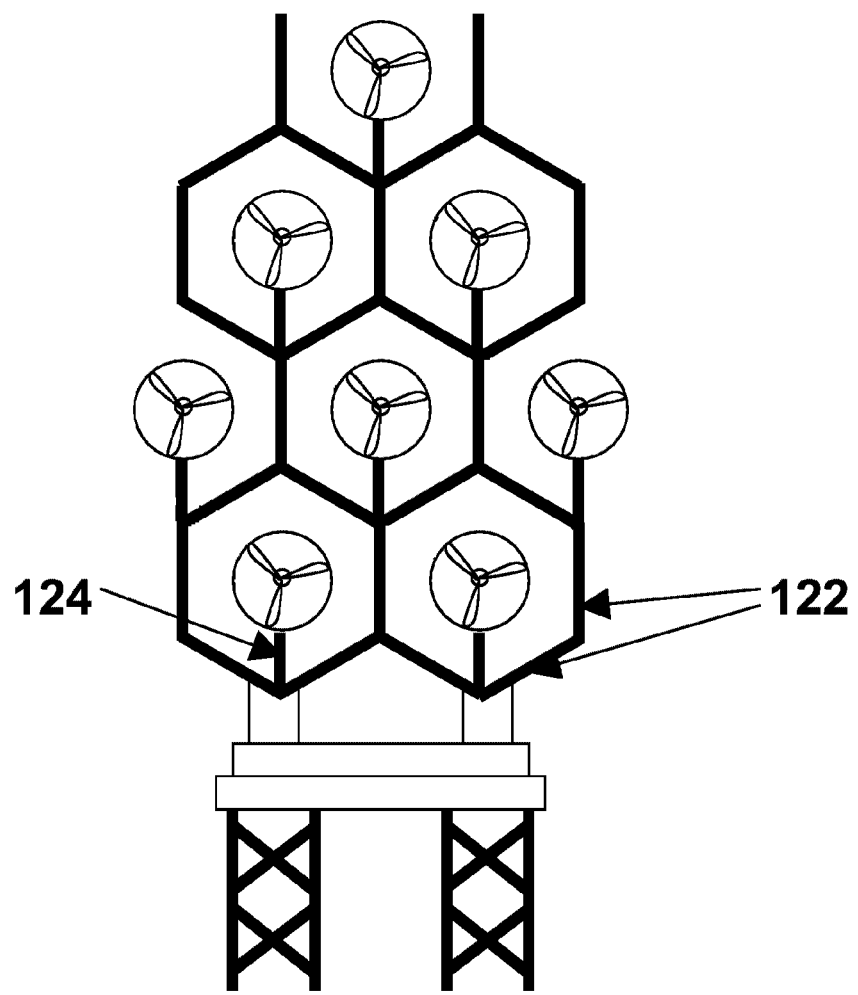
FIG. 4 is a front elevation of the cellular wind turbine assembly shown in FIGS. 1 and 2 together with its support structure.

FIGS. 4 and 5 illustrate the support structure of the assembly 100, FIG. 4 being a schematic front elevation similar to FIG. 1 but with the airfoils removed to show the support structure, and FIG. 5 being an enlarged view of part of one cell of the support structure and its associated turbine, with the airfoil of the cell being indicated by open circles. As shown in FIG. 4, each cell 102 of the assembly is supported by a hexagonal framework 122 from the lower end of which extends a short mast 124 on which the turbine 104 of the cell 102 is mounted. As shown in more detail in FIG. 5, the hexagonal framework 122 actually comprises two parallel frameworks 122A and 122B on the front and rear sides respectively of the turbine 104, these frameworks 122A and 122B being formed from rods 126 inserted into linking pieces 128, so that the frameworks 122A and 122B can be rapidly assembled on site from a small number of standard components. The frameworks 122A and 122B are interconnected at their lower ends by a cross-piece 130 on which the mast 124 is mounted. (Some parts of the framework shown in FIG. 4 may be omitted in some cases; for example, depending upon the strength of the material used to form the airfoils, it may be possible to omit the two vertical members in the uppermost cell in FIG. 4. Also, optionally additional support members may be provided extending at 120° angles to the mast 124; these additional support members may be used to provide support to the airfoil and/or to the turbines 104.)

The yaw control base 108 (FIGS. 1 and 2) can be controlled in various ways, the choice being governed at least in part by the size of the assembly 100. Especially in smaller assemblies, the yaw control base may be controlled by a weather vane, as illustrated in FIGS. 6A and 6B, which are, respectively, side elevation and top plan views of one cell 102 provided with such a vane 132. The vane 132 is provided on the rear surface of the cell 102 and will typically be provided on only some of the cells 102, preferably those in the center of the assembly 100. The vane 132 acts in the same manner as a conventional weathervane and keeps the assembly 100 facing into the prevailing wind. In view of the size and weight of the assembly 100 it may be desirable to provide some form of damping means (for example, frictional or hydraulic dampers) between the yaw control base 108 and the fixed base 110 (FIGS. 1 and 2) to prevent abrupt movements of the yaw control base 108, and especially abrupt reversals of its direction of movement.

Any known systems for keeping the assembly 100 facing into the wind may be employed. For example, especially with large assemblies it may be desirable to provide a sensor for measuring wind speed and direction, and a motorized drive for controlling movement of the yaw control base 108 relative to the fixed base 110; such a motorized drive could, for example, have the form of an electric motor on the yaw control base 108 provided with a pinion engaged with a circular rack provided on the fixed base 110. Again, it may be desirable to damp the movement of the yaw control base 108 relative to the fixed base 110, but in this case damping can be effected in software used to control the motorized drive. Such a system has the advantage that measurements of wind speed could be used to raise an alarm or initiate safety measures if wind speeds reach a point at which damage to the assembly appears likely.

From the foregoing description, it will be seen that the wind turbine assembly of the present invention differs radically from the typical prior art assembly using discrete single mast/single rotor units, in that the wind turbine assembly of the present invention uses a plurality of (typically) small sized wind turbine cells stacked to form the full assembly. Each unit can be identical (or a small number of units differing in, for example, d/D ratio, can be employed) and scalable, and thus easily replaceable for maintenance or upgrading. The relatively small size and weight of the individual cells is also advantageous during construction, repair and maintenance in that it limits the weight which has to be lifted or manipulated at any one time; this may reduce costs by removing the need for very heavy lifting equipment and may also have safety advantages, especially when units need to be lifted at offshore sites exposed to severe weather conditions.

It will be appreciated by those skilled in wind turbine technology that the assembly of the invention previously described can be modified in a number of different ways. For example, the assembly 100 has been shown with hexagonal intakes to the airfoils. This enables the intakes to be stacked with no gaps therebetween, as illustrated in FIG. 1, but does require a rather complex geometric form for the intake sections as they transition from hexagonal intakes to circular outlets, and the manufacture of airfoils having these complex geometric forms may increase manufacturing costs. Alternatively, the airfoil intakes may be made circular (so that the airfoils can maintain circular symmetry throughout their length, which eases manufacturing problems) and the tri-lobed gaps between the intakes of adjacent airfoils covered with "crevice caps" having substantially the form of squat triangular pyramids, but with the edges of the base of the pyramid curved to conform to the curved edges of the circular airfoil intakes. The use of such crevice caps ensures that all air incident upon the front face of the assembly enters into the airfoil intakes (thus maximizing power output from the turbines) and that no moving air enters between the airfoil intakes, where it might cause undesirable turbulence.

Figure 8A:
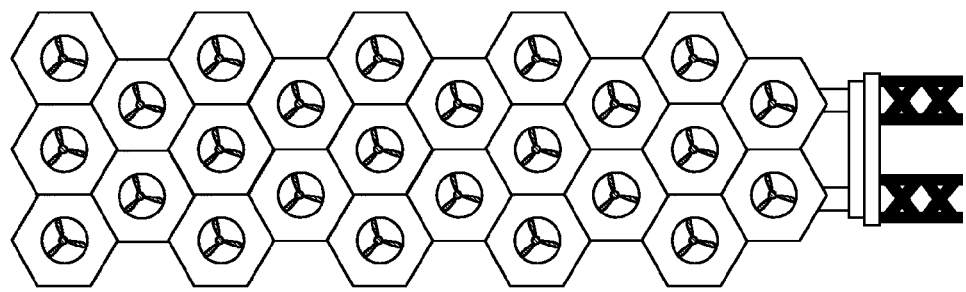
Figure 7:
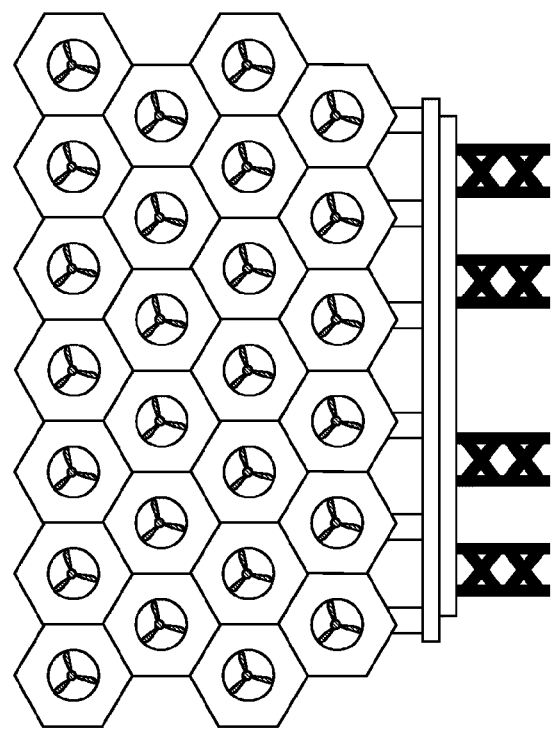

The assembly shown in FIG. 1 is small, comprising only eight cells 102 and in practice substantially more cells would typically be employed in a commercial assembly. FIGS. 7 and 8A illustrate two types of assembly having larger numbers of cells. The assembly of FIG. 7 is in effect produced by extending the assembly of FIG. 1 horizontally without increasing its height, and might thus be useful in an off-shore location relatively close to shore where it is desired to limit the overall height of the assembly to prevent it being seen from shore. In contrast, the assembly of FIG. 8A is in effect produced by extending the assembly of FIG. 1 vertically without increasing its width, and might thus be useful where economic considerations dictate provide a large assembly on a relatively small base. The assembly of FIG. 8A is also well adapted to take advantage of the stronger wind which is often found at substantial distances above the ground or ocean surface.

FIG. 8B illustrates an assembly generally similar to that of FIG. 1 but using large commercially available turbines. FIG. 8B illustrates with dimensions an assembly using ten of the aforementioned 47 meter turbines used with airfoils having a wind velocity acceleration factor of 1.72, so that each turbine generates 3.3 MW and the entire assembly generates 33 MW. Although large, the assembly shown in FIG. 8B is entirely practicable for a land-based wind farm, and in many cases the single large structure may be less objectionable than the 50 scattered single mast/single rotor units which would otherwise be required to generate the same power output. It should be noted that in large turbine assemblies such as that shown in FIG. 8B it is normally not necessary to increase the length of the airfoil is proportion to the diameter of the turbine, i.e., typically the airfoils in FIG. 8B will be shorter relative to the turbine diameter as compared with those in FIG. 1.

As already mentioned, the present invention also provides floating power generation assemblies (typically off-shore wind farms, although the floating power generation assemblies of the invention may make use of other types of power generation means, for example means to derive power from wave motion or water currents), which can be sited in deep water without mounting a rigid structure on the sea bed, or other solid underwater surface. These floating power generation assemblies are described below primarily using conventional wind turbine units of the single mast/single rotor type, but it will readily be apparent to those skilled in wind farm technology that the single mast/single rotor type units could be replaced by cellular wind turbine assemblies of the present invention, as described above.

Figure 9:
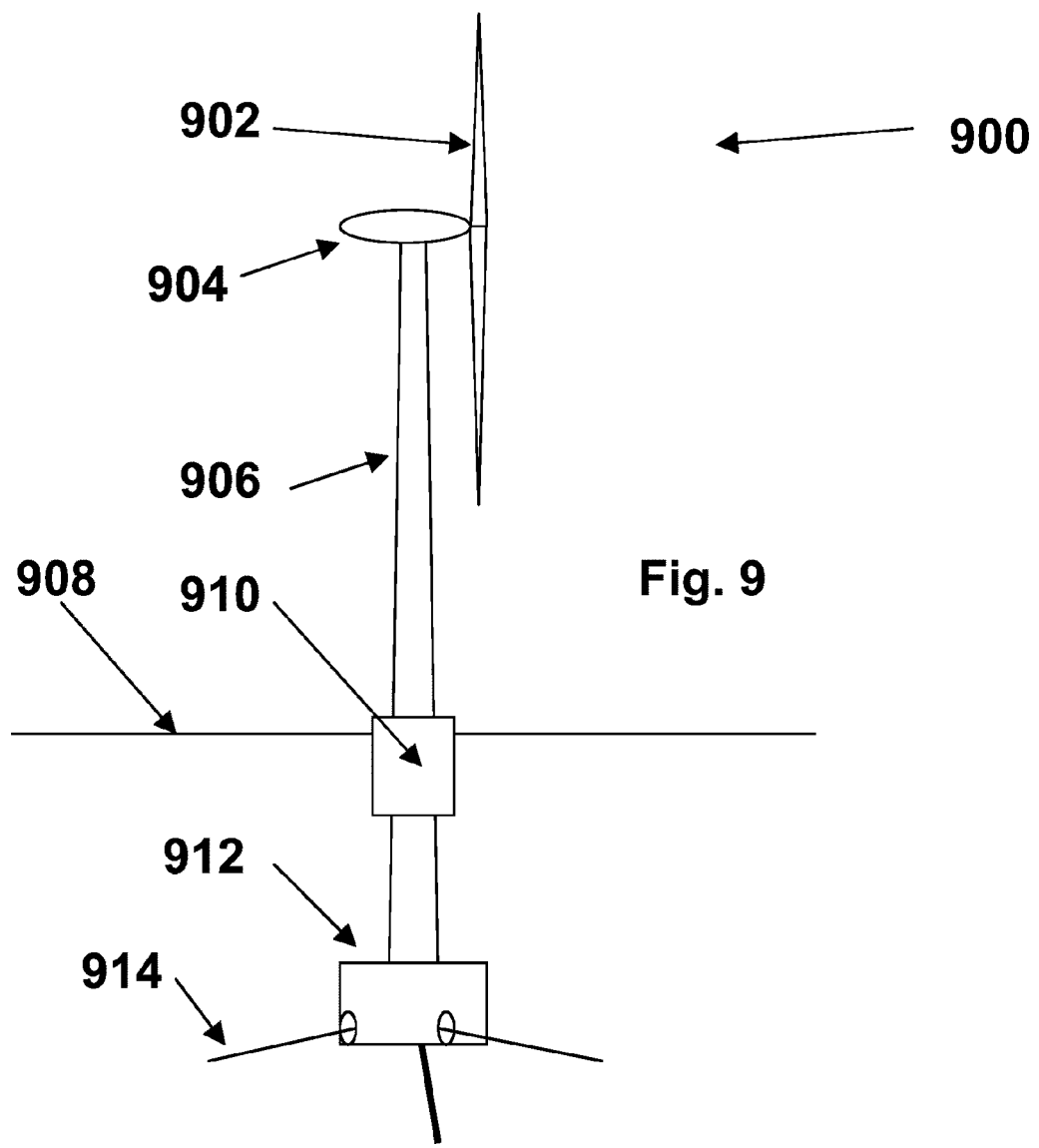
FIG. 9 is a schematic side elevation of a preferred floating wind turbine for use in the floating power generation assemblies of the present invention.

FIG. 9 of the accompanying drawings is a schematic side elevation of a single wind turbine unit (generally designated 900) which can serve one floating unit of a floating power generation assembly (hereinafter for convenience called "a wind farm") of the present invention. The unit 900 comprises a rotor 902 comprising a plurality of blades (typically three) and mounted on a hub 904 for rotation about a horizontal axis sufficiently far above the water that the rotor blades do not contact the water as they rotate; indeed, to ensure that the rotor blades receive the full velocity of the wind unhindered by surface drag, it is desirably that the rotor blades have, at their lowest point, at least 15 meters clearance above water level. The hub 904 houses a generator (not shown) and is supported on a tower or mast 906. Units comprising a rotor and a hub containing a generator are available commercially, and the commercial units can readily be employed in wind farms of the present invention. The commercial units are already provided with means (not shown) to keep the rotor facing the prevailing wind, and with a rotation joint (also not shown) located a short distance below the hub to enable the hub and rotor to turn on a fixed mast, thus minimizing the weight which has to rotate as the rotor turns to face the prevailing wind.

Thus far, the construction of the unit 900 is conventional. However, instead of being secured to a rigid support, either land or sea bed, the unit 900 is designed for anchoring in deep water. As shown in FIG. 9, the mast 906 passes through the ocean surface 908, being surrounded by a buoyancy section or belt 910 which lies at the ocean surface 908 and provides sufficient buoyancy to hold the upper end of the mast 906 at its intended distance above the ocean surface. The lower end of the mast 906 is fixed to a turbine base section 912, which is made heavy enough and located far enough below the ocean surface 908 to ensure that the center of gravity of the entire unit 900 lies a substantial distance below the ocean surface 908. The base 912 is connected to three cables 914, which are connected to other units 900 or to anchors, as described in detail below.

The buoyancy belt 910 serves to ensure that the center of buoyancy of the unit 900 is sufficiently above the center of gravity of the unit to provide stability against wave action. The buoyancy belt 910 also serves to protect the mast 906 against impacts from floating objects.

FIG. 10A is a top plan view of a floating power generation assembly or wind farm comprising ten components, namely seven units 900 and three anchors 916 (one of which is omitted from FIG. 10A to increase the scale of the drawing). As shown in FIG. 10A, the units 900 are arranged at the vertices of a series of equilateral triangles. More specifically, six of the units 900 are arranged at the vertices of a regular hexagon, the sides of which are made long enough (typically at least five times the diameter of the rotor 902 in FIG. 9) that there is substantial separation between the circles 900A which define the maximum area which may be traversed by each rotor 902. The seventh unit 900 is disposed at the center of the regular hexagon. The cables 914 run along all six sides of the hexagon, and also connect the central unit 900 to alternate ones of the units at the vertices of the hexagon. The three anchors 916 are arranged on the sea bed beneath the perpendicular bisectors of alternate sides of the hexagon, and are connected by cables 914 to the units 900 at either end of the adjacent side of the hexagon. Thus, the three anchors 916 are arranged at the vertices of an equilateral triangle, within which are located the units 900, and each of the units 900 forming the hexagon is connected to its two neighboring units 900 and to one of the anchors 916, with alternate units 900 of the hexagon also being connected to the central units 900. Thus, each of the units 900 is connected by the cables 914 to at least three components of the assembly. The anchors 914 serve to hold the seven units 900 stationary against wind and ocean currents. Also, although not shown in FIGS. 9 and 10A, the cables 914 can carry electrical cables through which electricity generated in the hubs 904 can pass into underwater cables (not shown) provided on one or more of the anchors 916. However, it is generally preferred that electrical cables separate from the cables 914 be provided to carry electricity away from the wind farm.

Figure 10B:
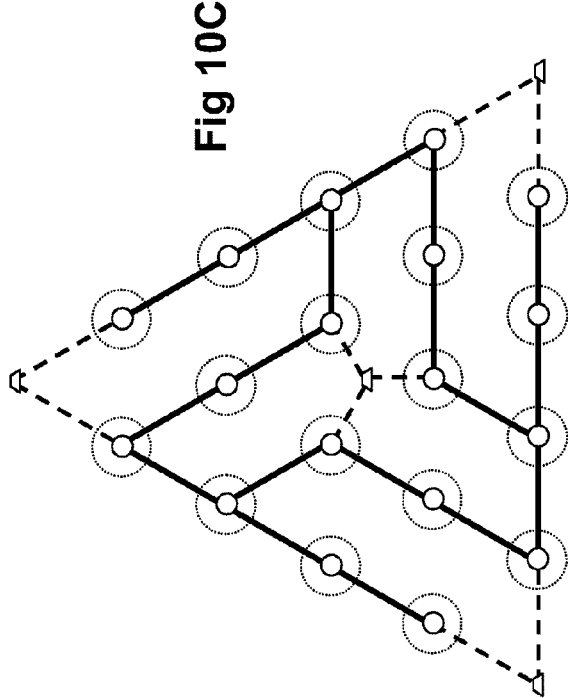
FIGS. 10B to 10F are schematic top plan views, similar to that of FIG. 10A, showing five additional floating power generation assemblies of the present invention comprising differing numbers of wind turbines, connecting cables and anchors.
Figure 10C:
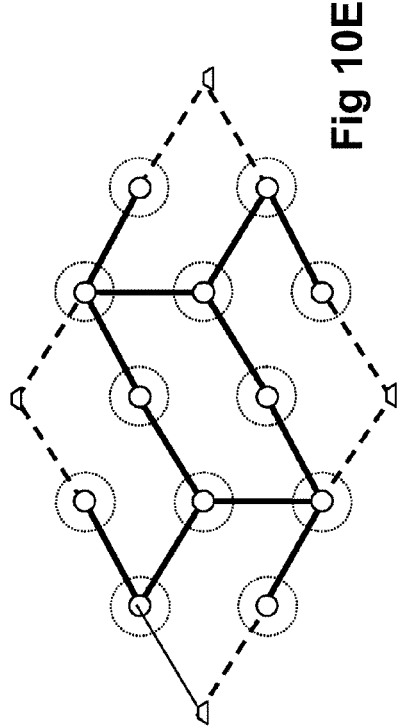
Figure 10D:
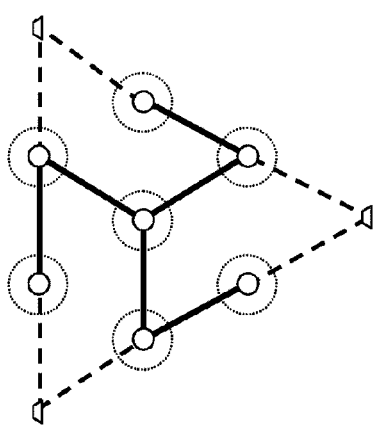
Figure 10E:
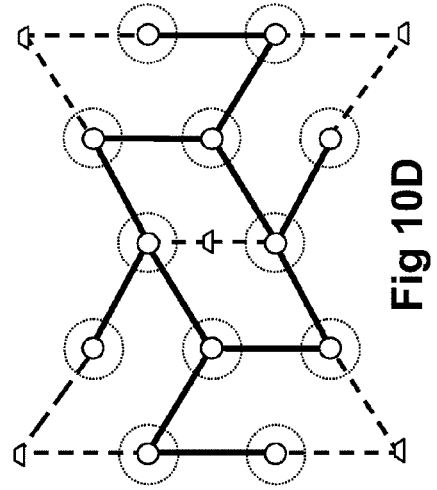
Figure 10F:
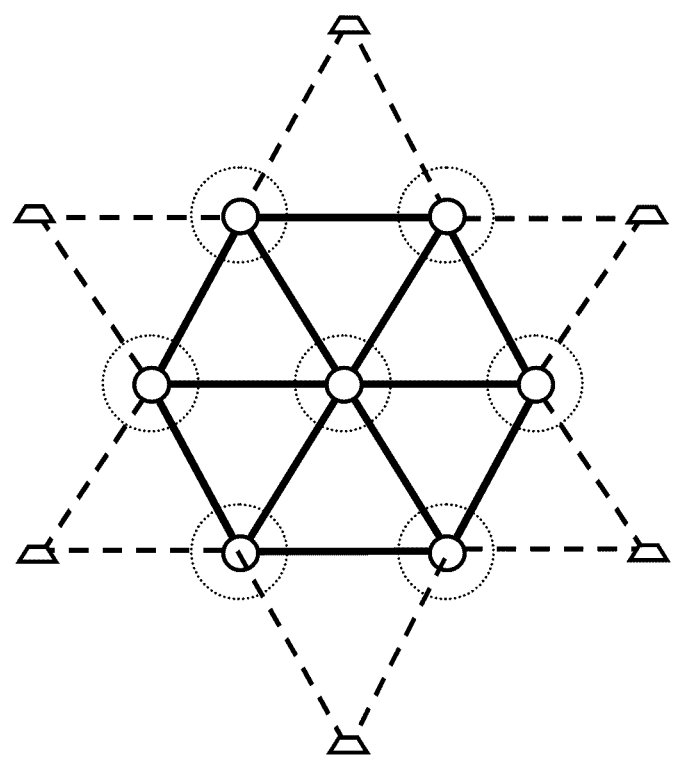

Numerous other arrangements of the units 900 and the anchors 916 may of course be used, and five examples are illustrated in FIGS. 10B-10F. The wind farm shown in FIG. 10B is formed by omitting the cables from alternate sides of the hexagon in FIG. 10A, so that three of the units 900 are connected only to one other unit 900 and to an anchor 916. This type of "open" assembly may be useful in sheltered locations where strong currents and waves are not deemed likely; a mixture of open and closed assemblies may of course be used. FIG. 10C shows a larger assembly, of the same "open" type as that of FIG. 10B but having a fourth anchor disposed at the center of the equilateral triangle formed by the other three anchors; such central anchors are desirable in larger assemblies to prevent excessive drift of some floating units not directly connected to anchors. The 12-floating unit, 5-anchor assembly of FIG. 10D is notionally produced by joining two of the assemblies of FIG. 10B along one open (uncabled) edge and replacing the two anchors connected to the floating units along that edge with a single central anchor disposed midway along that edge. The assembly of FIG. 10E may also be regarded as notionally produced by joining two of the assemblies of FIG. 10B along one open edge, but using a different anchor arrangement. Finally, the assembly of FIG. 10F is essentially a modification of the assembly of FIG. 10A such that the floating unit 900 at the center of the hexagon is connected by cables to each of the six surrounding floating units, while six anchors are provided, each anchor being connected to two of the floating units forming the hexagon, so that each of the floating units forming the hexagon is connected to two anchors. Furthermore, each of the floating units forming the hexagon is connected to five other components (two anchors and three other floating units), while the central floating unit is connected to six other floating units. This high degree of connectivity renders the assembly of FIG. 10F very suitable for locations where difficult weather conditions may be encountered.

As will be apparent to those skilled in wind turbine technology, numerous variations can be made in the unit 900 shown in FIG. 9. For example the unit may incorporate a variety of different types of wind turbine. The rotor 902 could be a conventional three-bladed propeller; such three-bladed propellers are commercially proven, but may give rise to blade resonance issues. Alternatively, the unit 900 could use a vertical axis turbine; such vertical axis turbines avoid the need for a yaw control system to keep the rotor facing the prevailing wind, but have not been commercially proven and may give rise to blade resonance issues. The unit 900 could use a WARP type turbine, as manufactured by ENECO Texas LLC, although full scale turbines of this type have not yet been tested. Finally, as already noted, the unit 900 could use a cellular wind turbine assembly of the present invention, as described above with reference to FIGS. 1-8.

In order to reduce the costs of individual bases, the number of cable mountings thereon could be reduced. The unit shown in FIG. 9 is designed to use a base with six cable mountings, which can accommodate the layouts shown in FIGS. 10A-10E using only one type of base. The number of cable mountings on the base could be reduced to three. However, since not all of the bases shown in FIG. 10A-10E have the same cable layout, multiple types of bases might be needed if the number of cable mounting were reduced.

A commercial wind farm would typically make use of larger numbers of units 900 than shown in FIG. 10A. The arrangement shown in FIG. 10A might be regarded as a pilot plant suitable for an extended commercial test; since the individual units 900 would typically be rated at 2.0 to 3.6 MW, the arrangement shown in FIG. 10A might have an output of about 20 MW. Thus, a commercial wind farm might use 5 to 10 of the arrangements shown in FIG. 10A (i.e., 35 to 70 individual units 900) for a total output of 100 to 200 MW. Examples of larger wind farms are discussed with reference to FIGS. 20A to 20F below.

One possible objection of floating wind farms, especially near shipping lanes, is the risk that a floating unit might break away from its anchors in severe weather and pose a hazard to navigation. To minimize this danger, at least some of the individual units 900 could be equipped with global positioning system (GPS) units arranged to provide position indications to an operator on shore, who could thus detect when any unit drifts too far from its expected position, and takes steps to retrieve the unit and issue an appropriate warning to shipping.

FIG. 11 is a schematic side elevation, similar to that of FIG. 9, of a floating unit (generally designated 1100) which is a essentially a modified version of the unit 900 shown in FIG. 9. Most parts of the unit 1100 are similar to those of FIG. 9 and are labeled accordingly, but there are three major differences between the two units. Firstly, the base section 912 of unit 900 is replaced with a smaller base section 1112 which has substantially the form of a disc made of reinforced concrete. This base section 1112 may optionally be provided with a tension member tethered to the seabed. Secondly, the cylindrical buoyancy section 910 of unit 900 is replaced by a shorter buoyancy section (generally designated 1110) comprising a central cylindrical section 1110A capped at either end by frustoconical sections 1110B, 1110C which provide a smooth transition between the large diameter of the central section 1110A and the portions of the mast immediately above and below the buoyancy section 1110. The frustoconical sections 1110B, 1110C help reduce peak mechanical loads on the unit 1100 and minimize high frequency wave induced motions, especially heave.

The most important difference, however, between the units 900 and 1100 is the provision in the latter of auxiliary cables 1114 which run from the upper end of section 1110A to cables 914, the junctions between cables 1114 and 914 being a substantial distance from the unit 1100. The auxiliary cables 1114 provide additional stability against wave and wind action to the unit 1100. (In some cases, the auxiliary cables 1114 could be connected to an anchor rather than to one of the cables 914.)

The unit 1100 will typically be of substantial size and weight (all reference hereinafter to tons are to metric tons). The hub 904 may be 60 meters above the water surface 908, and this hub, together with the rotor 902 may weigh 100 tons. The remaining portion of the mast above the water may weigh 120 tons and the buoyancy section a further 120 tons. The subsurface section of the mast, equipped with ballast tanks, may have a weight varying from 160 (empty) to 1000 tons (ballasted), and the base section 1112, which is intended to rest 65 meters below the water surface 908 to avoid surface wave conditions, may weight 700 tons, for a total weight of 1000 to 2300 tons for the entire unit 1100. When the ballast tanks are full, the center of gravity of the unit, indicated by arrow G in FIG. 11, is 40 meters below the water surface, while the center of buoyancy, indicated by arrow B, is 20 meters below the water surface, giving a metacentric height of 20 meters. These dimensions are designed so that 300 kNewtons of force of the hub 904 will be offset by only 4 degrees of inclination for the 20 meters metacentric height. The size of the ballast tanks is designed to allow deep submersion for operation and shallower submersion for maintenance and construction.

FIGS. 12A, 12B and 12C show one possible modification of the unit 1100, namely a change in the form of the base section 1112. FIG. 12A is an enlarged view of the base section 1112 shown in FIG. 11, this base section 1112 being about 12 meters in diameter and 1.5 meters thick. FIG. 12B shows a view similar to that of FIG. 12A of a modified base section having a disc 1112' around the periphery of which is formed a hoop or collar 1114, which increases the hydrodynamic mass of the base section to reduce heave motion from surface wave forces and lengthen the natural period of heave. FIG. 12C is a section in a vertical plane including the axis of base section 1112' and shows the cross-section of collar 1114.

FIGS. 13A, 13B, 14A and 14B show a further modification of the unit 1100, namely a change in the form of the buoyancy section. FIG. 13A is an enlarged view of the buoyancy section 1110 shown in FIG. 11. FIG. 13B shows a view similar to that of FIG. 13A of a modified buoyancy section, which is notionally produced by moving buoyancy section 1110 below water surface 908 as indicated at 1110', placing a plate 1320 having essentially the form of a "three-pointed star" above the water surface and connecting buoyancy section 1110' to plate 1320 by four narrow vertical pillars 1322. FIGS. 14A and 14B are horizontal sections in the planes A-A and B-B respectively in FIG. 13B, and show the arrangement of the pillars 1322. (Although four pillars 1322 are shown in FIGS. 13B, 14A and 14B, three pillars could alternatively be used, with the central pillar being omitted and the space thus cleared on the buoyancy section 1110' used to provide an access door to this section.) The modified buoyancy section is designed to produce a reduced cross-sectional area at the water surface, thereby reducing the effects of wave action on the unit 1100.

FIG. 15 illustrates the manner in which auxiliary cables 1112 may be used with the modified buoyancy section shown in FIGS. 13B, 14A and 14B. As indicated in FIG. 15, the auxiliary cables 1112 may be attached either to buoyancy section 1110', preferably to the upper end thereof, or (as indicated by the broken line in FIG. 15), to the plate 1320 above the water surface.

The low center of gravity of the unit shown in FIG. 15 provided by the heavy base 1114, and the substantial metacentric height (i.e., separation between this center of gravity and the center of buoyancy of the unit) render the unit very stable against wave action. FIGS. 16A-16E illustrate the stability of the unit against high waves, with FIG. 16A showing the unit in a trough, FIG. 16E showing the unit on a crest, and FIGS. 16B-16D showing the unit at intermediate positions. In each case, the ocean surface under the high wave conditions is denoted "H", while the same surface under calm conditions is denoted "C". It will be seen from FIGS. 16A-16E that there is no danger of the rotor being damaged by contact with the ocean surface even under these extreme high wave conditions.

Figure 18:
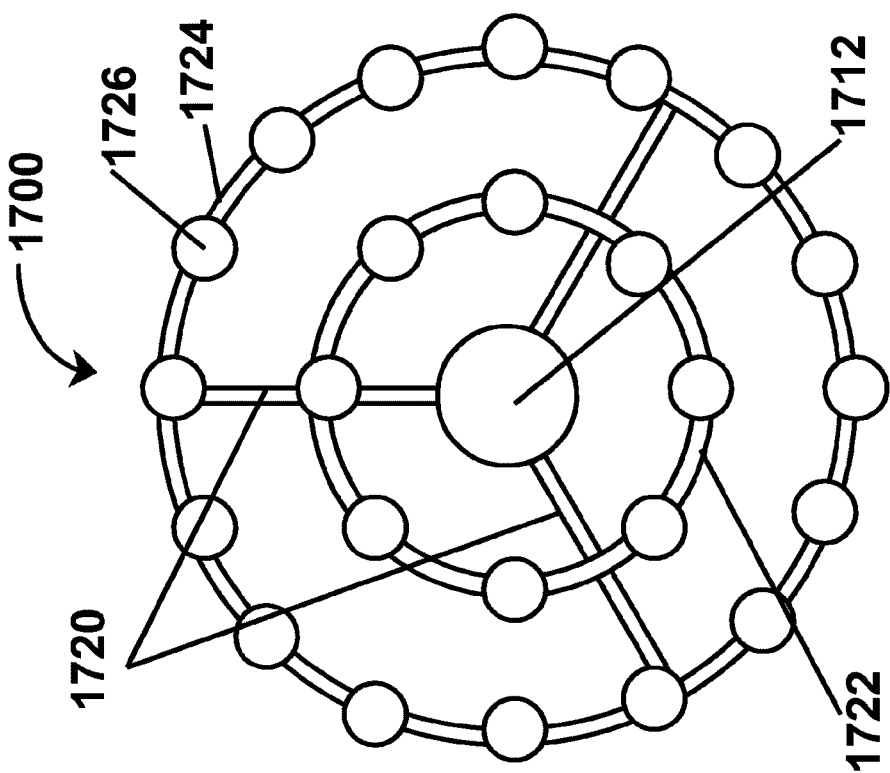
FIG. 18 is a schematic top plan view of the base section of the modified wind turbine of FIG. 17.
Figure 17:
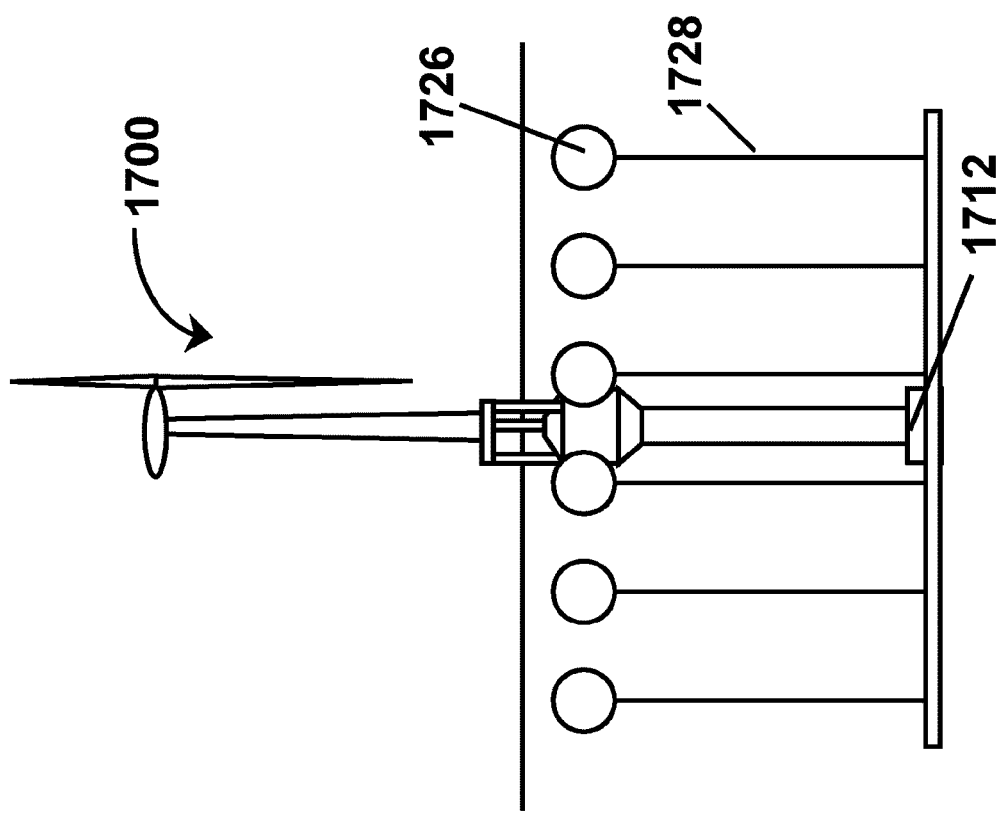
FIG. 17 is a schematic side elevation, generally similar to that of FIG. 15, showing a modified version of the wind turbine of FIG. 15 arranged to generate additional power from wave motion.

One advantage of off-shore wind farms, and especially deep water off-shore wind farms, over similar land-based wind farms is that the off-shore wind farms can make use of renewable energy sources in addition to wind; in particular, off-shore wind farms can make use of wave energy and/or the energy of marine currents. For example FIGS. 17 and 18 are respectively side elevation and top plan views of a unit (generally designated 1700) which is generally similar to the unit shown in FIG. 15 described above except that it is equipped for wave energy power generation. As shown in FIGS. 17 and 18, the base 1712 of the unit 1700 is provided with three symmetrically spaced horizontally extending ribs 1720, which carry inner and outer circular members 1722 and 1724 respectively. The circular members 1722 and 1724 are connected to float members 1726 by cables 1728, these float members, when moved by wave action, move the cables 1728 relative to the circular members 1722 and 1724, thus serving to generate energy from waves in a known manner.

Figure 19:
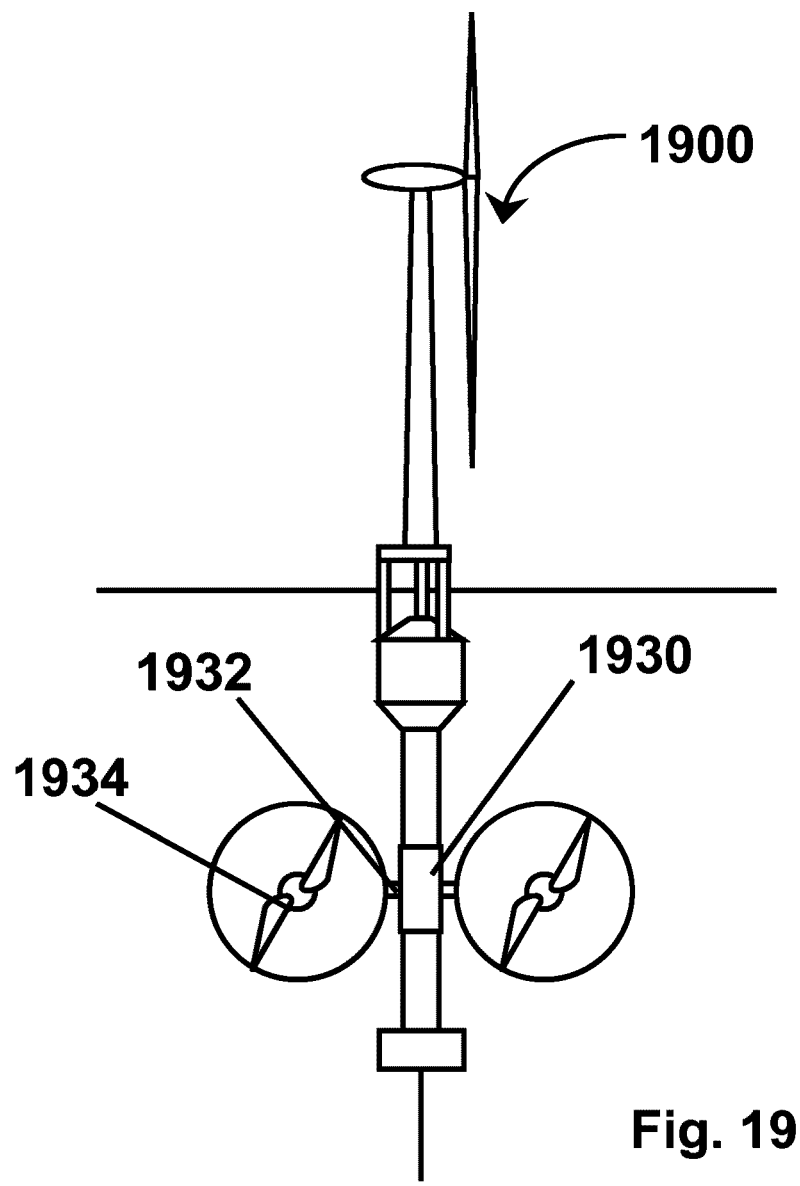
FIG. 19 is a schematic side elevation, generally similar to those of FIG. 15, showing a further modified version of the wind turbine of FIG. 15 arranged to generate additional power from water currents.

FIG. 19 is a side elevation of another unit (generally designated 1900) which is again generally similar to the unit shown in FIG. 15 except that it is equipped for power generation from ocean currents. The mast of unit 1900 is provided with a collar section 1930, which is pivotable relative to the mast and which carries two arms 1932 extending horizontally in opposite directions from the section 1930. The free ends of the arms 1932 carry hubs 1936, on which are mounted rotors 1934 which can rotate under the influence of marine currents, thereby driving generators (not shown) located within the hubs 1936. Electricity from the generators is fed via cables (not shown) in the arms 1932 and the section 1930 to the mast, and thence via cables in the same way as previously described.

The deep water off-shore wind farms described above with reference to FIGS. 9 to 19 have the advantage of being readily deployable in much deeper water than conventional shallow water off-shore wind farm; thus the deep water off-shore wind farms greatly increase the number of potential sites for wind farms, are less likely to draw complaints concerning noise or esthetics, and can make use of the stronger and steadier winds of deep ocean waters. As shown with reference to FIGS. 16A-16E, wind farm units of the present invention can be made highly resistant to wave action, and interconnecting the units in the manner already described further reduces the chances that units may be tipped, and thus damaged, by wave or storm action. The wind farm units of the present invention can readily be manufactured so that each component (for example, the turbine, the base and the buoyancy belt) can be made easily replaceable for maintenance, repair or upgrading.

The present invention is not, of course, confined to direct supply of electricity from the wind farm; instead the wind farm may make use of the electricity generated in other ways. For example, a wind farm can be arranged so that the electricity generated is used to generate hydrogen, typically by electrolysis of water, and resultant hydrogen piped off-site. In the case of off-shore wind farms, it may be convenient for the wind farm to generate hydrogen which can then be piped ashore, rather than supplying the electricity to shore via an undersea cable. (The "decoupling" of the electricity generated at the wind farm from the on-shore electric power grid effected by the generation of hydrogen in this manner avoids the problems which wind farms may otherwise pose in terms of affecting the quality of the electric supply on-shore, and thus may avoid the limitations which some power companies place on the proportion of wind power which they deem acceptable.) Alternatively, the hydrogen could be accumulated at the wind farm, in either gaseous or liquid form and then removed by tanker. Since a wind farm operating in this manner requires no direct connection to shore, it can be positioned at greater distances off-shore.

Figure 20C:
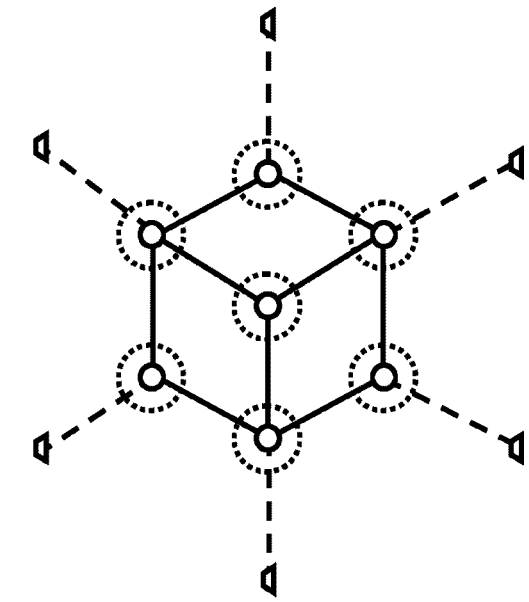
FIGS. 20A to 20J are schematic top plan views, generally similar to those of FIGS. 10A-10F, of additional floating power generation assemblies of the present invention.
Figure 20B:
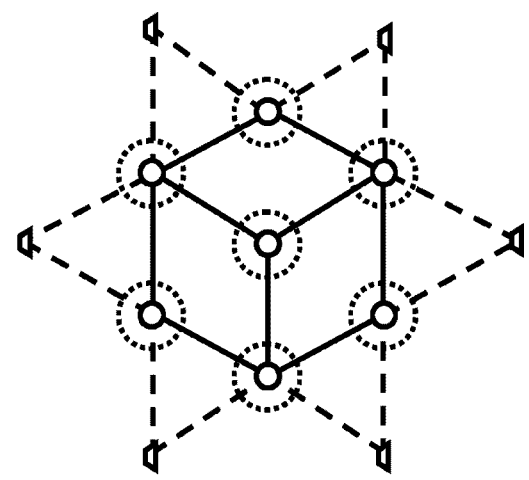
Figure 20A:
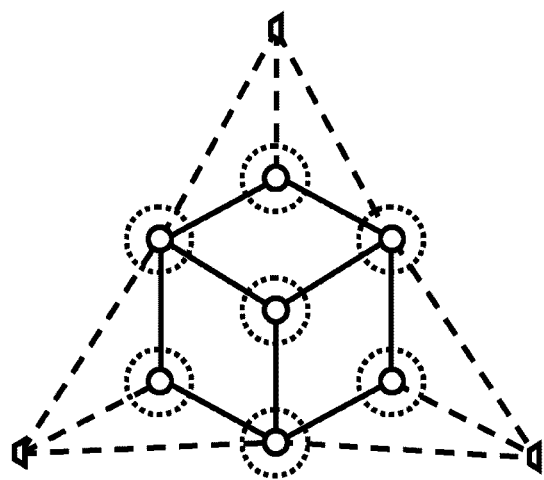
Figure 20D:
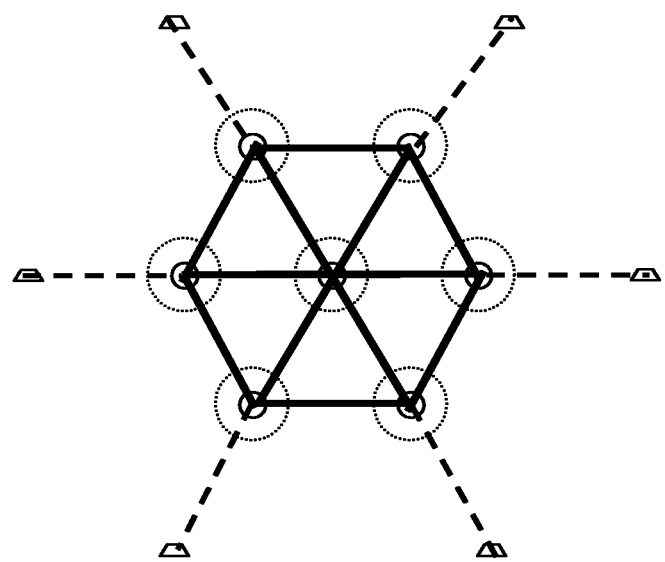

FIGS. 20A to 20J illustrate top plan views, similar to those of FIGS. 10A to 10E, of further wind farms of the present invention, and illustrate variations in the arrangements of anchors, and the way in which multiples of the smaller wind farms previously described may be used to form large, high output wind farms. The optimum arrangement of anchors, balancing the cost of additional anchors and their associated cables against the risk to the wind farm being disrupted or damaged by strong winds, waves or currents, varies greatly with local conditions such as depth, marine currents, tides, and anticipated wave situations, including for example the possibility of hurricanes or similar major storms. The anchor arrangements shown in FIGS. 20A, 20B and 20C are designed to provide stronger anchoring arrangements than that of FIG. 10A. The arrangement of FIG. 20A is essentially a modified form of the arrangement of FIG. 10A, with each anchor 916 connected to three adjoining units 900 of the hexagon. The arrangement of FIG. 20B is another modification of the arrangement of FIG. 10A, with the provision of three additional anchors 916, each connected to two adjoining units 900 of the hexagon, so that each unit in the hexagon is connected to two spaced anchors, thus restraining the wind farm from overall rotation in azimuth. The arrangement of FIG. 20C also uses six anchors arranged in a hexagon, but with each anchor only connected to one unit in the hexagon. The arrangement of FIG. 20D is similar to that of FIG. 20C, but with the central floating unit connected to all six floating units of the hexagon to provide maximum stability in exposed locations.

Figure 20F:
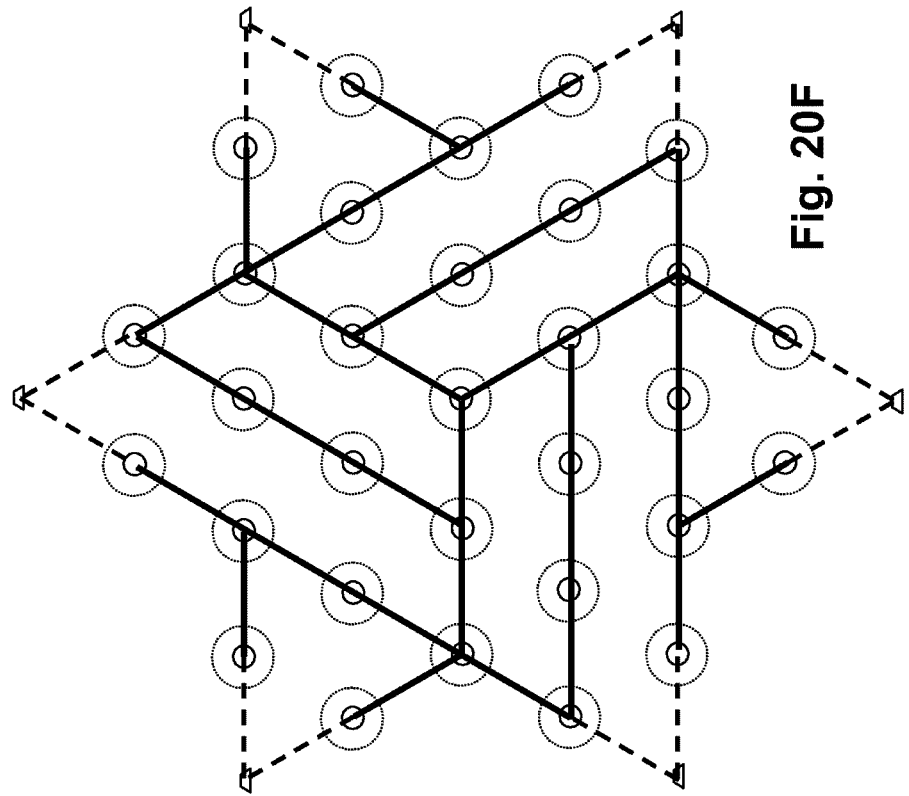
Figure 20E:
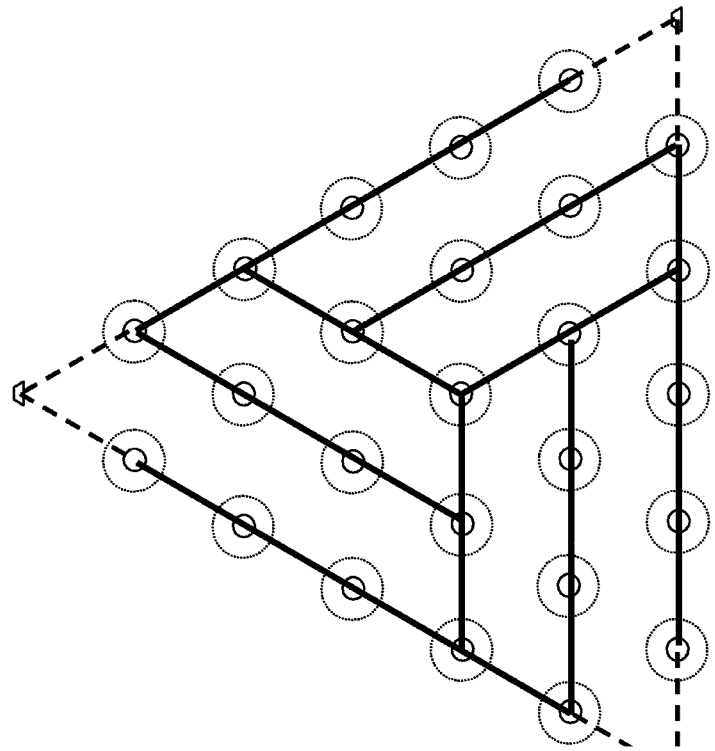
Figure 20H:
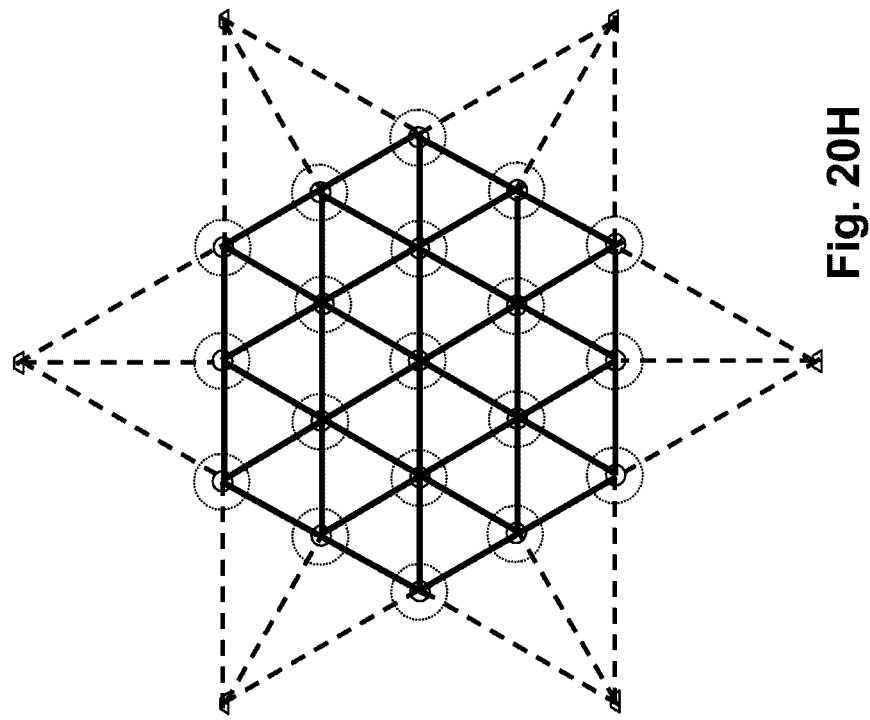
Figure 20G:
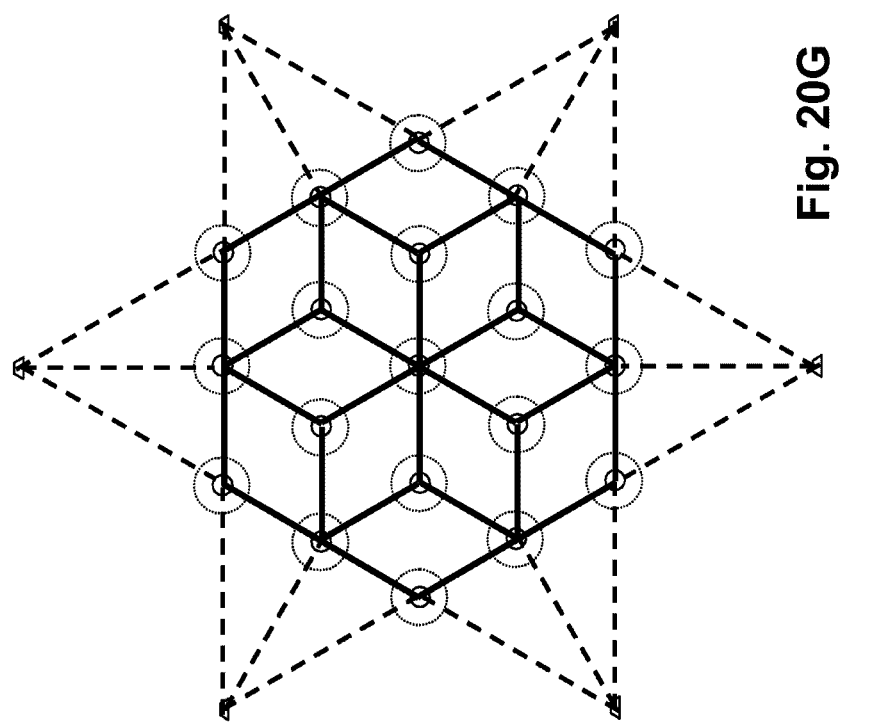
Figure 20J:
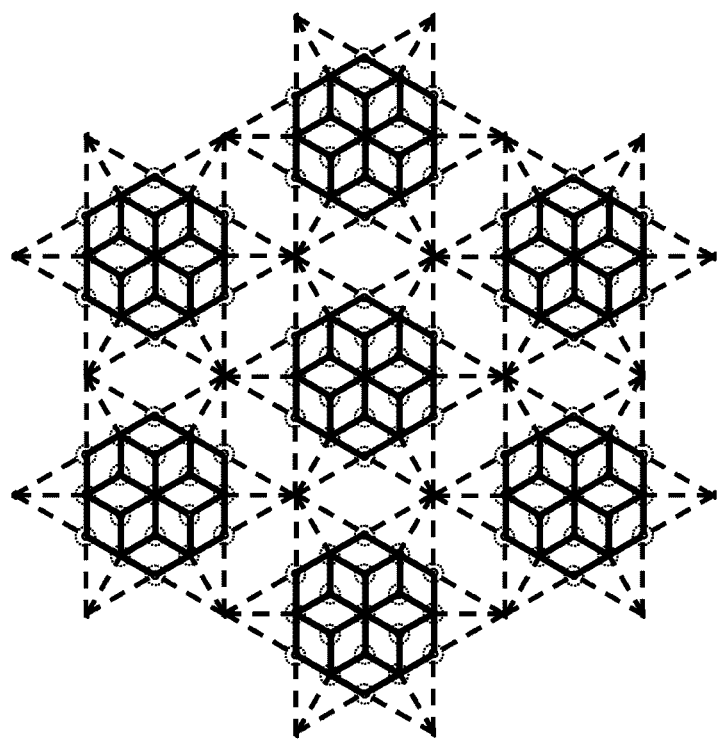
Figure 20I:
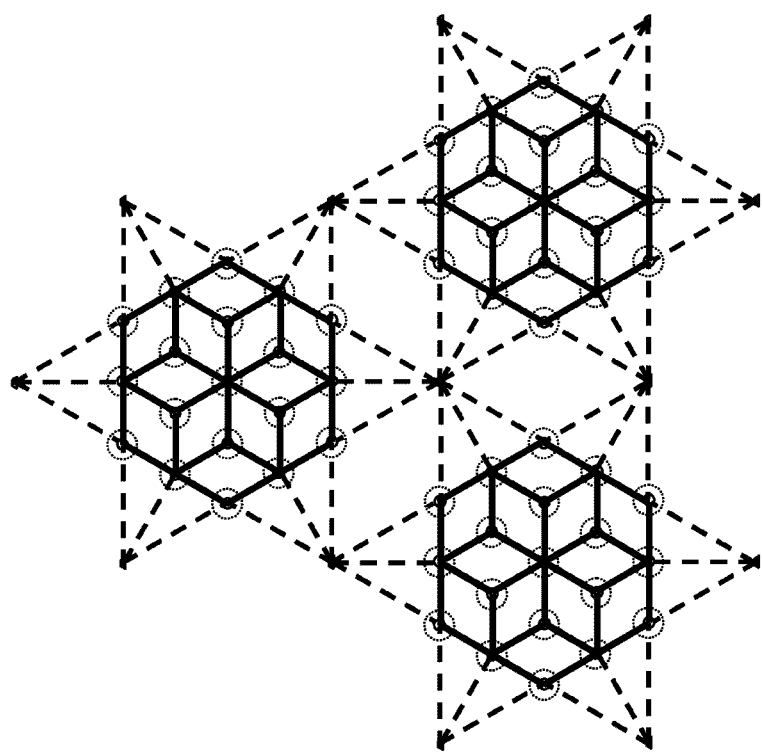

FIGS. 20E to 20J illustrate larger wind farms. FIG. 20E illustrates a 25 floating unit, 27 cable, 3 anchor farm which is essentially an extended version of the farm of FIG. 10C; in FIG. 20E, the central floating unit may be replaced by an anchor (cf. FIG. 10C) for greater stability. FIG. 20F illustrates a 31 floating unit, 33 cable, 6 anchor farm designed for somewhat greater stability than the unit of FIG. 20E; again, the central floating unit may be replaced by an additional anchor. FIG. 20G illustrates a 19 floating unit, 30 cable, 6 anchor "expanded hexagon" farm which may be regarded as produced by superimposing six of the farms of FIG. 20B and providing anchors only around the periphery of the farm, with each anchor connected to the three adjacent floating units. FIG. 20H illustrates a similar expanded hexagon wind farm designed for somewhat greater stability than the farm of FIG. 20G, and which may be regarded as produced by superimposing six of the farms of FIG. 20C. FIGS. 20I and 20J illustrate large wind farms which would have outputs comparable to land-based non-wind farm power stations. The 57 floating unit, 90 cable, 13 anchor farm of FIG. 20I may be regarded as formed using three of the farms of FIG. 20G with sharing of anchors where possible, and similarly the 133 floating unit, 210 cable, 24 anchor farm of FIG. 20J may be regarded as formed using seven of the farms of FIG. 20H with sharing of anchors where possible. It should be noted that in the center of the wind farm of FIG. 20I there is shown a central anchor connected to nine floating units in a symmetrical manner. If weather and current conditions do not require an anchor at this position, this central anchor may be eliminated and the nine cables simply connected to each other, either directly or via some buoy or other device provided with appropriate cable mountings. The wind farm of FIG. 20J has six similar points where nine cables are connected to a single anchor in a symmetrical manner, and in some cases it may be possible to eliminate some or all of these six anchors and simply connect the cables to each other.

The deployment processes of the present invention will now be discussed. As indicated above, the floating units 900 and 1100 used in the floating power generation assemblies of the present invention can weigh up to 2000 tons even with empty ballast tanks and may be more than 120 meters in height. Outer ocean deployment of such large heavy units in conventional marine cranes is severely limited by weather conditions and hence a more stable and reliable deployment process is needed to achieve reliable deployment at lower cost. The deployment process of the present invention is designed to achieve these goals.

FIGS. 20K to 20N illustrate, in a highly schematic manner, the manner in which the anchors and cables needed to form a floating power generation assembly are assembled and the floating units attached to the anchors and cables. For simplicity, FIGS. 20K to 20N illustrate the assembly of the floating power generation assembly of FIG. 20D, which has seven floating units and six anchors, since it is believed that the necessary modifications of the process needed to assemble more complex layouts will readily be apparent to those skilled in the art of deploying anchored floating units.

Figure 20K:
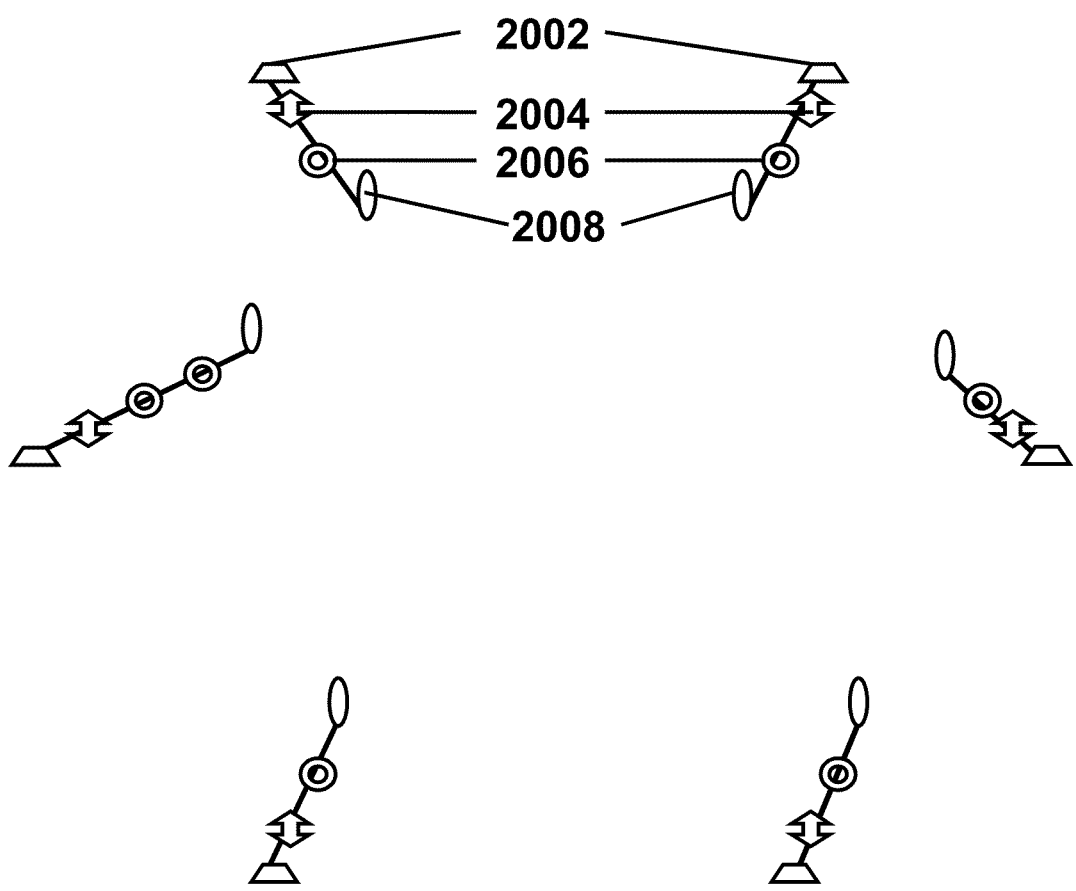
FIGS. 20K to 20N, are schematic top plan views, generally similar to those of FIGS. 10A-10E and 20A to 20J, illustrating a preferred method for deploying floating power generation assemblies of the present invention.
Figure 20L:
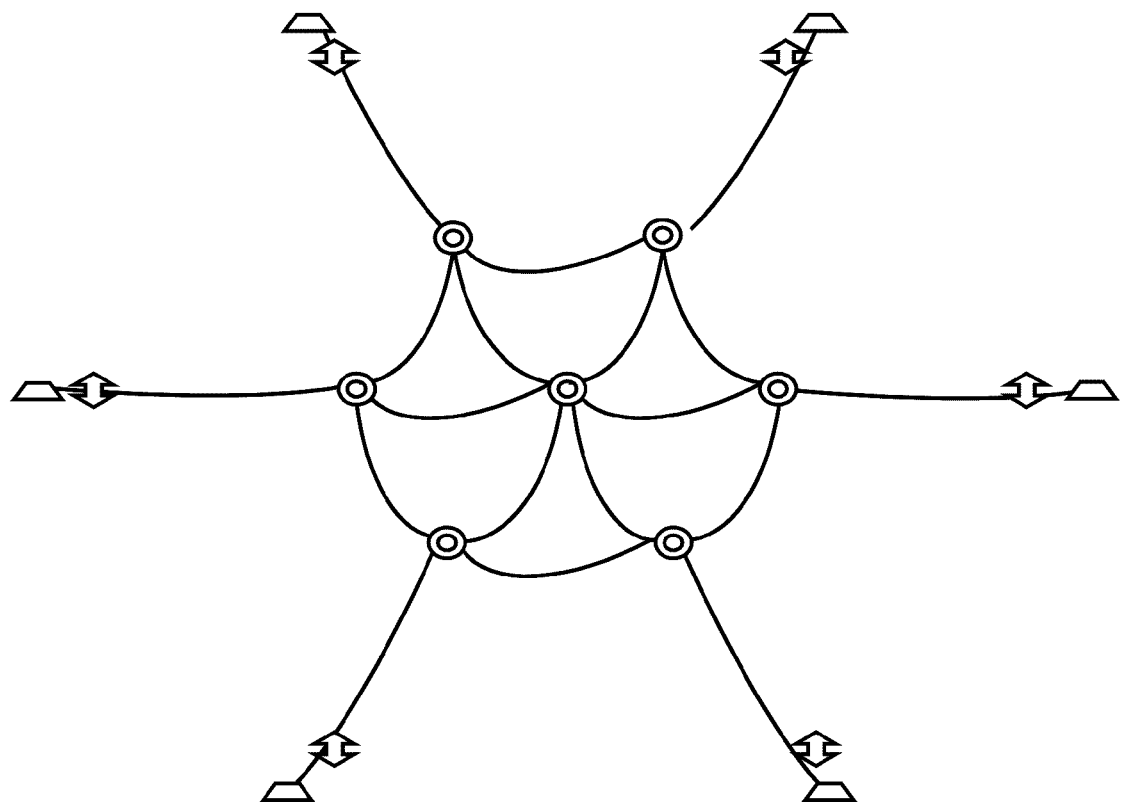

As illustrated in FIG. 20K, the process begins by placing anchors 2002 at the position which they occupy in the final floating power generation assembly. The anchors 2002 are connected by cable portions to cable adjustment devices (typically in the form of winches 2004) which serve to lengthen or shorten their associated cables, temporary connectors 2006 and temporary buoys 2008. (Note that one of the anchors 2002, the left-hand one as illustrated in FIG. 20K, carries two temporary connectors 2006, while the other anchors carry only one each.) In the next step of the process, as illustrated in FIG. 20L, additional cable is paid out from the winches 2004 and the various cables are interconnected so that the temporary connectors 2006 occupy substantially the positions which the floating units 900 will occupy in the final assembly, and the cable network is topologically the same as the final network, though not occupying exactly the same positions. The temporary buoys 2008 are omitted from FIG. 20L for the sake of clarity, but occupy positions closely adjacent their associated temporary connectors 2006 and serve to keep the temporary connectors 2006 and the adjacent portions of the cables close to the water surface.

Figure 20M:
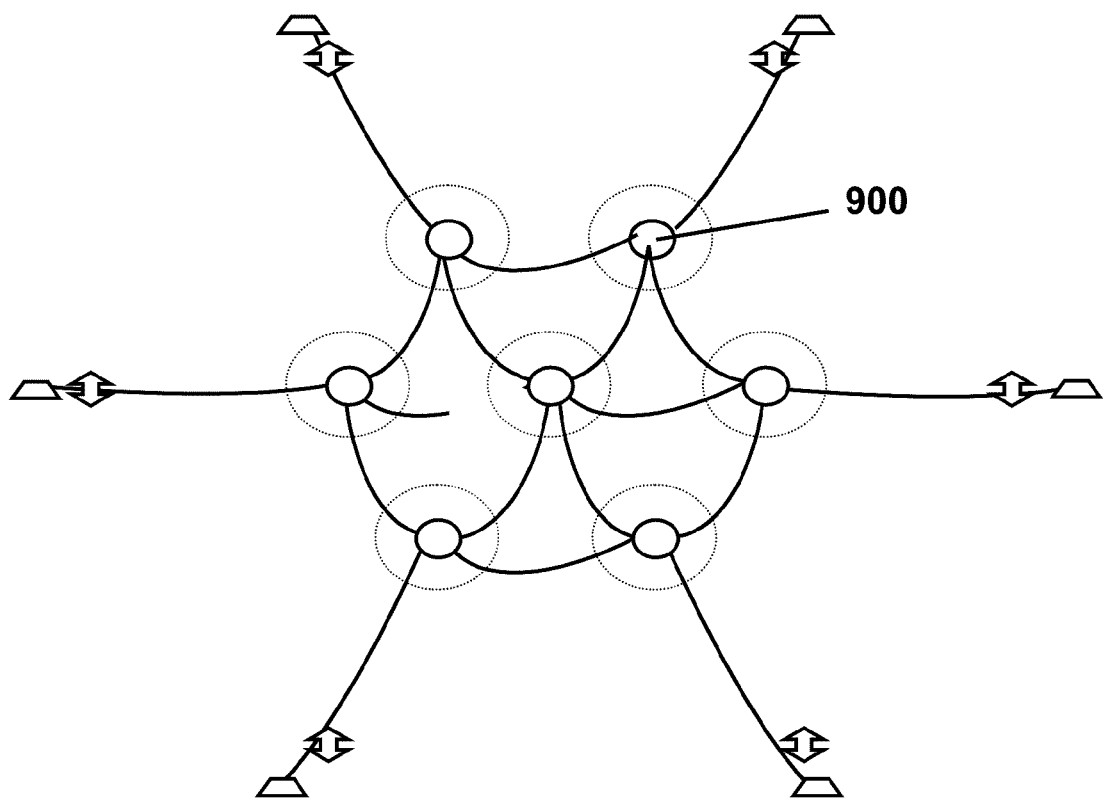
Figure 20N:
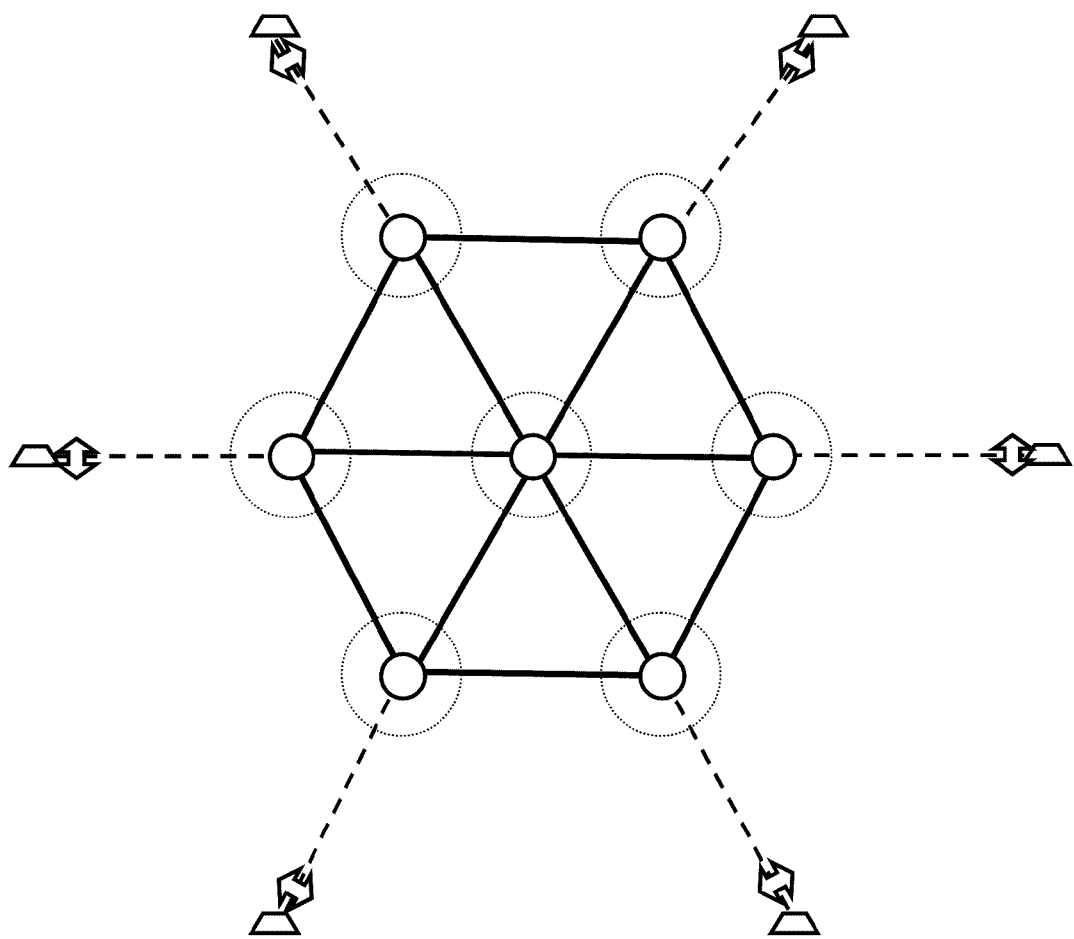

Next, as illustrated in FIG. 20M, the temporary connectors 2006 are replaced by the floating units 900, without substantially changing the geometry of the assembly; the temporary buoys 2008 are also removed at this stage since the buoyancy of the floating units 900 renders the temporary buoys 2008 unnecessary. Finally, as illustrated in FIG. 20N, the winches 2004 are used to shorten the cables so as to provide the necessary tension in the cables and produce the final floating power generation assembly shown in FIG. 20D.

Figure 22B:
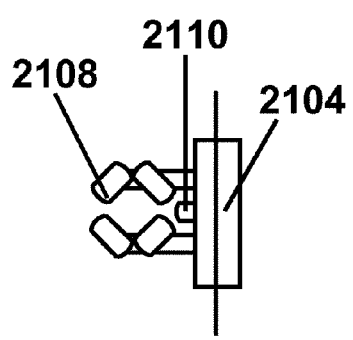
FIG. 22B is a schematic top plan view, similar to that of FIG. 21B, showing the apparatus in the same vertical position as in FIG. 22A with the clamping members in their closed position.
Figure 22C:
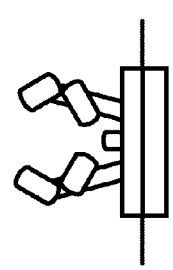
FIG. 22C is a schematic top plan view, similar to that of FIG. 22B, showing the clamping members in their open position.
Figure 23B:
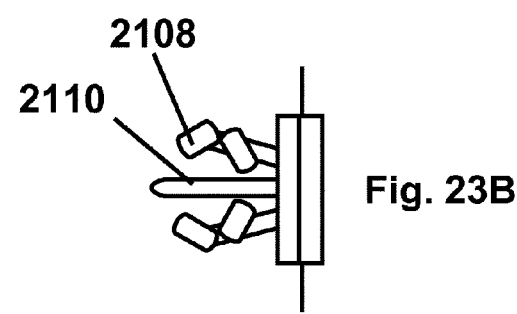
FIG. 23B is a schematic top plan view, similar to that of FIG. 22B, but showing the support beams in the same position as in FIG. 23A.
Figure 23A:
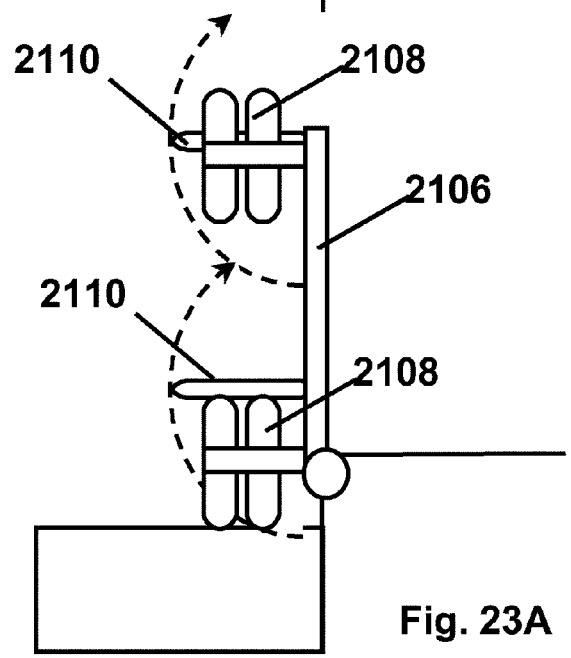
FIG. 23A is a schematic side elevation, similar to that of FIG. 22A, but showing the support beams of the apparatus deployed to support a load.

A preferred deployment process for the floating units 900 will now be described with reference to FIGS. 21 to 23. As shown in FIGS. 21A and 21B, the process uses an apparatus (generally designated 2100) mounted on an open deck 2102 of a vessel (only part of which is shown in FIG. 21A), the apparatus 2100 being pivotable relative to the deck 2102 about a horizontal axis indicated at 2104 adjacent the rear edge of the deck 2102. The apparatus 2100 comprises a base member 2106 having mounted thereof two spaced clamping members 2108, with two support beams 2110. As best seen in FIGS. 22B and 22C, the clamping members 2108 each have two jaws movable relative to each other between a closed position (FIG. 22B) in which they can clamp a unit 900 or 1100, and an open position (FIG. 22C) in which the unit is free to move relative to the clamping members.

As may be seen from FIGS. 21A, 22A, 23A and 23B, the entire apparatus 2100 can be pivoted above axis 2104 between a horizontal position (FIG. 21A) used for transport of a unit, and a vertical position (FIG. 22A) used for loading or deploying a unit. Furthermore, when the clamping members 2108 are in their open position, the support beams 2110 can pivot relative to the base member 2106 between a position in which they lie flat against the base member 2106 (FIG. 22A) to a position in which they extend perpendicular to the base member (FIGS. 23A and 23B) between the open jaws of the clamping members 2108, so that the support beams 2110 can be used to secure and handle the unit 900 or 1100.

Figure 24A:
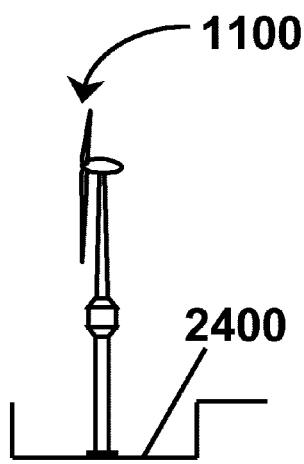
FIGS. 24A to 24D are schematic side elevations showing the manner in which the apparatus shown in FIGS. 21 to 23 is used to load a wind turbine on to a ship for transport to a deployment location.
Figure 24B:
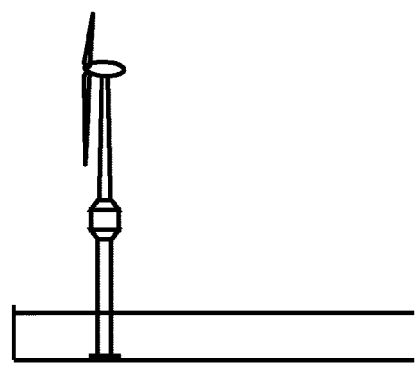
Figure 24C:
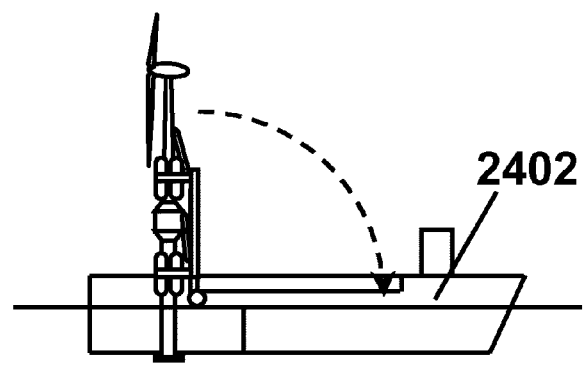
Figure 24D:
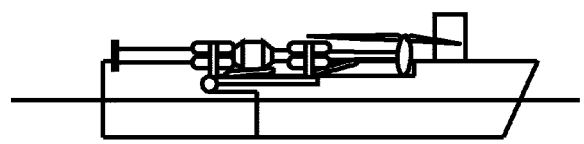
Figure 24E:
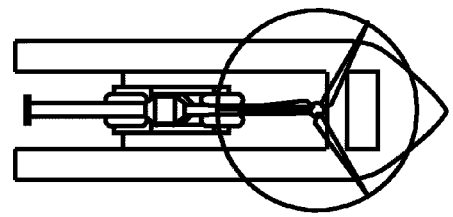
FIG. 24E is a top plan view of the ship and associated apparatus shown in FIG. 24D.

FIGS. 24A to 24E illustrate the manner in which the apparatus 2100 is used to load a unit 1100 on to a vessel for transport to a deployment site. The unit 1100 will normally be constructed in a dry dock 2400 (FIG. 24A). The dry dock is then flooded (FIG. 24B) and the vessel 2402 equipped with the apparatus 2100 is guided into the flooded dock with the apparatus 2100 in its vertical position. The support beams 2110 are attached to, and the clamping members 2108 are clamped around, the unit 1100 (FIG. 24C) and the apparatus 2100 is then lowered to its horizontal position, thereby placing the unit 1100 flat on the deck of the vessel ready for transport to a deployment site (FIG. 24D). FIG. 24E shows a top plan view of the vessel and unit 1100 in this position.

Figure 25A:
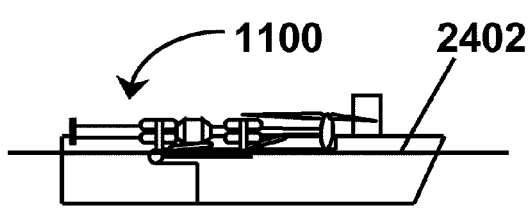
FIGS. 25A to 25D are schematic side elevations, similar to those of FIGS. 24A to 24D, showing the manner in which the apparatus shown in FIGS. 21 to 23 is used to place a wind turbine in a floating position at the site of a floating power generation assembly.
Figure 25C:
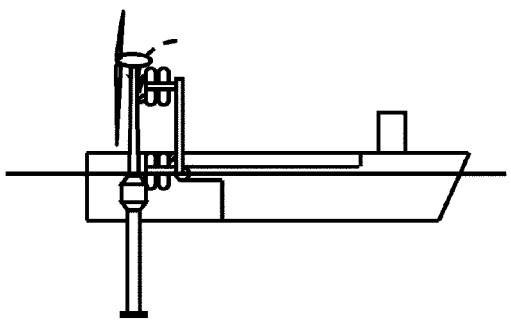
Figure 25B:
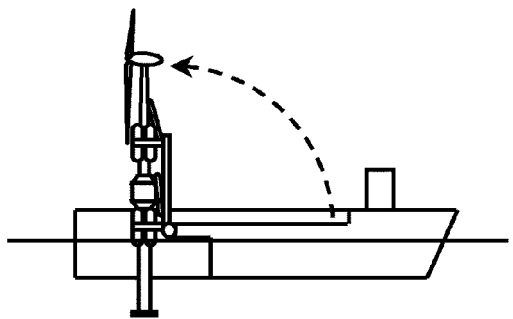
Figure 25D:
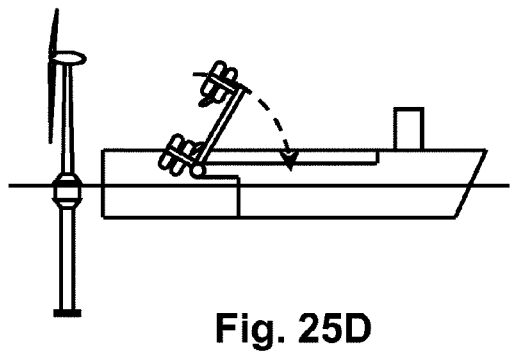

FIGS. 25A to 25D illustrate the deployment of the unit 1100 at the deployment site. FIG. 25A, which is essentially identical to FIG. 24D, shows the vessel and unit arriving on site. The apparatus 2100 and unit 1100 are then raised to a vertical position (FIG. 25B). The ballast tanks within the unit 1100 are then partially filled to adjust the buoyancy of the unit, the support beams 2110 are unlocked and the clamping members 2108 opened, and the ballast tanks further filled to achieve the correct deployment depth for the unit 1100 (FIG. 25C). The unit 1100 is now floating free of the vessel, which is moved away from the floating unit and the apparatus 2100 returned to its horizontal position on the deck (FIG. 25D). Retrieval of the unit 1100 can be achieved by reversing this deployment process.

The deployment process of the present invention has several advantages over conventional deployment processes using marine cranes. During the stage of the deployment process in which the floating unit is moved from a horizontal position on a deck to a floating position, the great weight of the unit is applied to a lifting pivot which is significantly lower than that of the top of a crane capable of effecting the same operation, and this lower pivot position renders the present deployment process more suitable to be carried out in rough and calm seas. The lower pivot position also constrains the effective center of gravity of the unit relative to the vessel during lifting, thus minimizing the reduction in vessel stability and vessel motion experienced during such lifting, as compared with crane-based deployment of such a heavy floating unit. The unit can be lowered to the desired floating position by gradual filling of its ballast tanks, thus continuously maintaining the buoyancy balance of the unit and ensuring a "soft landing". For similar reasons, the retrieval process is also simpler as compared to a process using a crane.

FIGS. 26A, 26B and 26C illustrate a modification of the process shown in 25A to 25D using an external floatation device 2600, which may be used when the unit being deployed is not sufficiently buoyant in its raised (vertical) position. As shown in FIG. 26A, the external floatation device is placed around, and clamped to, the subsurface section of the unit 1100 while the unit is still in its horizontal position on a deck; it may be convenient to place the external floating device on the unit before the unit is loaded on to the vessel.

The unit is raised to its vertical position with the device 2600 still attached (FIG. 26B), but when the buoy reaches buoyancy equilibrium after partial filling of its ballast tanks, the clamps holding the device 2600 open and the device floats free of the unit 1100 (FIG. 26C). Although not shown in FIGS. 26A, 26B and 26C, the device 2600 is desirably connected to the vessel by a cable of similar device to enable it to be retrieved from the water once the unit 1100 is floating free.

Figure 27G:
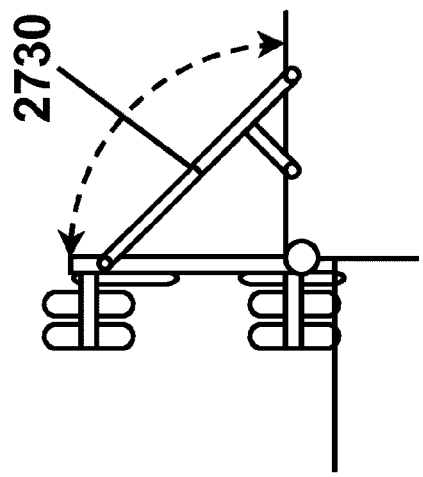
Figure 27F:
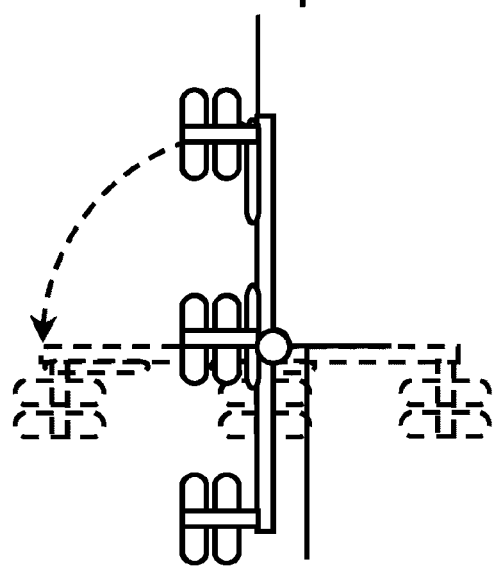
Figure 27E:
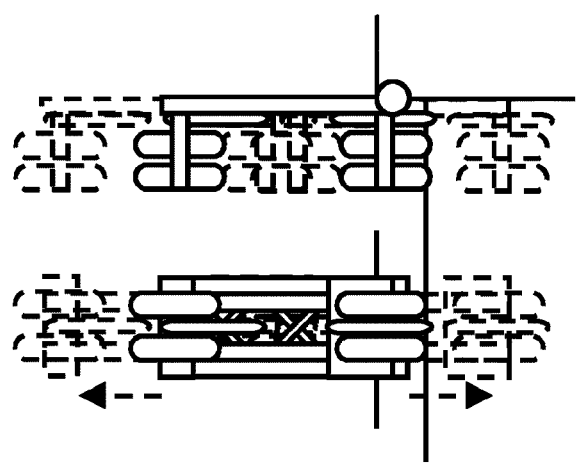

Numerous variations in the form of the apparatus 2100 are possible, and several are illustrated in FIGS. 27A to 27G. FIGS. 27A and 27B illustrate a modified apparatus 2700 in which one clamping member 2708A is movable relative to the base member and to the other clamping member 2708B, thus allowing the spacing between the two clamping members to be varied and the apparatus 2700 to handle floating units of differing lengths. FIGS. 27C and 27D illustrate a modified apparatus 2710 having a pivot 2714 which is adjustable vertically relative to the deck of the vessel, thereby allowing apparatus 2710 to handle floating units having differing buoyancy centers. FIG. 27E shows a further modified apparatus in which the base member can be translated relative to the pivot axis so that the clamping members and the support beams can move vertically during deployment or retrieval of a floating unit. FIG. 27F illustrates a modified apparatus comprising three spaced clamping members, one of which is disposed a substantial distance below the water surface when the apparatus is raised to its vertical position; this submerged clamping member provides additional support for the subsurface section of the floating unit being deployed. Finally, FIG. 27G illustrates a further modified apparatus in which a hydraulic support 2730 is provided between the deck and the base member to provide supplementary lifting force.

In the various floating power generation assemblies shown in FIGS. 10 and 20, the floating units 900 are arranged in equilateral triangles. This is, however, not an essential feature of the power generation assemblies; arranging the floating units in equilateral triangles maximizes the number of floating units per area of water surface, but non-equilateral triangles or other polygons, especially quadrilaterals may be desirable to allow for particular circumstances. In particular, when a floating power generation assembly is in a location where the winds are predominantly from one direction, it has been found advantageous to distort equilateral triangle based arrangements such as those shown in FIGS. 10 and 20 by extending the arrangements along the prevailing wind direction. In theory, the floating units should be arranged so that they do not shade one another ("shading" refers to the tendency of an upwind floating unit to reduce the power output of a downwind floating unit) when the wind is in the prevailing direction. In practice, this is essentially impossible to realize, since even in areas where the winds are unusually constant in direction, for example areas where trade winds blow all year, the "prevailing wind direction" will actually be a range of (say) 45 degrees. Accordingly, in practice it is desirable to arrange the floating units so that the distances between units are larger along directions close to the prevailing wind direction. Examples of assemblies based on distorted equilateral triangles are shown in FIGS. 28A and 28B.

Figure 28A:
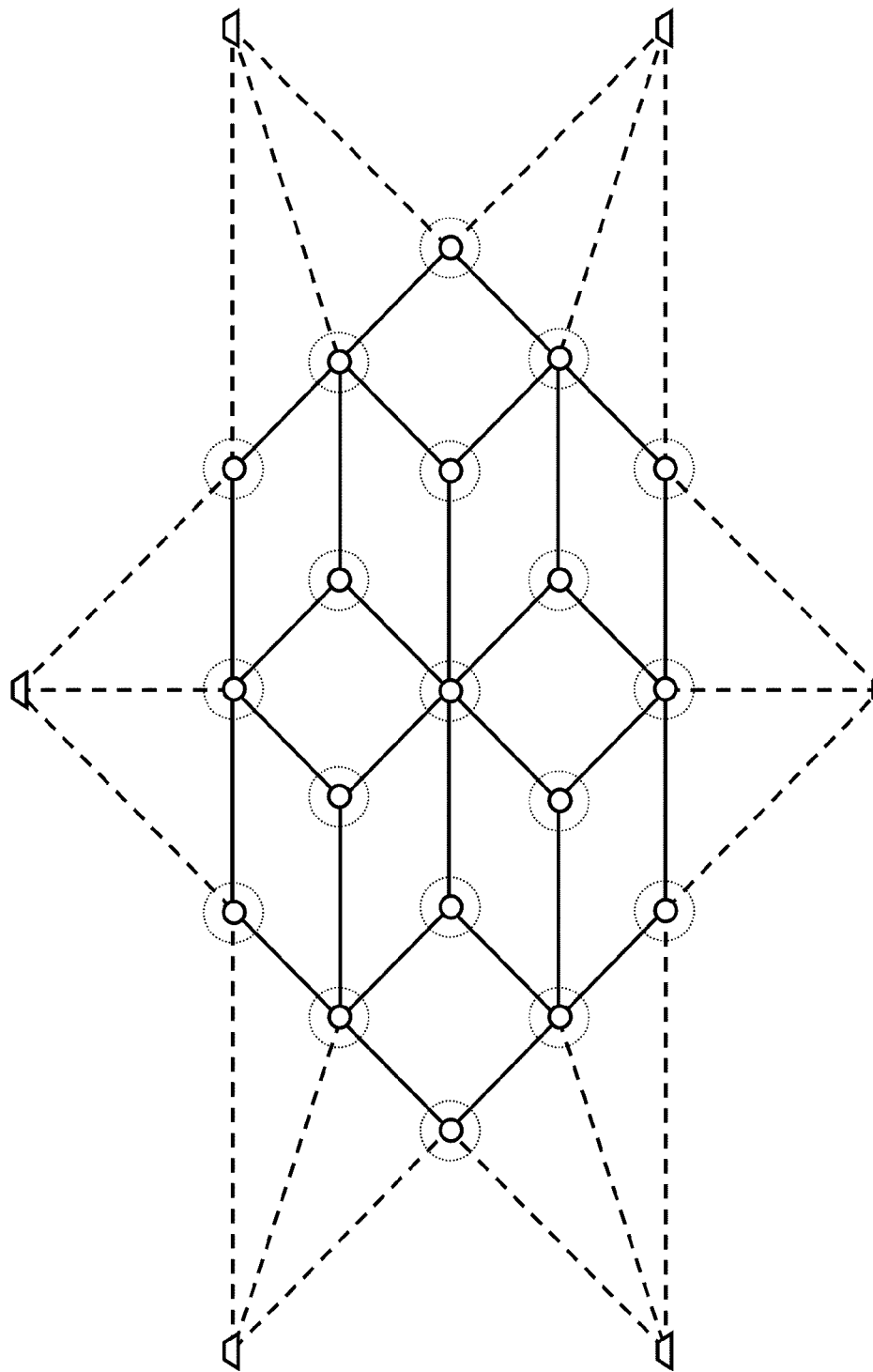
FIGS. 28A and 28B show forms of the floating power generation assemblies of the present invention modified to take advantage of locations where the wind is known to be predominantly in one direction.
Figure 28B:
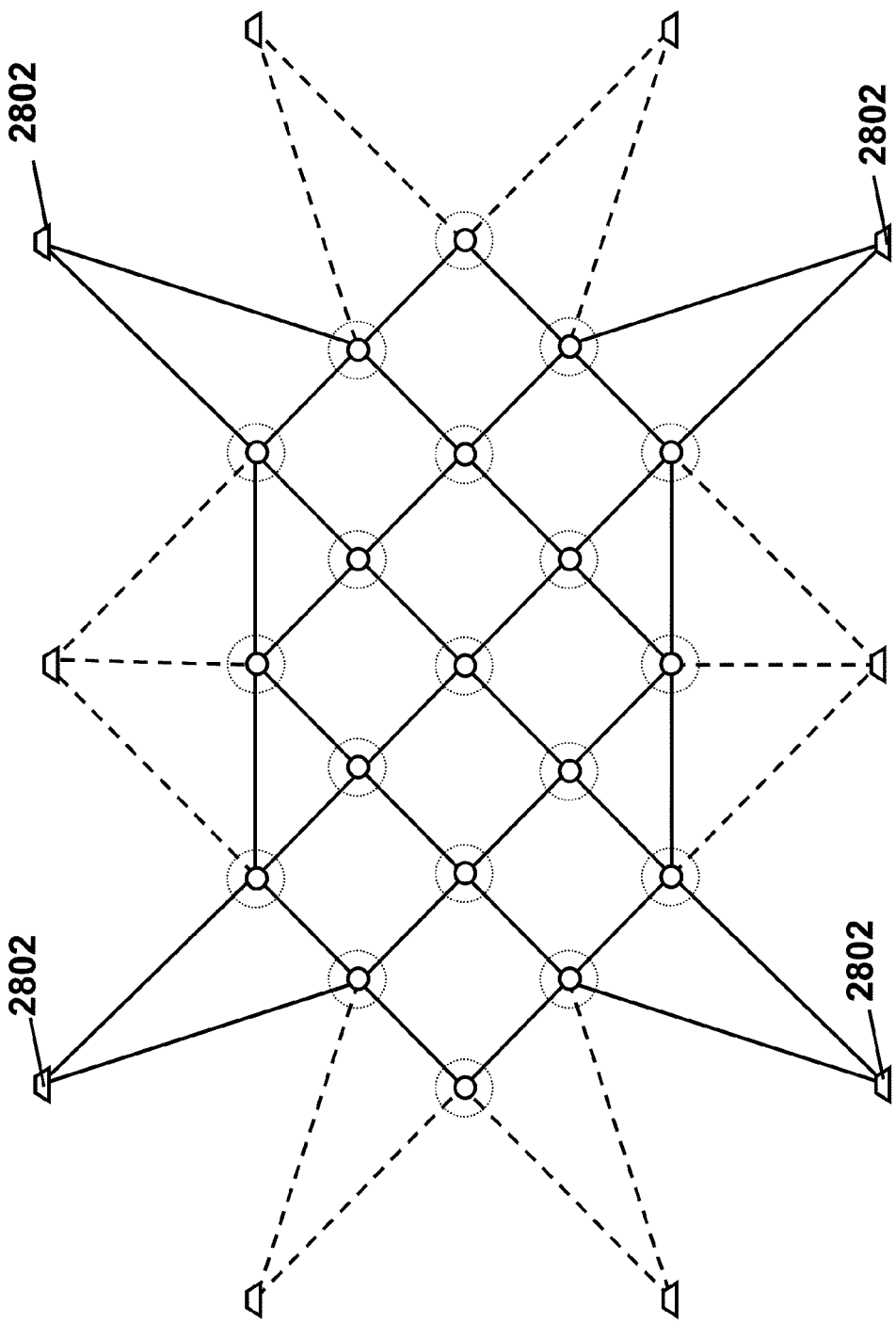

FIG. 28A shows a variant of the 6 anchor, 19 floating unit assembly shown in FIG. 20G modified to allow for a prevailing wind which, for purposes of illustration, is assumed to blow horizontally across the drawing (allowance being made of course for the landscape orientation of the drawing as presented). To allow for the prevailing wind, the assembly is stretched approximately 50 percent along the prevailing wind direction, so that the adjacent floating units are separated by six times the blade diameter in the direction of the prevailing wind but by only four times the blade diameter perpendicular to this direction. This increased spacing between floating units parallel to the prevailing wind direction reduces the "shading" effect of one floating unit on an adjacent downstream floating unit.

Assemblies such as those shown in FIG. 28A, in which the spacing between adjacent floating units is increased along the prevailing wind direction, may have open angles greater than 120 degrees. Such large open angles tend to make the assembly more vulnerable to disruption by weather. Depending upon the expected weather conditions at the location of the assembly, it may be desirable to provide additional anchors to increase assembly stability and to reallocate some cables to eliminate large open angles. For example, FIG. 28B shows a modified form of the assembly of FIG. 28A provided with four additional anchors 2802, and with several cables attached to these anchors 2802 reallocated to remove large open angles.

Figure 29A:
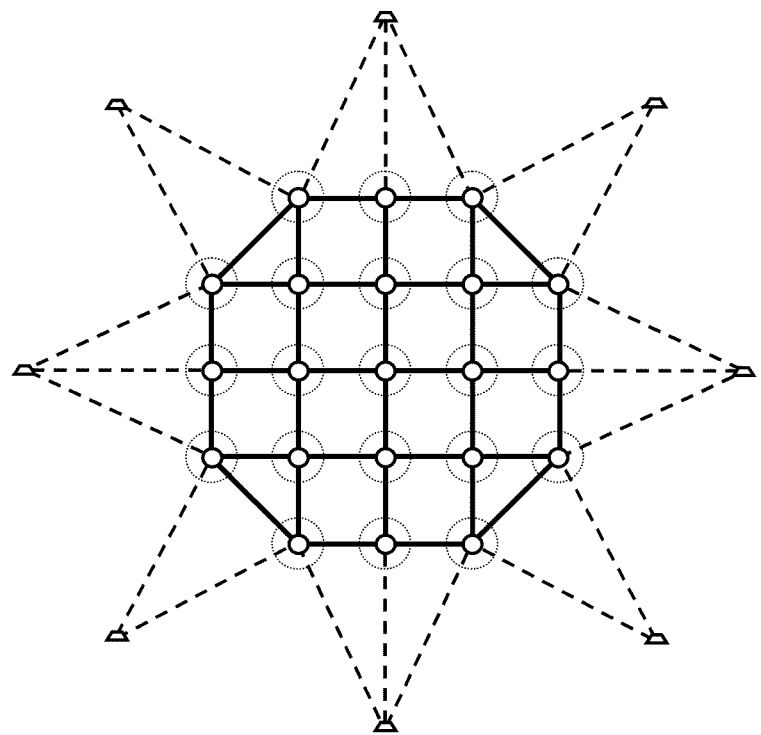
FIGS. 29A to 29C show forms of the floating power generation assemblies of the present invention in which the floating units are arranged in quadrilaterals.
Figure 29B:
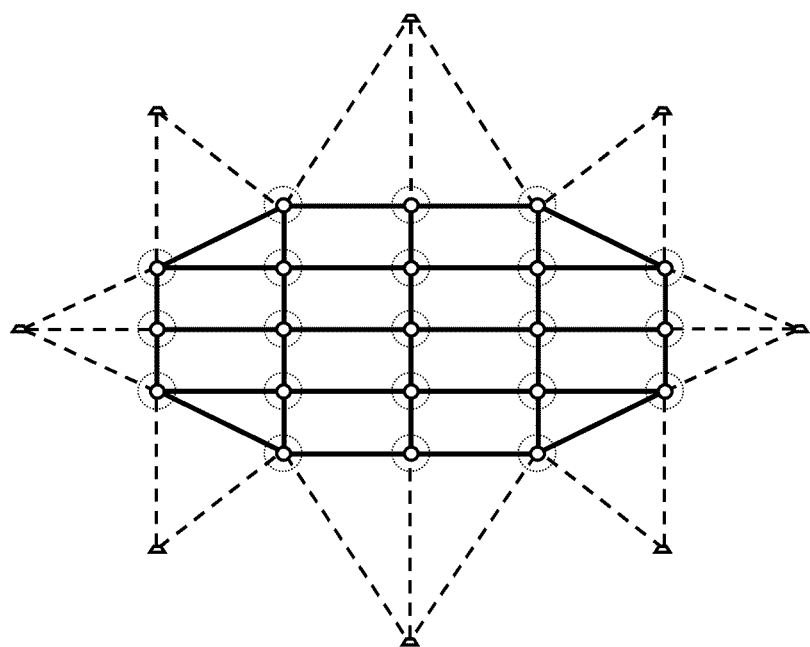
Figure 29C:
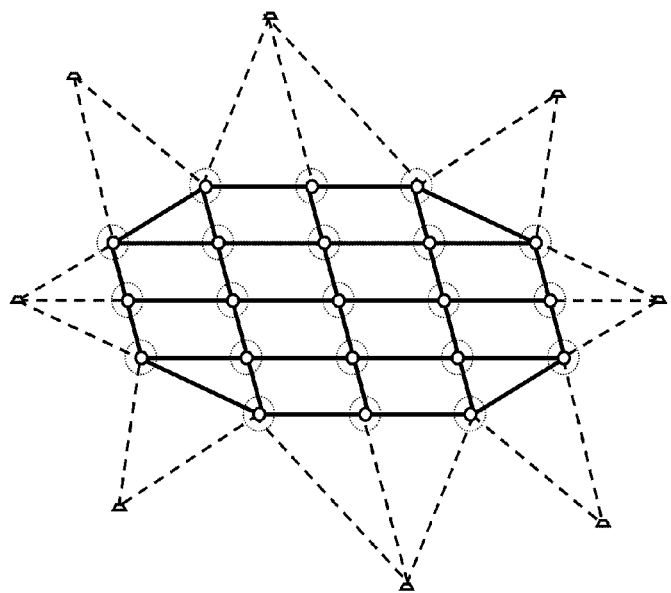

As already mentioned, the floating units used in the floating power generation assemblies of the present invention need not be arranged at the vertices of triangles but may be arranged at the vertices of a quadrilateral, preferably a rectangle or square. FIGS. 29A-29C illustrate assemblies of this type. FIG. 29A illustrates an assembly comprising eight anchors and 21 floating units, the floating units essentially being arranged in a modified 5×5 array with the corner units omitted, so that the floating units are arranged at the vertices of ten squares and four right angled triangles. FIG. 29B illustrates a modified version of the assembly of FIG. 29A which has been distorted in the same manner as the assembly shown in FIG. 28B, i.e., the assembly of FIG. 29B is produced by elongating the assembly of FIG. 29A in the horizontal direction, which is assumed to be the direction of the prevailing wind. The assembly of FIG. 29C is also produced by elongating the assembly of FIG. 29A, but this time in a diagonal direction so that the floating units in FIG. 29C are actually arranged at the vertices of parallelograms rather than squares (as in FIG. 29A) or rectangles (as in FIG. 29B).

Figure 30A:
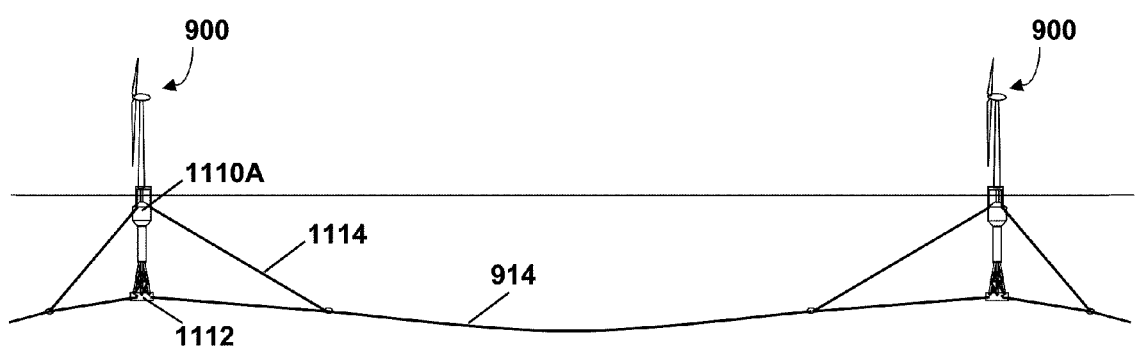
FIGS. 30A to 30C show various cable arrangements which may be used in floating power generation assemblies of the present invention.
Figure 30B:
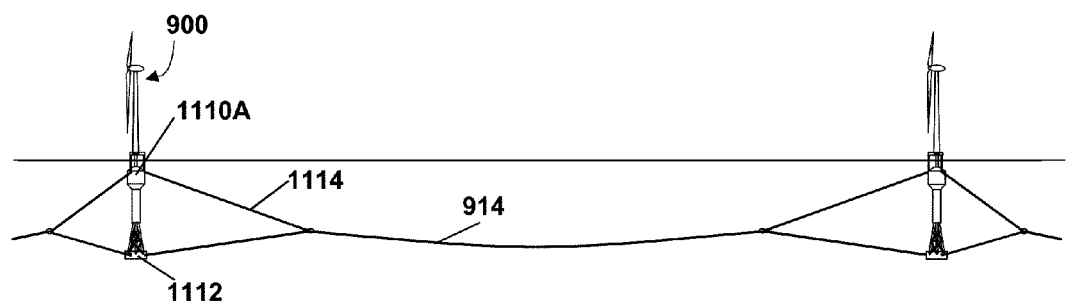
Figure 30C:
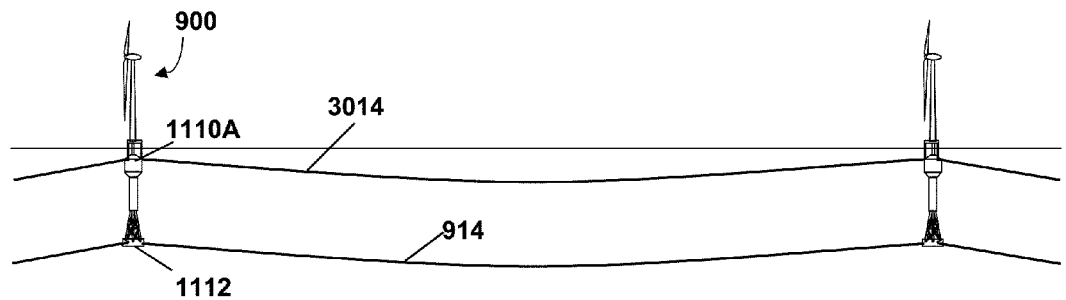

FIGS. 30A to 30C illustrate various possible forms of the auxiliary cables previously discussed with reference to FIG. 11. FIG. 30A shows two interconnected floating units 900 interconnected via a main cable 914 and auxiliary cables 1114. The arrangement of the main cables and auxiliary cables in FIG. 30A is the same as in FIG. 11; the main cable 914 interconnects the base sections 1112 of the two floating units 900, while the auxiliary cables 1114 extend from the main cable 914 to the central cylindrical sections 1110A of the floating units 900.

In the modified assembly shown in FIG. 30B, the arrangement of the main cable 914 and the auxiliary cables 1114 is similar to that shown in FIG. 30A, but the length of the auxiliary cables 1114 has been adjusted such that the auxiliary cables pull the portions of the main cable 914 to which the auxiliary cables 1114 are attached upwardly. Depending upon the length in the auxiliary cables 1114, the points of attachment of the auxiliary cables 1114 to the main cable 914 may be located about halfway between the base sections 1112 and the cylindrical sections 1110A of the floating units 900.

Finally, FIG. 30C illustrates a different type of auxiliary cable, identified as 3014. This type of auxiliary cable 3014 is not connected to the main cable 914 but extends directly between the cylindrical sections 1110A of two adjacent floating units 900, running essentially parallel to but above the main cable 914. This type of auxiliary cable 3014 may provide reduced wave induced motions of the units (900) by setting the lengths of cables 914 and 3014 appropriate to the primary wave characteristics for which to minimize motions.

This also provides a more robust connection between the floating units 900 but does have the disadvantage that if the floating assembly is in an area through which vessels may need to pass, the auxiliary cable 3014 allows only a limited draft for such vessels.

Figure 31A:
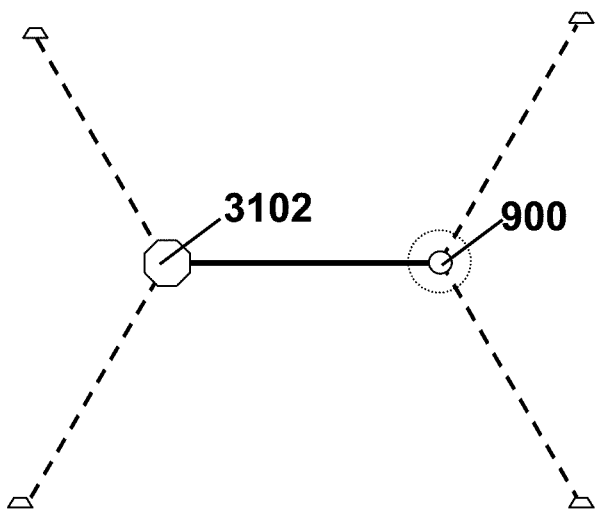
FIGS. 31A and 31B show floating power generation assemblies of the present invention which use power generating floating units in association with non-power generating floating units.
Figure 31B:
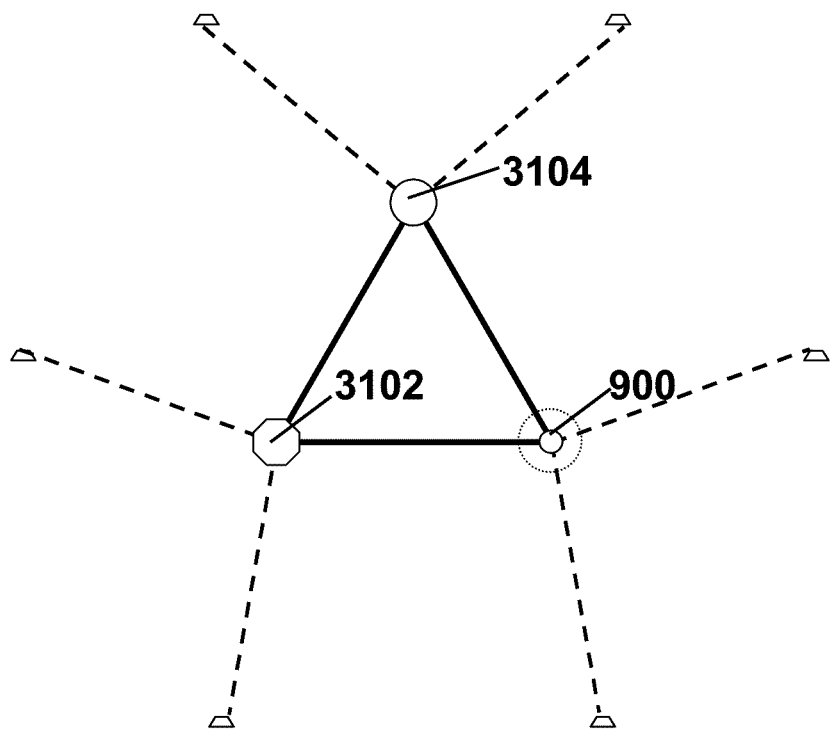

FIGS. 31A and 31B illustrate floating assemblies of the present invention which combine power generating and non-generating floating units and are intended primarily for research and surveillance purposes. The assembly shown in FIG. 31A comprises four anchors, a power generating floating unit 900 and a helicopter deck unit 3102. The assembly shown in FIG. 31B comprises six anchors, a power generating floating unit 900, a helicopter deck unit 3102, and a radar unit 3104, with the three units 900, 3102 and 3104 being arranged in an equilateral triangle and each connected to two anchors.

Figure 32:
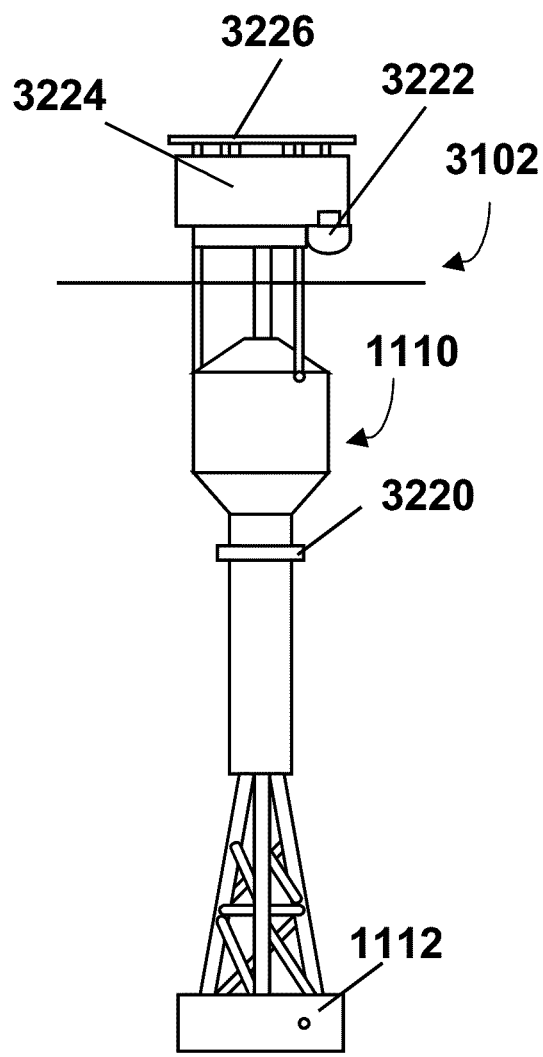
FIGS. 32 and 33 show two types of non-power generating floating units used in the assemblies of FIGS. 31A and 31B.
Figure 33:
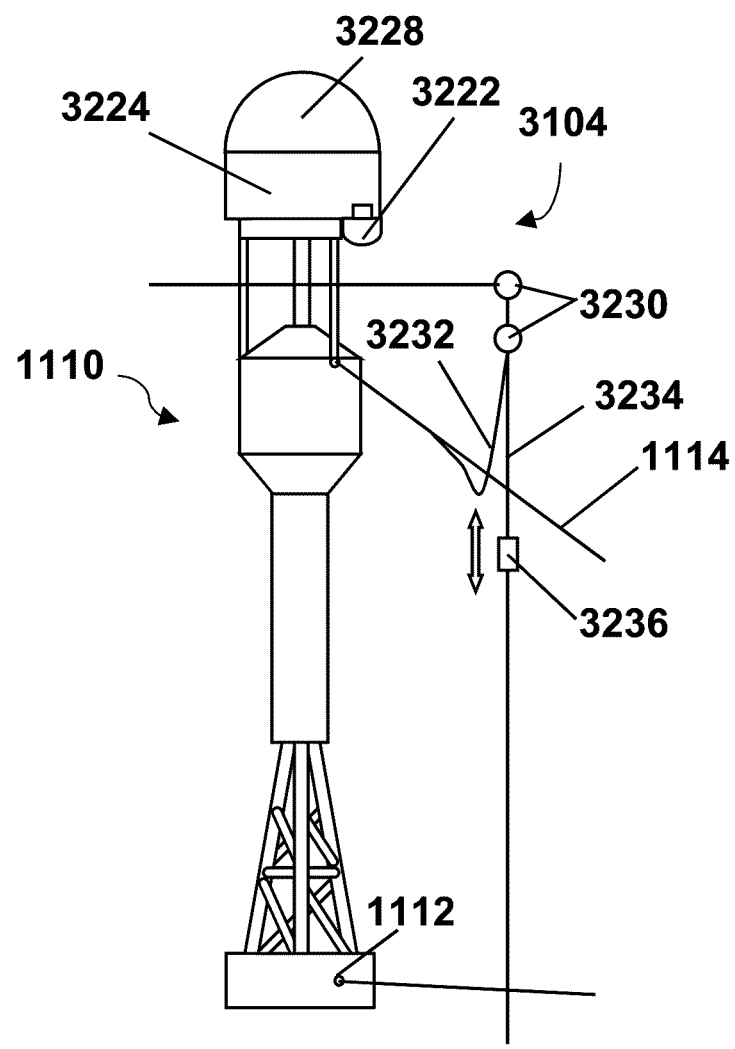

FIGS. 32 and 33 are enlarged side elevations of the units 3102 and 3104 respectively shown in FIGS. 31A and 31B. The submerged part of each of the units 3102 and 3104 closely resembles that of the floating unit 1100 shown in FIG. 11 and is labeled accordingly. The submerged part of the helicopter deck unit 3102 is provided with a submersible docking station 3220. Above the water line, both units 3102 and 3104 are provided with a small vessel dock 3222 and with laboratory or work space 3224. The flat upper surface of unit 3102 forms a helicopter deck 3226.

The upper part of unit 3104 comprises a radar or communications dome 3228. In addition, unit 3104 is provided with a sensor unit which comprises floats 3230 tethered by a cable 3232 to an auxiliary cable 1114, as described above with reference to FIG. 11. A rod or cable 3234 hangs down from the floats 3230 and carries one or more sensor units 3236 (only one such unit is shown in FIG. 33); these sensor units 3236 may measure wave motion (as indicated by the double arrow in FIG. 33), water temperature and salinity, currents and any other desired parameters. Additional sensors or sensor units may be provided on the main and auxiliary cables if desired, and all sensors can feed back to instruments in the laboratory space 3224.

It will be appreciated that the provision of the various auxiliary structures such as the submersible docking station, vessel dock and sensor units on the units 3102 and 3104 is highly variable and that any of the auxiliary structures can be provided on either unit. Indeed, by enlarging the deck 3226, it might be possible to provide both a helicopter deck and a radar or communications dome, thus essentially combining the functions of the units 3102 and 3104.

The TLP assemblies of the present invention will now be discussed. As already indicated, such TLP assemblies are essentially a modification of the power generation assemblies or wind farms described in the aforementioned U.S. Pat. No. 7,293,960, with some or all of the floating units having the form of tension leg platforms. Accordingly, the TLP assemblies of the present invention may include any of the optional features of the floating units described in this U.S. patent.

Figure 34:
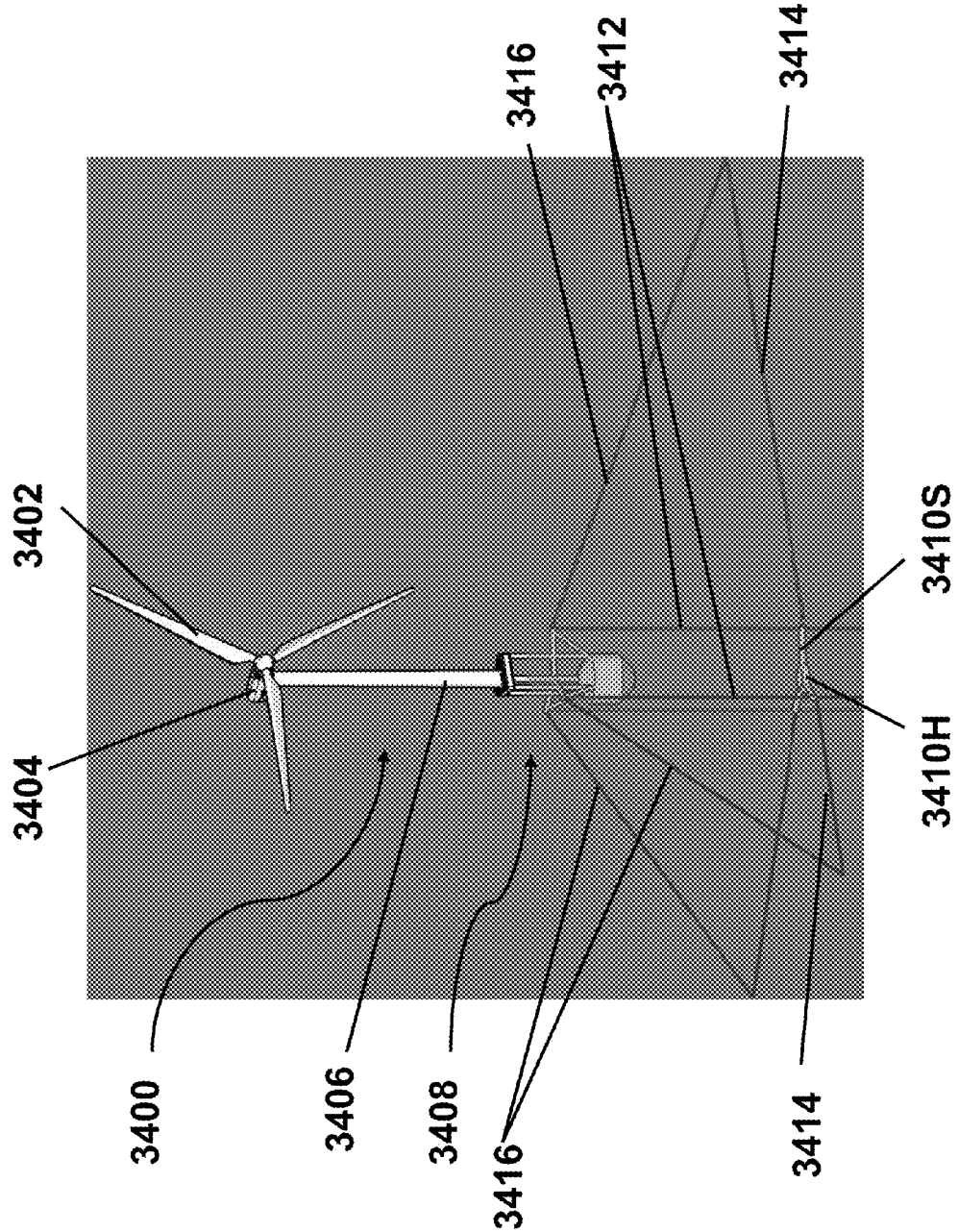
FIG. 34 is a schematic perspective view from above, in front and to one side of a tension leg platform unit which may be used in the TLP assemblies of the present invention.

FIG. 34 of the accompanying drawings is a schematic perspective view from above, in front and to one side of a tension leg platform unit (generally designated 3400) which may be used in the TLP assemblies of the present invention. The unit 3400 comprises a rotor 3402 comprising a plurality of blades (three are illustrated) and mounted on a hub (or nacelle) 3404 for rotation about a horizontal axis sufficiently far above the water that the rotor blades do not contact the water as they rotate; indeed, to ensure that the rotor blades receive the full velocity of the wind unhindered by surface drag, it is desirably that the rotor blades have, at their lowest point, at least 15 meters clearance above water level. The hub 3404 houses a generator (or other form of power take off system, not shown) and is supported on a tower or mast 3406. Units comprising a rotor and a hub containing a generator are available commercially, and the commercial units can readily be employed in wind farms of the present invention. The commercial units are already provided with means (not shown) to keep the rotor facing the wind, and with a rotation joint (also not shown) located a short distance below the hub to enable the hub and rotor to turn on a fixed mast, thus minimizing the weight which has to rotate as the rotor turns to face the prevailing wind.

Thus far, the construction of the unit 3400 is conventional. However, instead of being secured to a rigid support, either land or sea bed, the unit 3400 is as a tension leg platform for anchoring in deep water. As shown in FIG. 34, the unit 3400 further comprises a floatation section (generally designated 3408), which is described below in more detail with reference to FIG. 35. The unit 3400 also comprises a cable mounting section having an annular hub 3410H from which extend at 120° intervals three legs or spokes 3410S; the number of spokes or legs and the angles between adjacent spokes or legs may of course vary widely depending upon the exact form of the TLP assembly. (This cable mounting section 3410 may be of alternate structural design suitable to maintain the relative positions of the TLP cable connections to it, for example a set of three beams configured as a equilateral triangle with the TLP cables 3412 connected at each corner.) Three first or TLP cables 3412 extend vertically downwardly from the floatation section 3408, pass through and are secured to the outer ends of the spokes 3410S, and thence extend vertically downwardly to TLP anchors (not shown), which anchor the lower ends of the cables 3412 to the sea bed in the same way as in a conventional tension leg platform, for example by gravity anchors and/or suction piles. Three lower assembly cables 3414 extend outwardly and slightly upwardly from the outer ends of the spokes 3410S, while three upper assembly cables 3416 extend outwardly and downwardly from the floatation section 3408. As discussed in more detail below, the lower and upper assembly cables 3414 and 3416 are joined to each other at points distant from the unit 3400.

Figure 35:
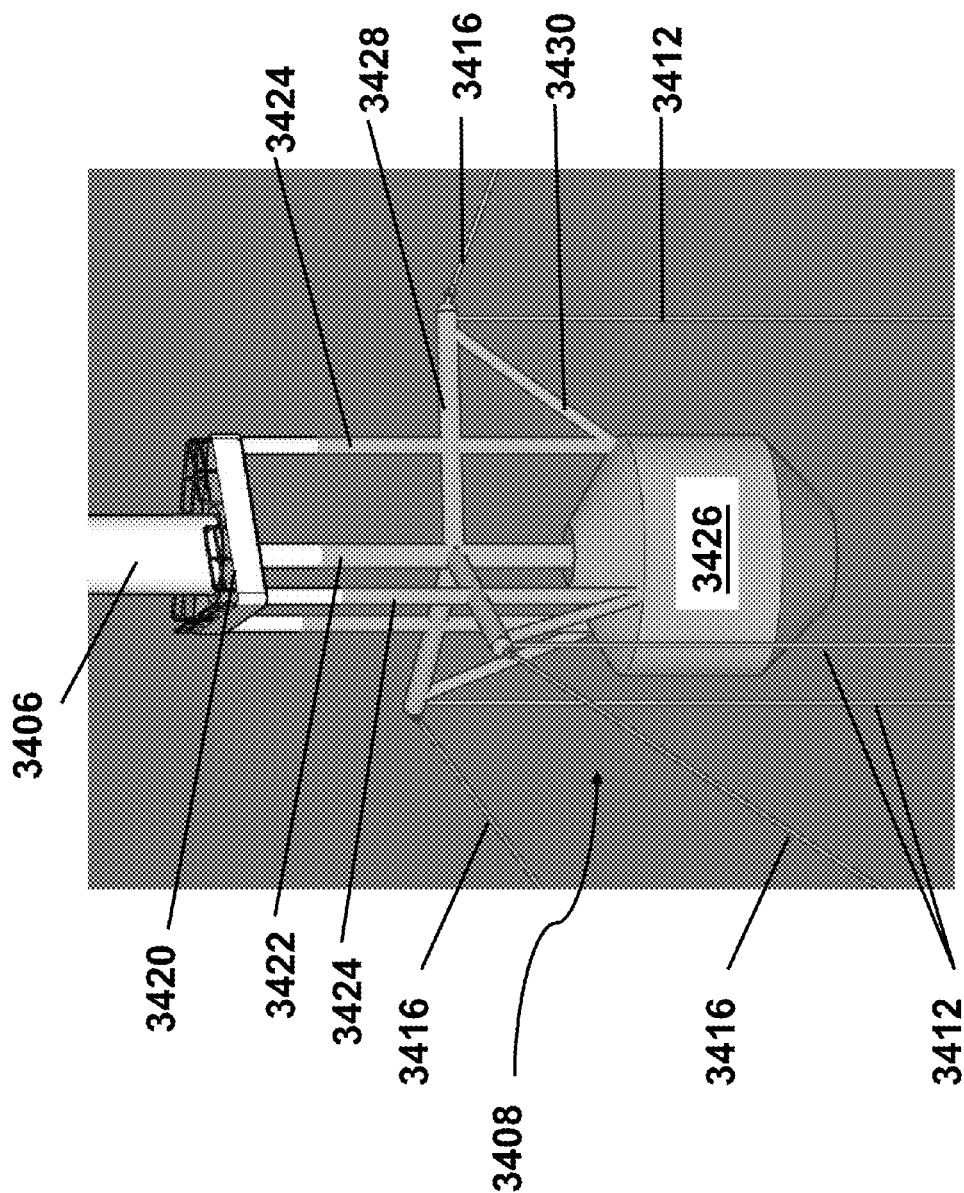
FIG. 35 is an enlarged schematic perspective view from above and to one side of the floatation section of the TLP unit shown in FIG. 34.

As shown in FIG. 35, which is a schematic perspective view from above and to one side of the floatation section 3408 shown in FIG. 34, the floatation section 3408 comprises a triangular platform 3420, which supports the mast 3406. A central support member 3422 and three outer support members 3424 extend vertically downwardly from the center and the vertices respectively of the triangular platform 3420, and pass through the water surface. The provision of the vertical support members 3422 and 3424 reduces the cross-section of the floatation section 3408 at the water line and hence reduces the susceptibility of the unit 3400 to wave action; cf. U.S. Pat. No. 7,293,960, FIGS. 13A, 13B, 14A and 14B and the paragraph bridging columns 13 and 14 of the description. The lower ends of the vertical support members 3422 and 3424 are fixedly secured to a hollow floatation chamber 3426, which provides the buoyancy for the TLP unit 3400. As shown in FIG. 35, the floatation chamber 3426 has substantially the form of an oblate cylinder surmounted at both ends by frusto-conical sections which taper inwardly away from the central cylindrical section. The central support member 3422 is fixedly secured to the flat upper surface of the upper frusto-conical section, while the outer support members 3424 are fixedly secured to the outer edges to the upper frusto-conical section adjacent its junction with the central cylindrical section.

Three horizontal cable attachment struts 3428 extend horizontally outwardly at 120° intervals from the central support member 3422 (again, the number of and angles between these struts may vary widely depending upon the exact structure of the TLP assembly in which they are to be used), and are connected to and pass outwardly beyond the outer support members 3424. To prevent excessive flexing of the outer portions of cable attachment struts 3428 under the substantial loads imposed thereon, braces 3430 extend upwardly and outwardly from the junctions of the outer support members 3424 and the floatation chamber 3426, and are connected to the cable attachment struts 3428 adjacent the outer ends of these struts. One TLP cable 3412 is connected to the underside of each strut 3428 adjacent the outer end of the strut, while one upper assembly cable 3416 is connected to an eyelet provided at the outer end of each strut 3428.

Figure 36:
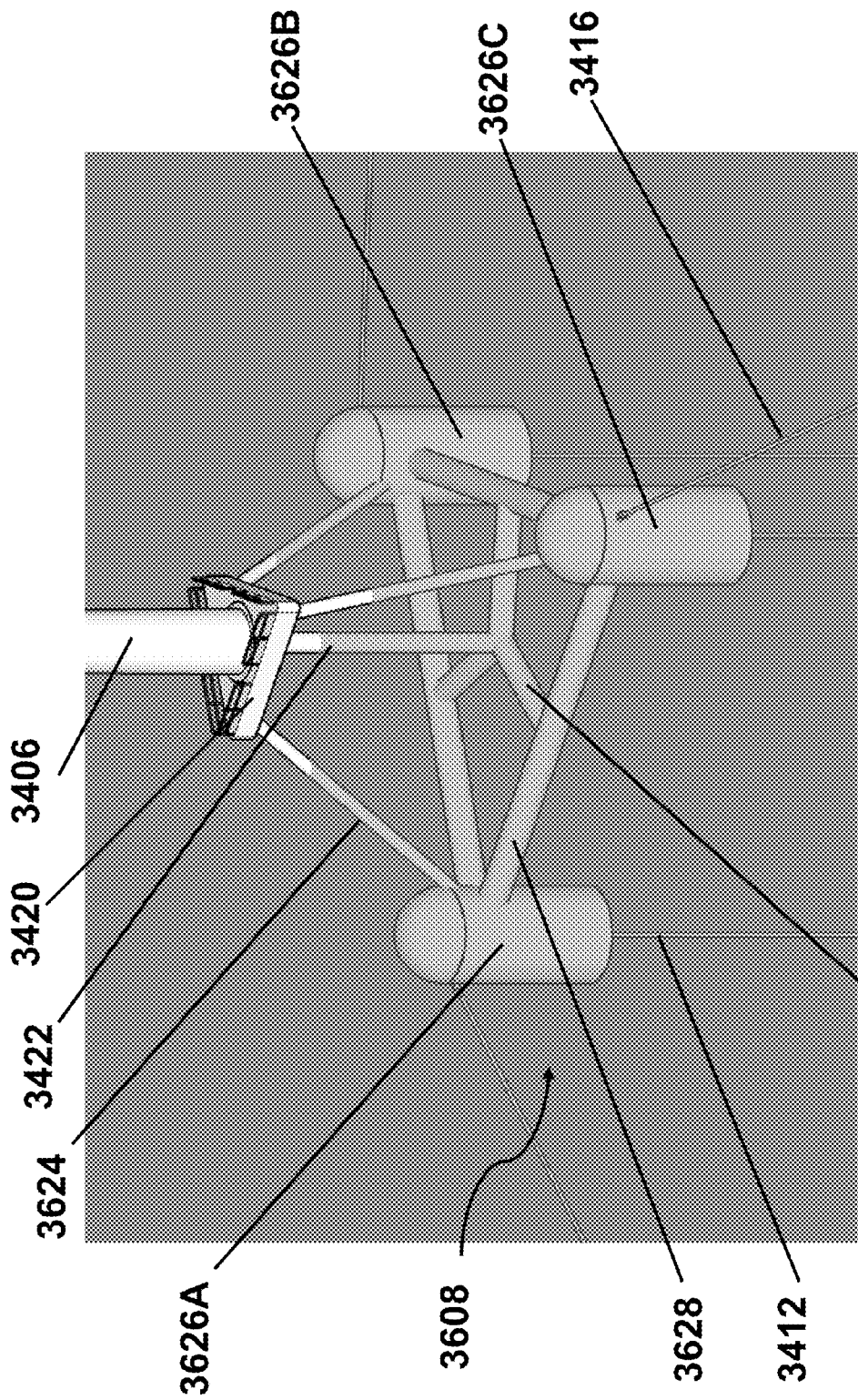
FIG. 36 is a view, similar to that of FIG. 35, of a modified floatation section which may be substituted for the corresponding section shown in FIGS. 34 and 35.

FIG. 36 is a view, similar to that of FIG. 35, of a modified floatation section (generally designated 3608) which may be substituted for the corresponding section 3408 shown in FIGS. 34 and 35. From FIG. 36, it will be seen that in the modified floatation section 3608, the mast 3406 is again mounted on a triangular platform 3420, which has a central support member 3422 extending vertically downwardly from its center. However, in the floatation section 3608, outer support members 3624 extend downwardly and outwardly from the vertices of the triangular platform 3420. Also, in the floatation section 3608, the single floatation chamber 3426 of the floatation section 3408 shown in FIG. 35 is replaced by three separate floatation chambers 3626A, 3626B and 3626C, each of which has a prolate cylindrical section surmounted by a hemispherical section. The chambers 3626A, 3626B and 3626C are held spaced from one another at the same depth below the water surface and at the vertices of an equilateral triangle by retaining members 3628. From the center of each retaining member 3628 a horizontal support strut 3630 extends inwardly and is connected to the lower end of the central support member 3422. The TLP cables 3412 are attached to the centers of the circular bases of the chambers 3626A, 3626B and 3626C, while the upper assembly cables are attached adjacent the upper ends of the cylindrical sections of the chambers.

Figure 37:
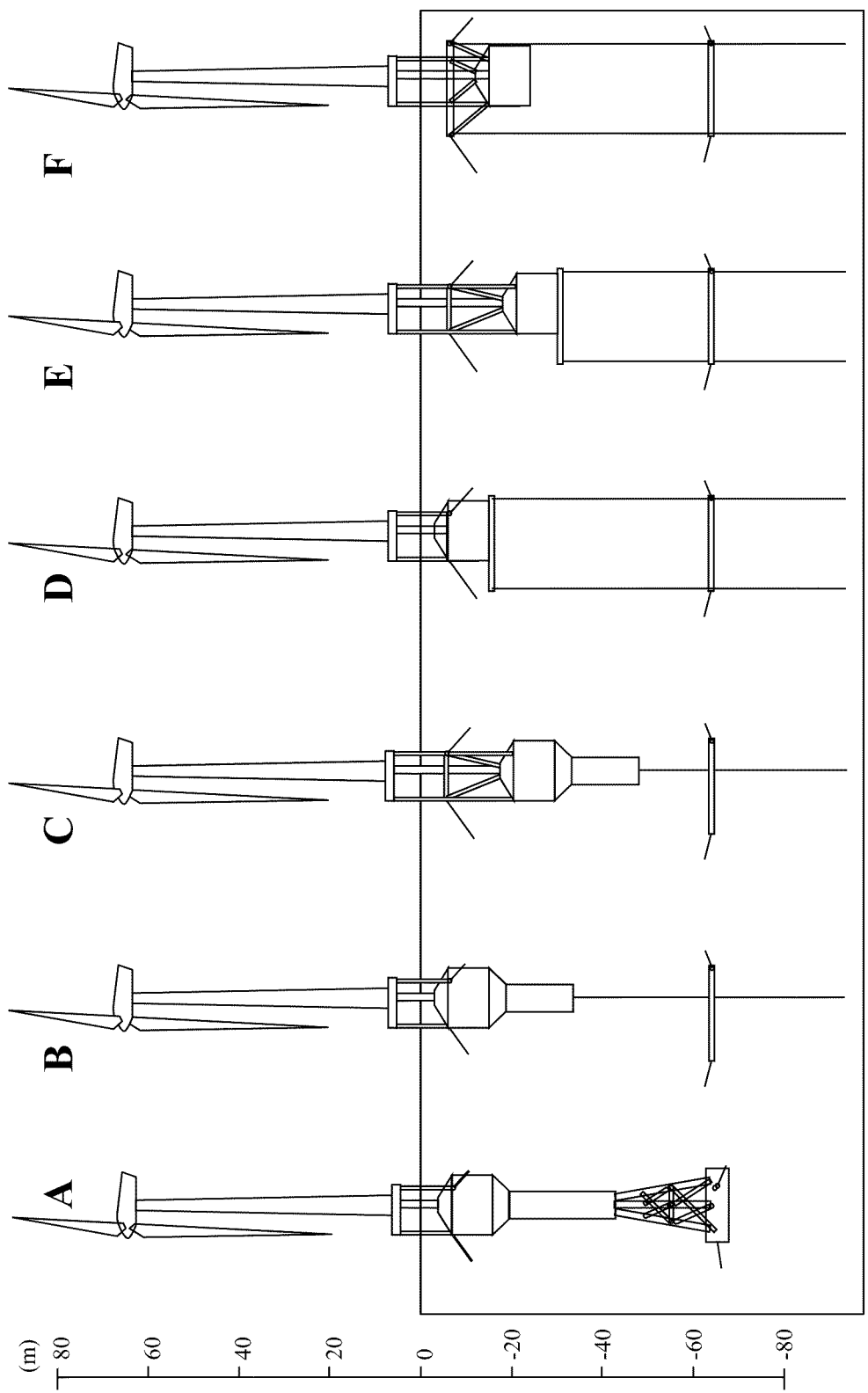
FIG. 37 illustrates variations of the TLP unit shown in FIGS. 34 and 35, together with a prior art VFF unit.

FIG. 37 illustrates further variations of the unit 3400 shown in FIGS. 34 and 35, together with a prior art VFF unit. To give a general idea of the scale of the units, a vertical scale calibrated in meters is shown on the left-hand side of FIG. 37. In FIG. 37, the Unit designated "A" is a prior art VFF unit substantially as illustrated in FIG. 15 of U.S. Pat. No. 7,293,960 and as described therein, except that in Unit A the lowest part of the base portion has been replaced by a framework. Unit F in FIG. 37 is a unit as illustrated in FIGS. 34 and 35, with the a minor modification of the shape of the floatation chamber.

Unit B in FIG. 37 is a so-called "single leg high floater" unit, which may be regarded as notionally produced by removing the lower part of the base portion of Unit A and replacing it with a single TLP cable and a modified version of the cable mounting section 3410H, 3410S shown in FIG. 34. As in the unit 3400 shown in FIGS. 34 and 35, the lower assembly cables are attached to the outer ends of the spokes of the cable mounting section, while the upper assembly cables are attached, as in Unit A, to the upper end of the floatation chamber.

Units D and E in FIG. 37 are variants of Unit F. Unit D is a so-called "triple leg high floater" and may be regarded as derived from the unit 3400 shown in FIGS. 34 and 35 by shortening the vertical support members 3422 and 3424, eliminating the braces 3430 and attaching the upper assembly cables directly to the points where the vertical support members are joined to the flotation chamber. Since in Unit D the floatation chamber is close to the water surface, this design is most suitable for use in sheltered locations where large waves are not expected. The cable attachment struts in Unit D are mounted directly on the lower end of the floatation chamber, so there is no need for braces corresponding to the braces 3430 shown in FIG. 35.

Unit E in FIG. 37 is a so-called "triple leg low floater" unit, which is essentially a variant of Unit F designed to keep the floatation chamber deeper below the water surface; Unit E may thus be better adapted for locations where waves of substantial height are expected. The lower part of Unit E is essentially identical to that of Unit D. However, in the upper part of Unit E, the vertical support members are lengthened, and render the long outer support members rigid, they are joined to each other adjacent their midpoints by a triangular "collar" joining the three outer support members. This collar may be comprised of struts similar to the cable attachment struts 3428 shown in FIG. 35 or of retaining members similar to the members 3628 in FIG. 36 and of struts similar to the struts 3630 shown in FIG. 36. The outer support members may also be braced by diagonal braces extending between their midpoints and the lower end of the central support member. The upper assembly cables are attached to the outer support members at their junction with the collar.

Finally, Unit C in FIG. 37 is a so-called "single leg low floater" unit, which may be regarded as combining the upper part of Unit E with the lower part of Unit B, and hence does not need to be described further.

Figure 38:
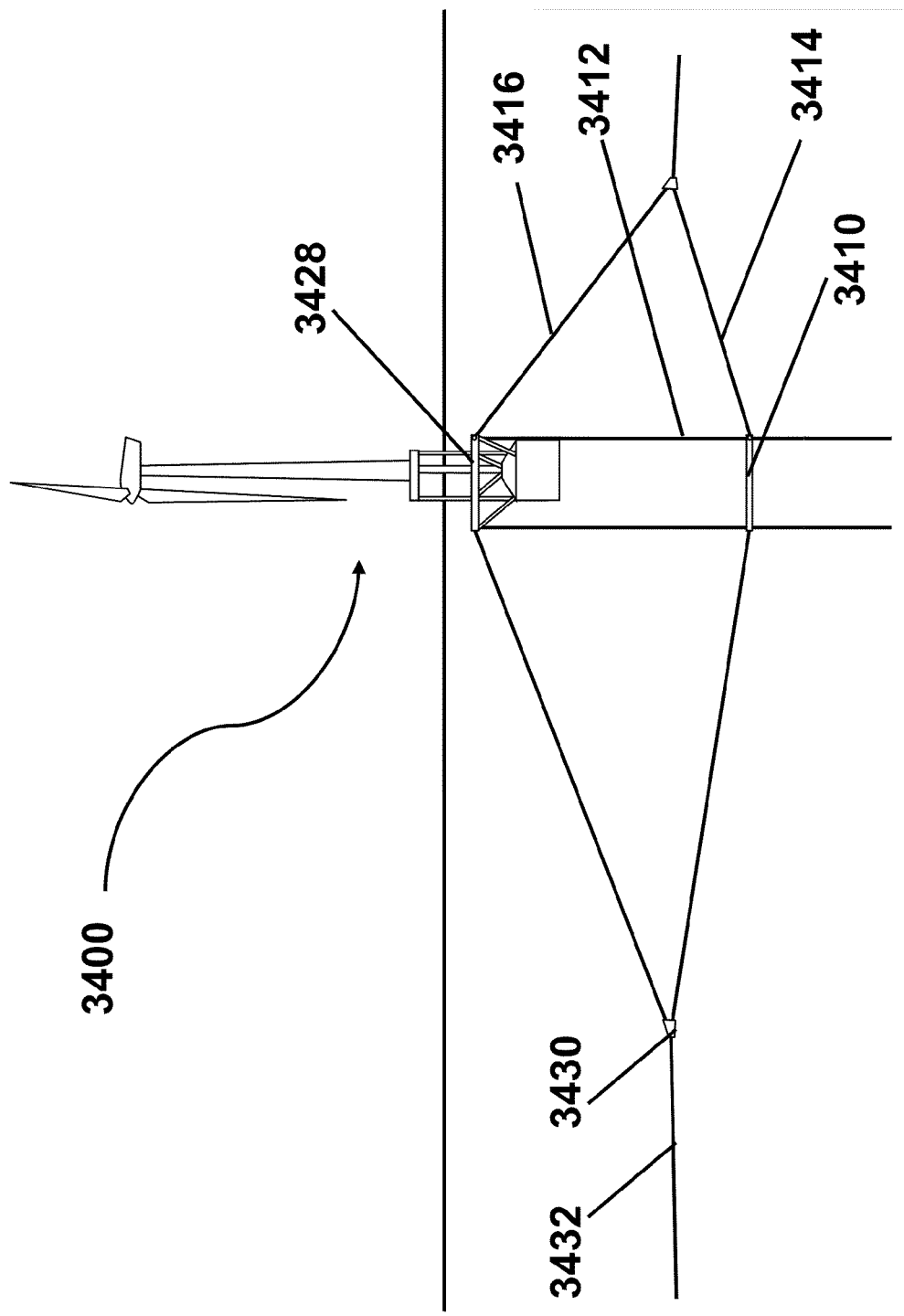
FIGS. 38-41 illustrate details of the manner in which cables are joined to various TLP units used in the assemblies of the present invention.

FIGS. 38-41 illustrate details of the manner in which the TLP and assembly cables are joined to various units used in the assemblies of the present invention. FIG. 38 illustrates the cables attached to the unit 3400 shown in FIGS. 34 and 35. As previously described, the TLP cables 3412 extend vertically downwardly from the struts 3428 to TLP anchors (not shown), which anchor the lower ends of the cables 3412 to the sea bed in the same way as in a conventional tension leg platform. Three lower assembly cables 3414 extend outwardly and slightly upwardly from the outer ends of the cable mounting section 3410, while three upper assembly cables 3416 extend outwardly and downwardly from the struts 3428. At points distant from the unit 3400, the lower and upper assembly cables 3414 and 3416 are received in cable blocks 3430, and from each cable block 3430 a single cable 3432 extends to adjacent TLP or VFF units.

Figure 39:
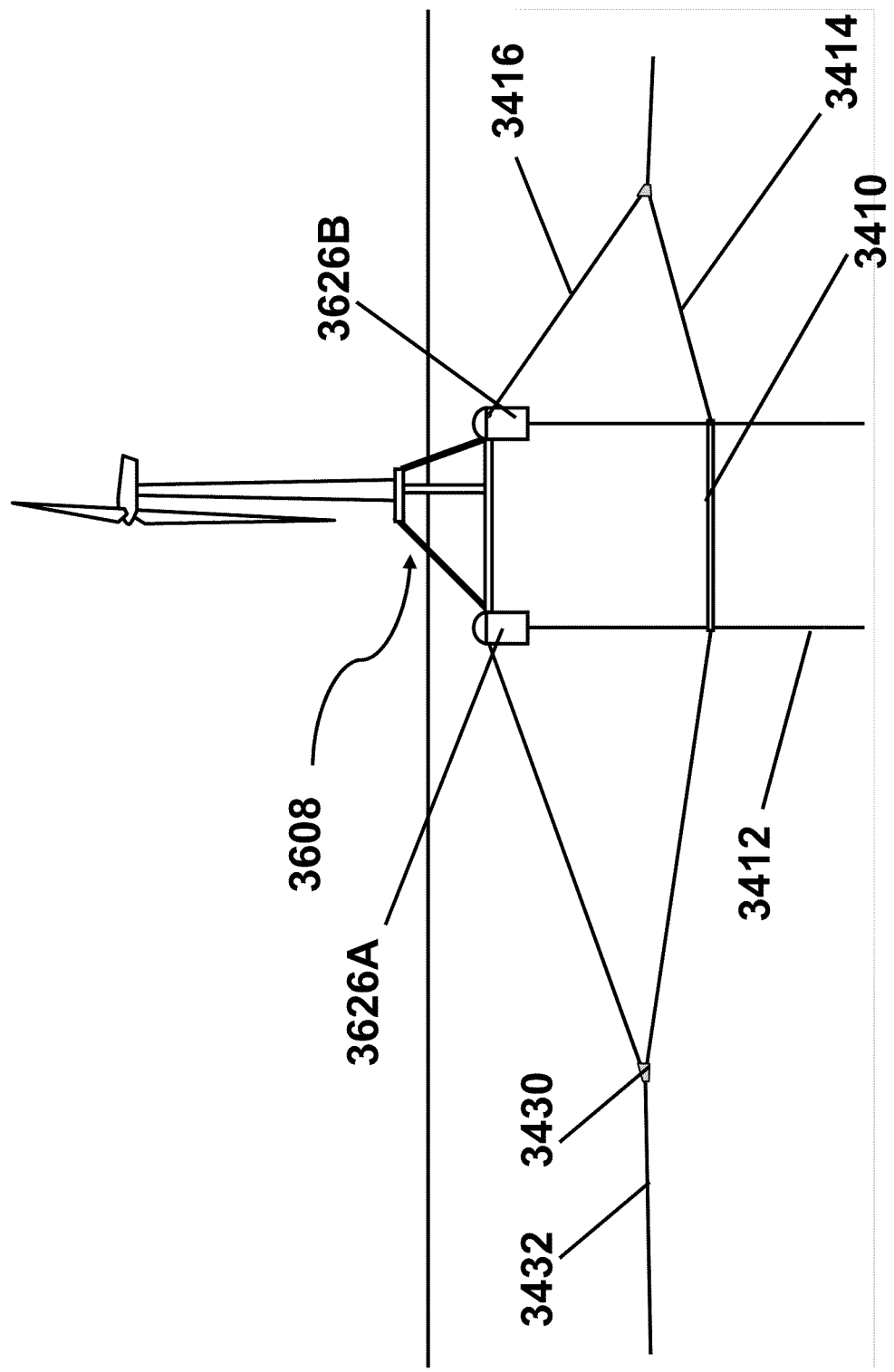

FIG. 39 is a view similar to that of FIG. 38*but* showing the manner in which the TLP and assembly cables are joined to the unit shown in FIG. 36. As previously described, the TLP cables 3412 extend vertically downwardly from the chamber 3626A, 3626B and 3626C (the last is not visible in FIG. 39), pass through and are secured to the outer ends of the cable mounting section 3410, and thence extend vertically downwardly to TLP anchors (not shown). It should be noted that the cable mounting section 3410 used in this unit may be larger than, though of similar design to, that shown in FIG. 34 in order to accommodate greater spacings between the mountings of the TLP cables 3412 in the unit shown in FIG. 36. The arrangements of the cable blocks 3430 and cables 3432 in FIG. 39 are identical to those in FIG. 38.

Figure 40:
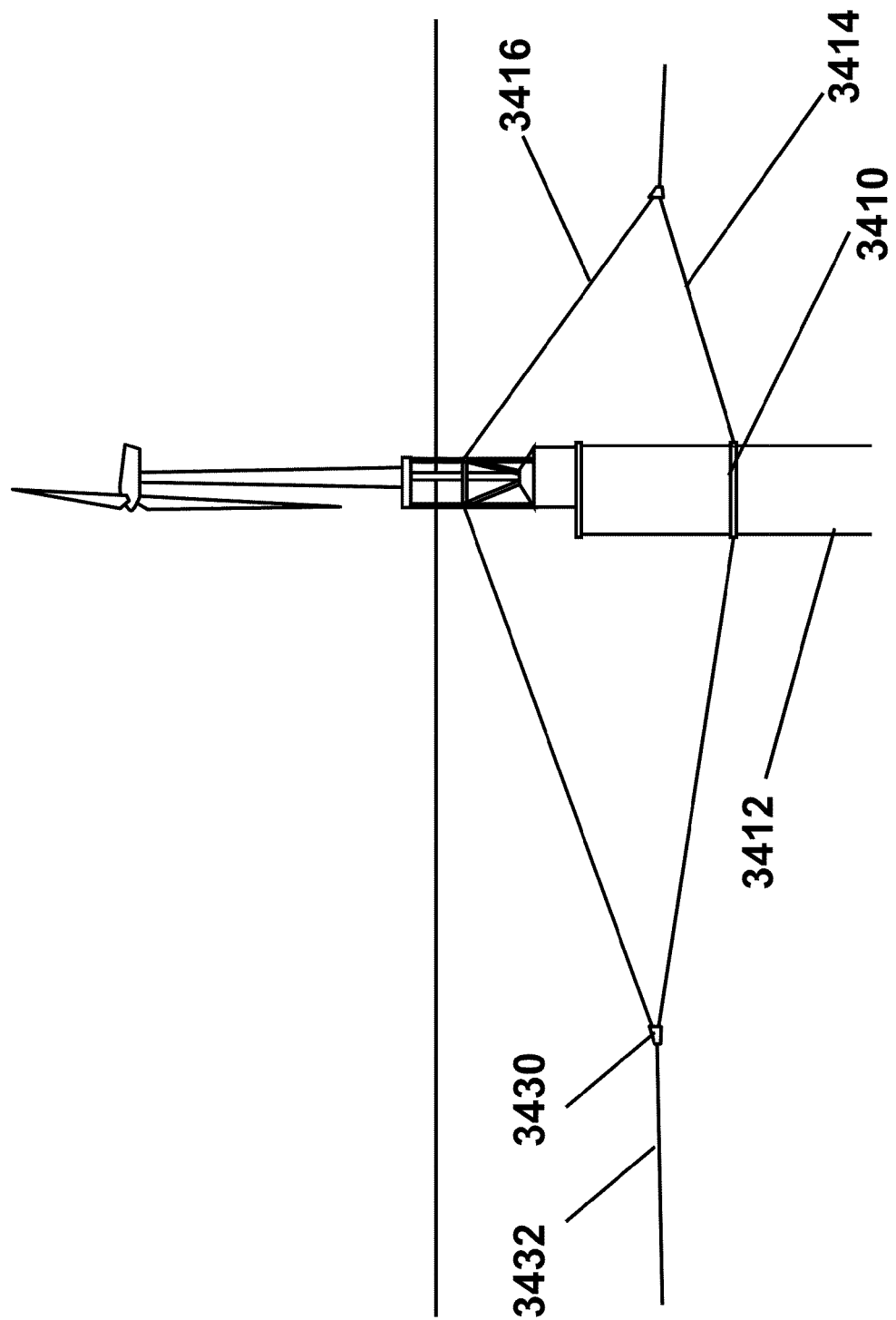
Figure 41:
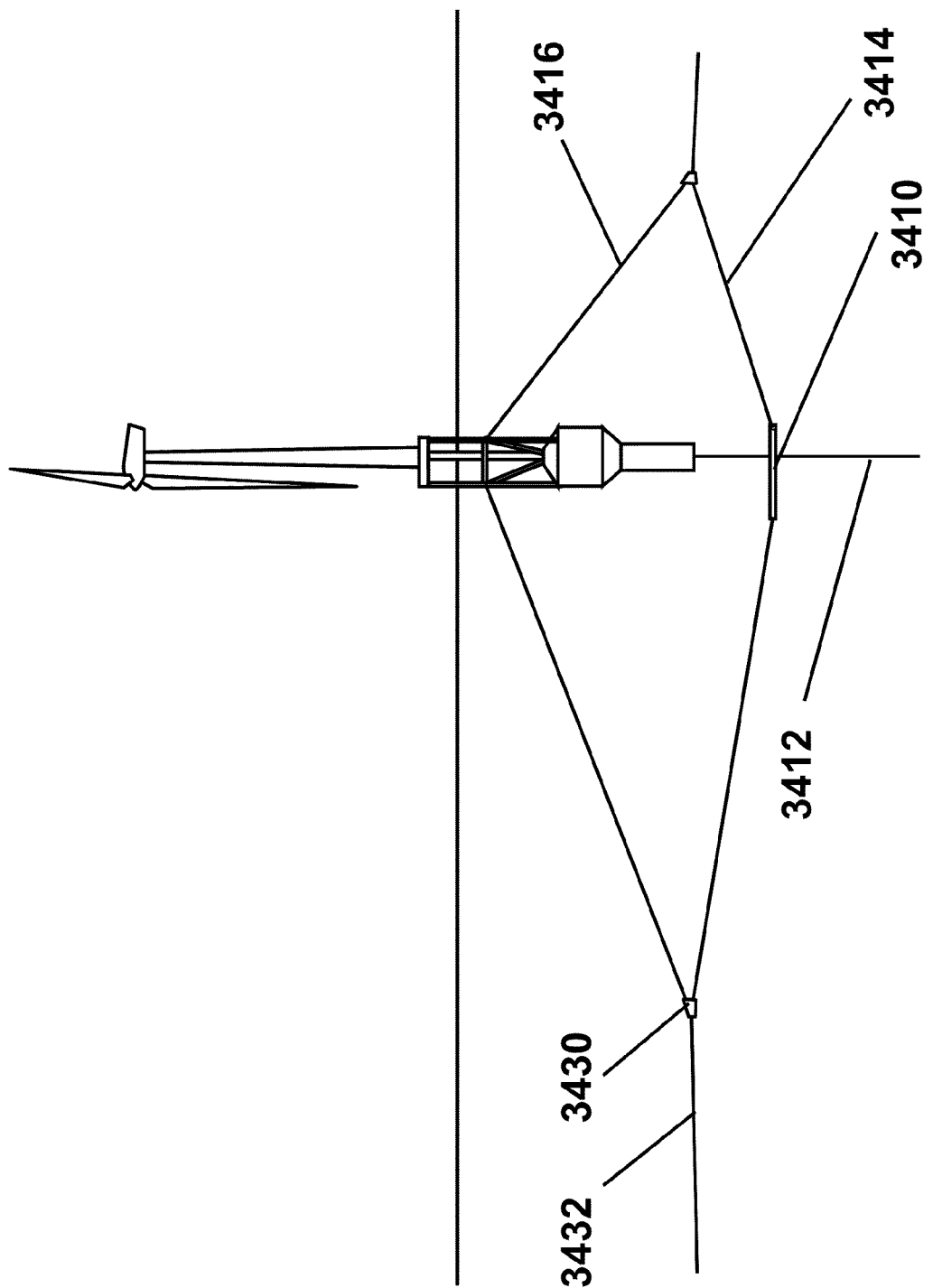

FIGS. 40 and 41 show views similar to those of FIGS. 38 and 39 but using the Units E and C respectively shown in FIG. 37. It should be noted that the mounting points for the upper assembly cables are arranged to that these mounting points are at substantially the same distance below the water surface in each of FIGS. 38-41, even though the floatation chambers in FIGS. 40 and 41 are substantially deeper below the water surface than those in FIGS. 38 and 39.

The preferred arrangements of the TLP and VFF (if any) units in the assemblies of the present invention are the same as those described in detail above; see, for example, FIGS. 10A-10F, 20A-20J, 28A, 28B and 29A-29C above.

Figure 42:
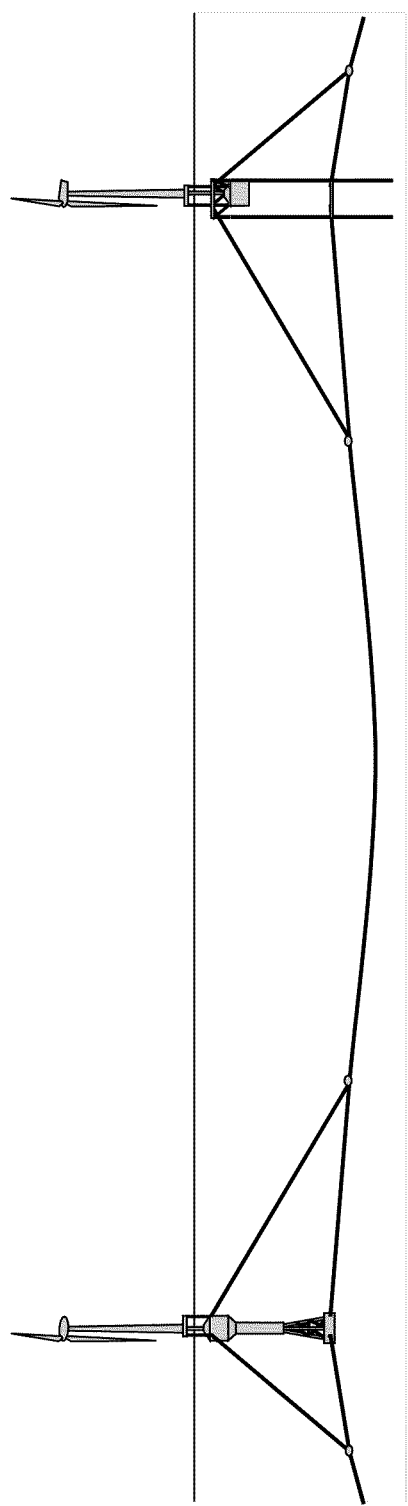
FIGS. 42-45 illustrate various cable arrangement by which VFF and TLP units may be interconnected in the assemblies of the present invention.

Attention will now be directed to the arrangements of cables extending between adjacent units in such assemblies. FIGS. 42-45 each show cable arrangements for interconnecting a VFF Unit A as shown in FIG. 37 on the left-hand side of the Figure to a unit 3400 as shown in FIGS. 34 and 35 on the right-hand side of the Figure. In FIGS. 42-45, it should be understood that both the lower and upper assembly cables are under substantial tension (on the order of many tonnes), and that the drawings greatly exaggerate the curvatures in certain cables due to the weight of the cables themselves. In FIG. 42, the lower assembly cable runs essentially directly between the base section of Unit A and the cable attachment section of unit 3400, while the upper assembly cables extend from the upper sections of the units.

Figure 43:
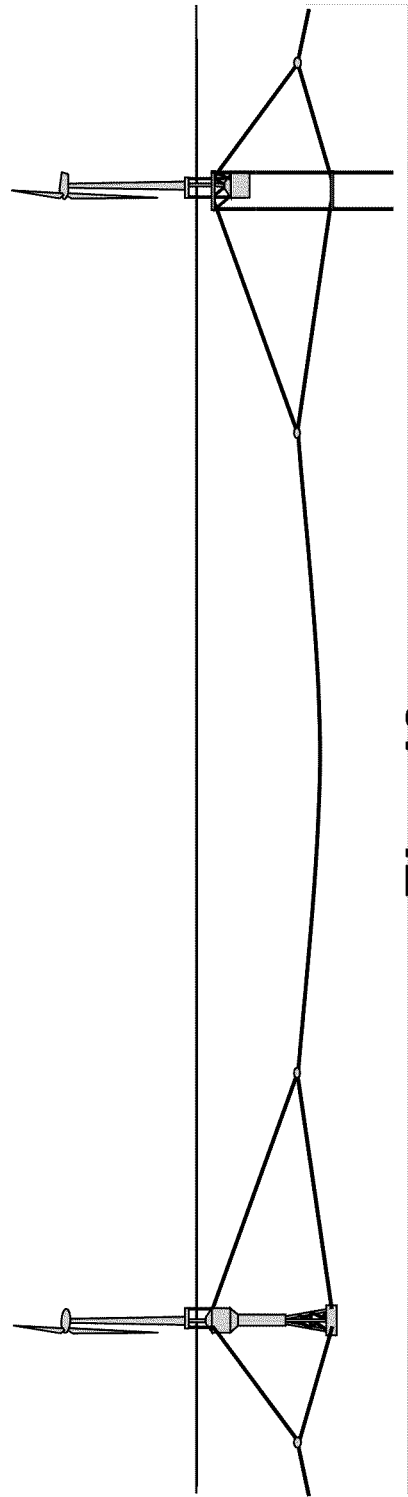

In the modified arrangement shown in FIG. 43, the arrangement of the lower assembly cable and the upper assembly cables is similar to that shown in FIG. 42, but the length of the upper cables has been adjusted such that the junctions of the lower and upper cables occur at a smaller depth than in FIG. 42. Depending upon the length of the cables, the points of attachment of the upper cables to the lower cable may be located about halfway between the depths at which lower and upper cables are attached to the two units.

Figure 44:
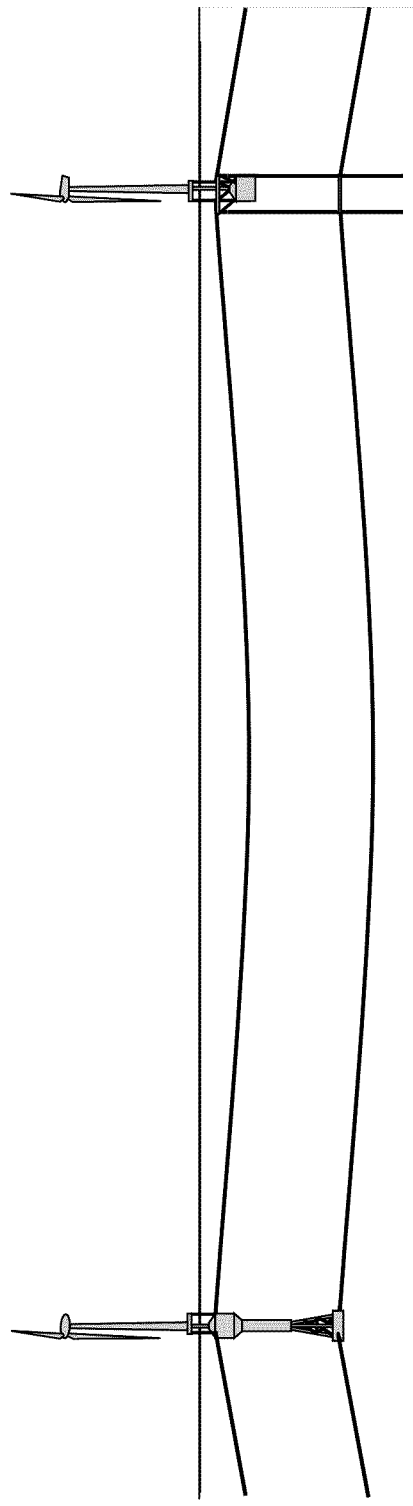

FIG. 44 illustrates a different type of upper assembly cable. This type of upper cable is not connected to the lower cable but extends directly between the two adjacent floating units, running essentially parallel to but above the lower cable. This type of interconnection may provide a higher tensile strength connection between units. It provides a more robust connection between the units but does have the disadvantage that it renders the upper cable more susceptible to wave motion, and if the floating assembly is in an area through which vessels may need to pass, the upper cable allows only a limited draft for such vessels.

Figure 45:
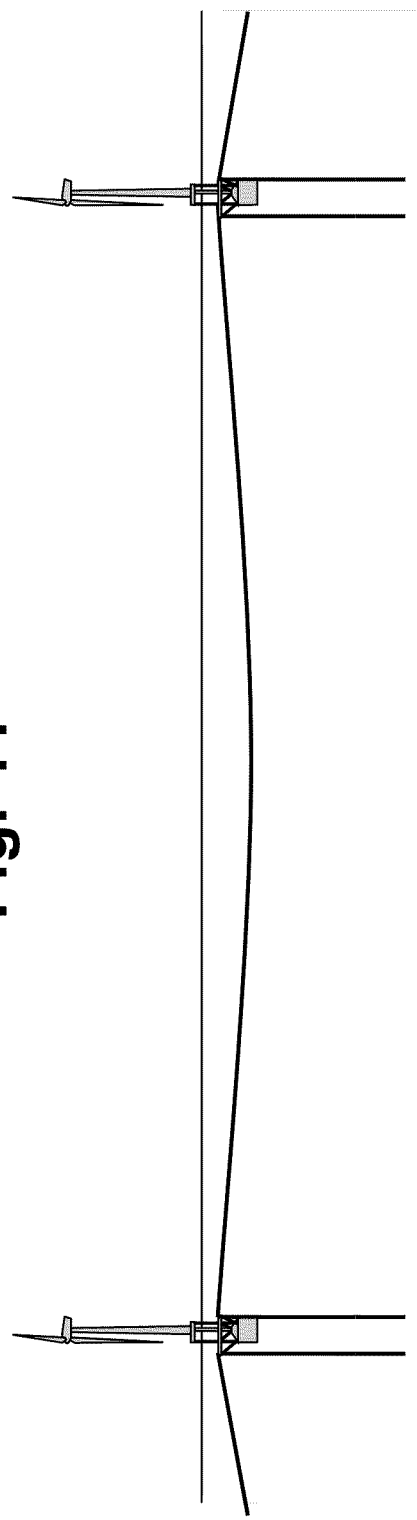

Finally, FIG. 45 illustrates a form of cable connection which may be used to connect two TLP units, and may be suitable for connecting VFF units. Essentially the cable arrangement shown in FIG. 45 is derived from that shown in FIG. 44 by eliminating the lower assembly cable, leaving only the upper assembly cable interconnected the two TLP units. The cable arrangement shown in FIG. 45 substantially reduces costs by eliminating the lower assembly cable and its mountings. The reasons why the cable arrangement of FIG. 45 is effective in stabilizing TLP units is explained below with reference to FIGS. 46 to 49.

In FIGS. 42-45, the connecting cables have been shown drooping downwardly under their own weight. The extent of such drooping is greatly exaggerated in these drawings, since the drooping is limited by the substantial tension on the cables. To further reduce drooping, the cables can be designed to be buoyancy neutral; a "buoyancy neutral cable" provides a straight line connection and hence a stiffer formation of units. However, such a stiffer formation may be found (by further research, such as by hydrodynamic simulation) to be more or less appropriate in some cases, because it tends to spread lateral movement and forces of one unit to the surrounding units. Hence, the present invention extends to the use of both regular and buoyancy neutral cables. Buoyancy neutral cables can be formed with a thick protective layer, typically formed of synthetic materials, such as syntactic foam, and therefore buoyant, around a steel core. Buoyancy neutral cables can be used with both VFF and TLP units, and with all the cable configurations described herein, including the cross tensioning cables described below with reference to FIGS. 54 and 55.

The manner in which the present invention stabilizes TLP units will now be explained. FIG. 46 shows in a highly schematic manner the forces acting on a single conventional TLP unit which is not connected to any similar unit. Arrow A represents the wind thrust on the rotor, hub and other parts of the unit disposed above the water surface. This thrust varies with the design and size of the blades and hub. If an extreme case is reached where thrust A exceeds the design limits of the TLP unit, the whole TLP unit will rotate clockwise (as illustrated) about Point E, a "tension leg connecting arm" where a TLP cable is connected to the unit. Accordingly, rotational moment of the whole TLP unit under extreme wind thrust can be reduced by positioning Point E and other tension leg connecting arms more shallowly below the water surface.

Arrow B in FIG. 46 represents horizontal wave load on the TLP unit. This wave load (for a unit of structure) is at its maximum near the water surface. Accordingly, minimizing the cross sectional area of the TLP unit near the water surface (as by the provision of narrow vertical support members 3422 and 3424 in FIG. 35) can reduce this load. Also, positioning tension leg connecting arms more shallowly below the water surface can reduce the moment of load B around Point E.

Arrow C represents the horizontal wave load and Arrow D the vertical wave load on the submerged portion of the TLP unit. In both cases, the wave load depends on hydrodynamic design of the structure, and positioning the large components of the TLP unit (especially the floatation section) deeper can reduce the load.

The condition which it is most desired to avoid in TLP units is the "fall-backward" condition shown in FIG. 47. In this extreme case, the horizontal wave force B and the vertical wave force D combine with the wind thrust A to create a catastrophic moment around Point E, causing the opposed tension legs to become slack, so that the entire unit falls backwards, with possible serious damage to, or even destruction of the blades and generator. It is also necessary to guard against the "pushed backward" condition shown in FIG. 48. In this condition, the wind thrust A, the horizontal wave force B and the horizontal wave load C all act in the same direction to cause a substantial horizontal force, resulting in excessive horizontal acceleration of the entire TLP unit. (Small horizontal movements occur constantly and the pushed backward condition only becomes problematic when excessive horizontal acceleration of the TLP unit occurs.) The existence of the two separate failure modes illustrated in FIGS. 47 and 48 places the designer of a conventional TLP in a dilemma; positioning the large components (especially the floatation section) of the TLP unit more deeply below the water surface can substantially reduce the waves loads C and D, but increases the moment around Point E if this point is positioned as deep as the floatation section.

Prior art attempts to solve the aforementioned problems include lengthening the tension leg connecting arms to increase the moment of the buoyancy forces (provided the floatation section of the TLP unit) around the ends of the arms (such as Point E mentioned above) which serve as rotation points during failure. However, such arm lengthening results in a larger and heavier structure for the submerged portion of the TLP unit, and there are few effective solution for the "pushed-backward" problem other than making the entire unit larger, heavier and more costly.

As illustrated in FIG. 49, preferred TLP units used in the present invention reduce the aforementioned problems by minimizing the cross-sectional area of the unit at the water surface (as by the provision of narrow vertical support members 3422 and 3424 in FIG. 35) to reduce the horizontal wave load B, and by positioning the floatation section deep enough to minimize the wave loads C and D, while keeping the tension leg connecting Point E closer to the water surface. The provision of the substantially horizontal lower and upper assembly cables provides support to attenuate the "pushed-backward" problem, and this is one of the key benefits of the illustrated design. Also, as the wind and wave forces as shown on FIG. 48 increase, any push-backward movement of the TLP will reduce the vertical component of force on the right upper assembly cable 3416, and will increase the vertical component of force on the left upper assembly cable 3416, thus aiding to the stabilization of the TLP and reducing the risk of the "fall-backward" condition shown in FIG. 47.

FIG. 50 illustrates a modification of the floatation section of the TLP units previously described which can further reduce wave loads on the unit. Essentially, the modified unit shown in FIG. 50 allows controlled swinging motion of the largest hydrodynamic component, the floatation chamber, reduces the dynamic wave load for the rest of the structure.

As shown in FIG. 50, the modified TLP unit has a triangular platform 3420 and vertical support members 3422 and 3424, all of which are generally similar to the corresponding parts of the unit 3400 shown in FIGS. 34 and 35 (the mast 3406 is omitted from FIG. 50 for ease of illustration. However, instead of being fixedly connected to a floatation chamber, the lower ends of the support members 3422 and 3424 are secured to a framework comprising a first horizontal section 5020 (which may resemble the struts 3428 shown in FIG. 35 or the members 3628 and 3630 shown in FIG. 36), three vertical sections 5022 (only two of which are visible in FIG. 50), and a second horizontal section 5024, which may resemble the struts 3528 shown in FIG. 35 or the members 3628 and 3630 shown in FIG. 36. The TLP cables 3412 and the upper assembly cables 3416 are attached to the periphery of the first horizontal section 5020. A floatation chamber 5026 is retained within the framework 5020, 5022, 5024; the lower end of the chamber 5026 is mounted on the second horizontal section 5024 by means of a gimbaled joint 5028, while each of the vertical sections 5022 is connected to the upper end of the chamber 5026 by an active motion control damper 5030.

The gimbaled joint 5028 allows limited swinging motion of the chamber 5026 within the framework, while the active motion control dampers 5030 control this swinging motion and limit the maximum movement of the chamber 5026 relative to the framework. The dampers 5030 can be of pneumatic, hydraulic or spring types, and may be arranged to generate additional electricity.

The use of a movable floatation chamber to reduce wave loading is not confined to TLP units but can extend to VFF units. For example, FIG. 51 shows a movable floatation chamber 5026 being used in a modified form of VFF Unit A shown in FIG. 37.

Figure 52:
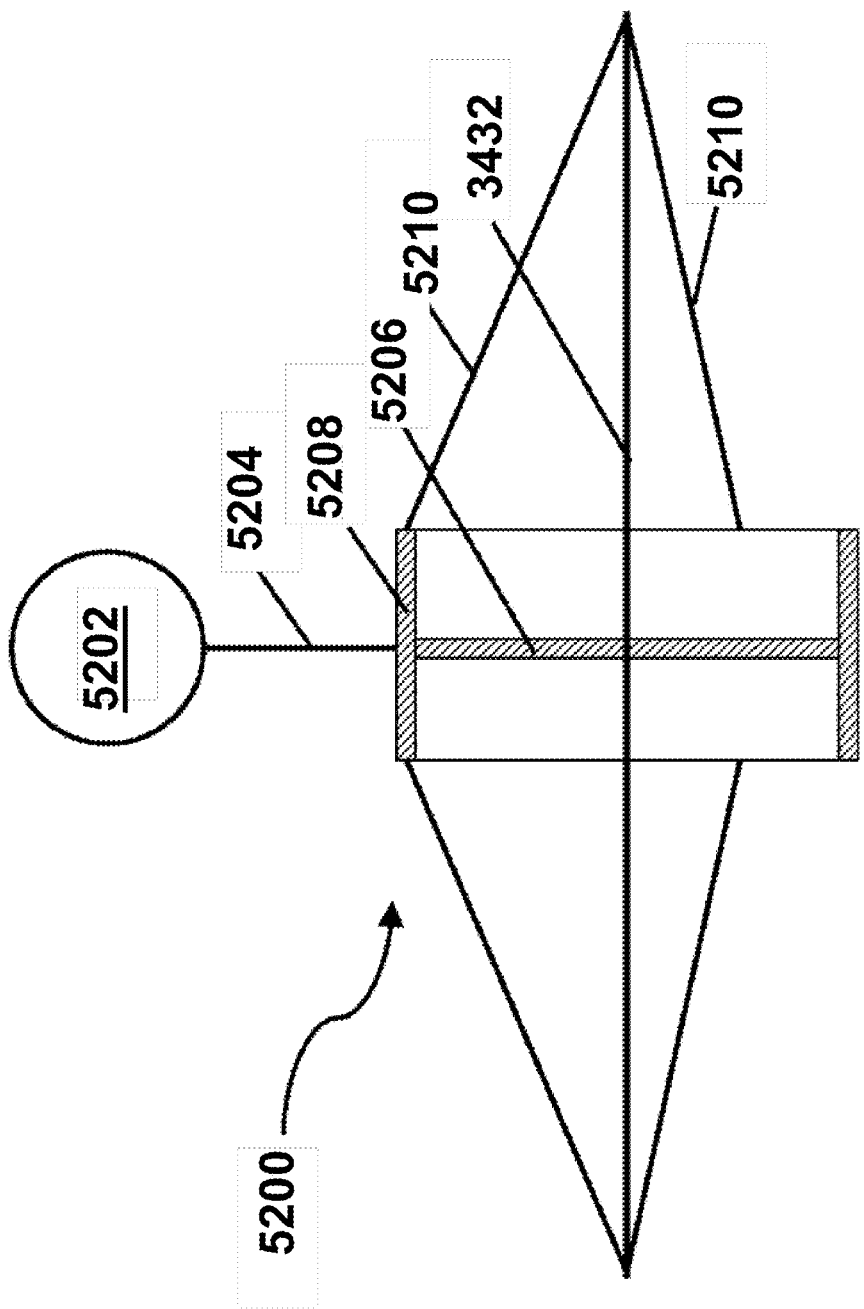
FIG. 52 is a side elevation (partly in section) of a cable stabilizer unit which may be attached to one or more of the assembly cables of the assemblies of the present invention.
Figure 53:
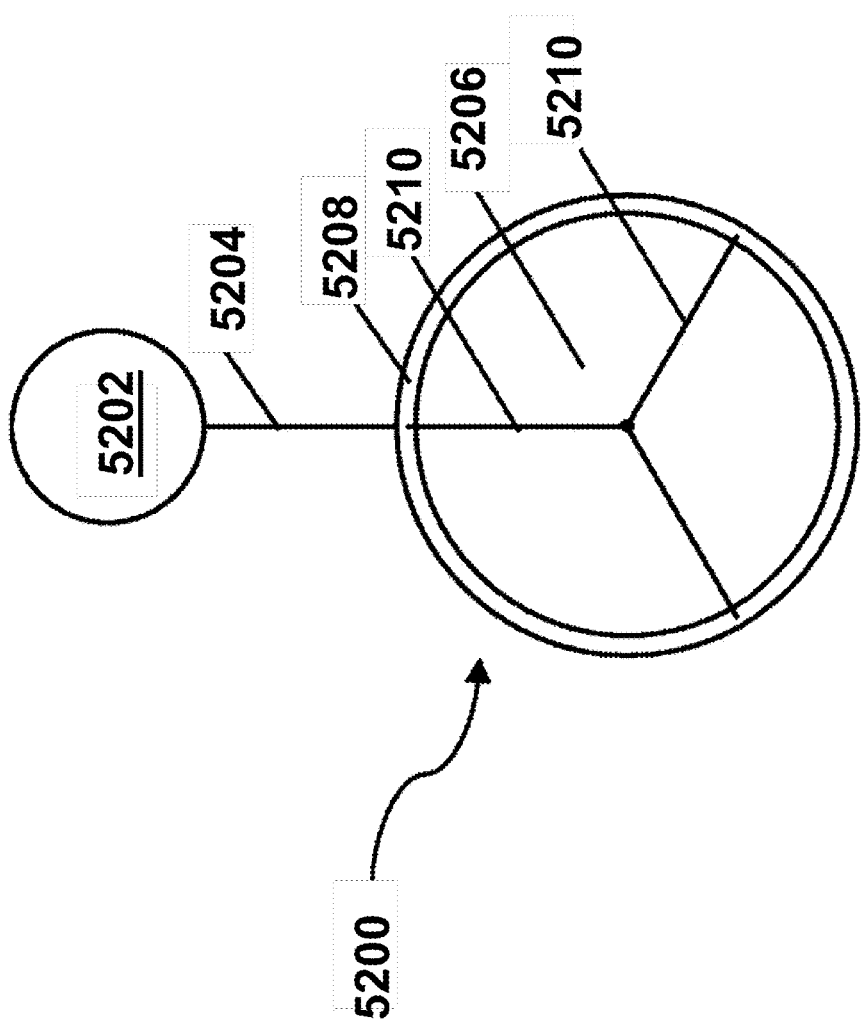
FIG. 53 is an end elevation of the cable stabilizer unit shown in FIG. 52.

FIGS. 52 and 53 are respectively a side elevation (partly in section) and an end elevation (looking from the left in FIG. 52) of a cable stabilizer unit ("CSU"—generally designated 5200) which may be attached to one or more of the assembly cables of the assemblies described above in order to increase the resistance of the cable against horizontal movement of the VFF or TLP units. As shown in FIGS. 52 and 53, the cable stabilizer unit 5200 comprises a float 5202 which rests below the water surface and a short distance above the remaining components of the CSU, and controls the position and buoyancy of the cable stabilizer unit and the cable to which it is attached, as described below. The float 5202 is connected via a cable 5204 to the main section of the CSU, which comprises a disc 5206 attached at its periphery to a hollow cylinder 5208. An assembly cable (illustrated as the cable 3432 from any one of FIGS. 38-41) passes through the center of the disk 5206, and six CSU cables 5210, three on each side of the disk 5206) extend from spaced points on the cylinder 5208 to points on the cable 3432 spaced from the CSU 5200, thus holding the disk 5206 perpendicular to the cable 3432.

The CSU 5200 acts to provide additional resistance to horizontal movement of the cable 3432 and hence additional resistance to horizontal movement to the VFF or TLP units attached to the cable 3432. The CSU 5200 should be located so that it is not affected by wave action (which might cause unwanted horizontal movement of the cable 3432) and hence is desirably located at the deepest part of the cable 3432, typically midway between the VFF or TLP units attached to this cable. The CSU 5200 may be placed along the cable between VFF and/or TLP units to take advantage of the expected phase of the wave forces on the CSU relative to the phase of the wave forces on the VFF and/or TLP.

By way of example, the disk 5206 may have a diameter of 8 meters and the cylinder 5208 an axial length of 4 meters. The hydrodynamic mass (i.e., the weight of captured water) of such a CSU would be about 200 tonnes and the displacement of the float 5202 would be about 20 tonnes. The floater 5202 could be formed of fiber-reinforced plastic or a similar material, and the cable 5204 of synthetic rope, steel cable or steel chain. The disk 5206 and cylinder 5208 could be formed of fiber-reinforced plastic or a similar composite material, steel or steel reinforced concrete.

Figure 54:
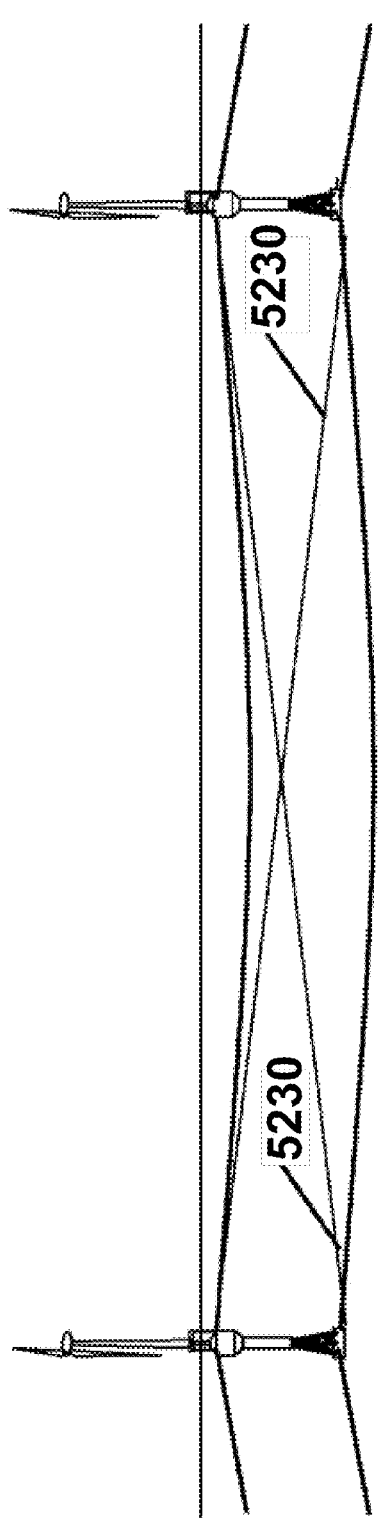
FIGS. 54 and 55 show alternative cable arrangements which may be substituted for that shown in FIG. 44.
Figure 55:
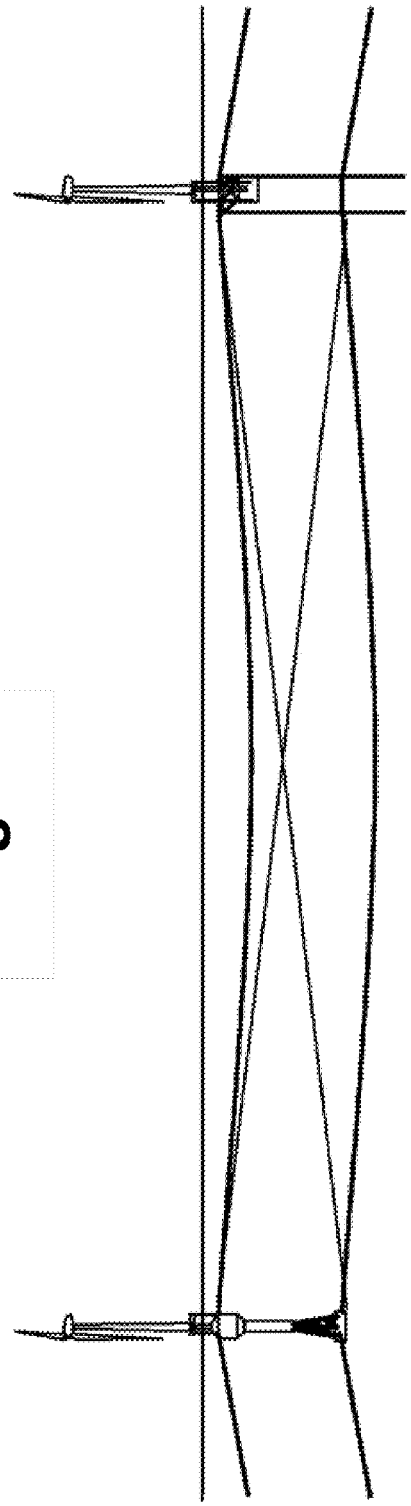

FIGS. 54 and 55 show alternate cable arrangements which may be substituted for that shown in FIG. 44. In FIGS. 54 and 55, cross tensioning cables 5230 are provided extending between the attachment point of an upper cable on one VFF or TLP unit and the attachment point of a lower cable on an adjacent unit, so that the cross tensioning cables 5230 extend "diagonally" between the two units. Where two cross tensioning cables 5230 pass each other, they can be attached to each other, or left free to move relative to each other at this point. FIG. 54 illustrates cross tensioning cables being used to connect two VFF units, while FIG. 55 illustrates cross tensioning cables being used to connect one VFF and one TLP unit; cross tensioning cables can of course also be used to connect two TLP units. The use of cross tensioning cables may be used to reduce wave induced motions of the VFF or TLP platform and may enable the individual cables to be made smaller and lighter since the total tension required can be distributed among four cables rather than two. Alternatively, the upper and lower cable shown in FIGS. 54 and 55 can be eliminated so that only the cross tensioning cables are present.

FIG. 56 shows a modified form (generally designated 5600) of the cable stabilizer unit shown in FIGS. 52 and 53. The CSU 5600 shown in FIG. 56 differs from the CSU 5200 shown in FIGS. 52 and 53 in that the section of the main cable 3432 passing through the center of the disk 5206 is eliminated. This requires that the CSU cables 5210 be sufficiently strong that the three (or other number provided) CSU cables on each side of the disk 5206 can carry the total tension in the main cable 3432. Eliminating the section of the main cable 3432 passing through the center of the disk 5206 in the manner shown in FIG. 56 may simplify attachment of the CSU to the main cable since there is no need to pass the main cable though the disk of the CSU.

Figure 57:
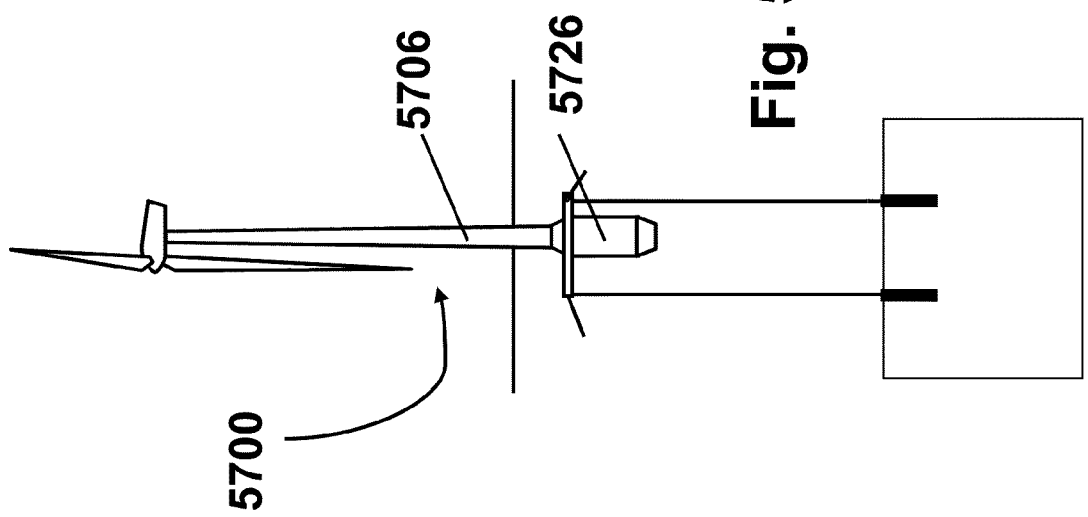
FIG. 57 is a side elevation, similar to that of FIG. 38, of a second tension leg platform unit which may be used in TLP assemblies of the present invention.

FIG. 57 shows a modified form of TLP unit (generally designated 5700) which can be substituted for the unit 3400 shown in FIG. 38 under appropriate wave and weather conditions. The upper part of the unit 5700 is essentially the same as that of the unit 3400, but in the lower part of the unit 5700 the platform 3420, the central support member 3422 and the outer support members 3423 are all eliminated; instead, the mast 5706 passes through the water surface and is attached directly to the upper end of a substantially cylindrical flotation chamber 5726. The upper part of the chamber 5726 is fixed to a triangular collar, similar to that shown in Unit E in FIG. 37. Cables are attached to the collar in the usual manner. Additional braces (for example inclined braces similar to those which interconnect the outer support members and the floatation chamber 3426 in FIG. 35) may be provided depending upon the loads on the various members.

Although the unit 5700 shown in FIG. 57 has a larger cross-sectional area at the water surface than the unit 3400 shown in FIG. 34, the simple cylinder design can lower the cost of manufacturing and assembling the TLP unit, while still providing the other benefits of horizontal support and those derived from a submerged flotation chamber in accordance with the present invention.

Up to this point, the assemblies of the present invention have been illustrated with only a single cable connecting VFF and TLP units to each other and to anchors. However, those skilled in the technology of floating structures will recognize that there may be significant advantages in using multiple (typically horizontally side-by-side) rather than single cable interconnections. Multiple cable connections can provide increased yaw stability, provide redundancy to prevent accidents in the case of cable breakage (which may be especially important if even modest drift of VFF and/or TLP units could have very serious consequences, as for example when an assembly of the present invention is installed close to a shipping channel or a shore), and allow the use of smaller cables which are easier to deploy. Multiple cable connections do tend to increase cable cost and wave load, and may render the connection and tightening of cables more complicated, but in many practical situations multiple cable connections may be preferred.

Figure 58:
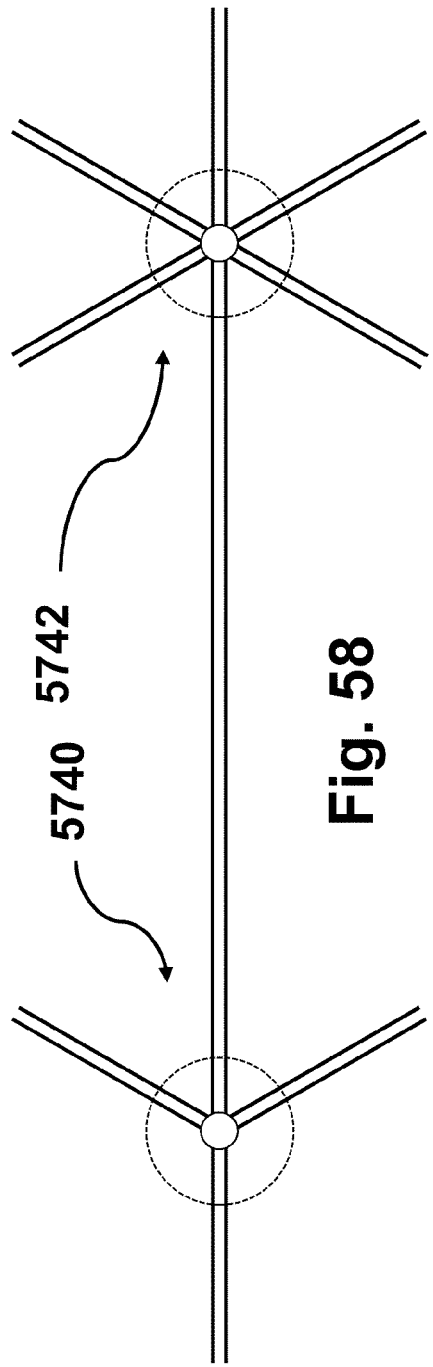

The general principal of multiple cable interconnections is illustrated in FIG. 58, which shows two interconnected units 5740 and 5742; for purposes of the multiple cable interconnections shown in FIGS. 58-62 it does not matter whether the units are VFF or TLP units. In each of the units 5740 and 5742 the inner circle represents the circumcircle of the mast, platform and associated structures, while the outer broken circle represents the area over which the blades of the unit can pass. It will be seen from FIG. 58 that the units 5740 and 5742 are connected to each other, with unit 5740 also being connected to three other units (not shown) and unit 5742 being connected to five other units (also not shown). In all cases, two cables rather than a single cable are used for each interconnection. Optionally, cable separators (not shown) can be provided at intervals along the cables to prevent the adjacent cables becoming entangled or damaging each other under rough conditions.

Figure 59:
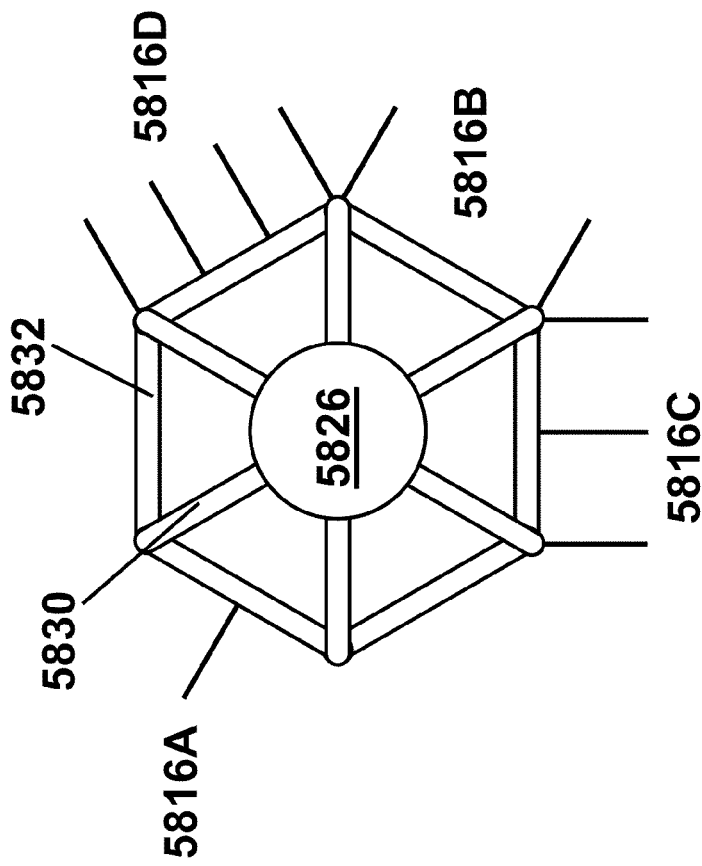

With multiple cable connections, tension in the cable can resist and limit rotational forces on the units of the assembly, and it may be desirable to provide appropriate reinforcing structures in the units to support against such rotational forces producing undesirable movement of the units. For example FIG. 59 illustrates a single unit having a cylindrical flotation chamber 5826 connected by six radial struts 5830 to a regular hexagonal reinforcing structure 5832. One of the six sides of the reinforcing structure 5832 carries a single cable connection 5816A, a second side carries a double cable connection 5816B, a third side carries a triple cable connection 5816C and a fourth side carries a quadruple cable connection 5816D. (The differing numbers of cables on the sides of the reinforcing structure 5832 are for purposes of illustration; in practice, any specific structure would normally have the same number of cables in each interconnection.)

Figure 60:
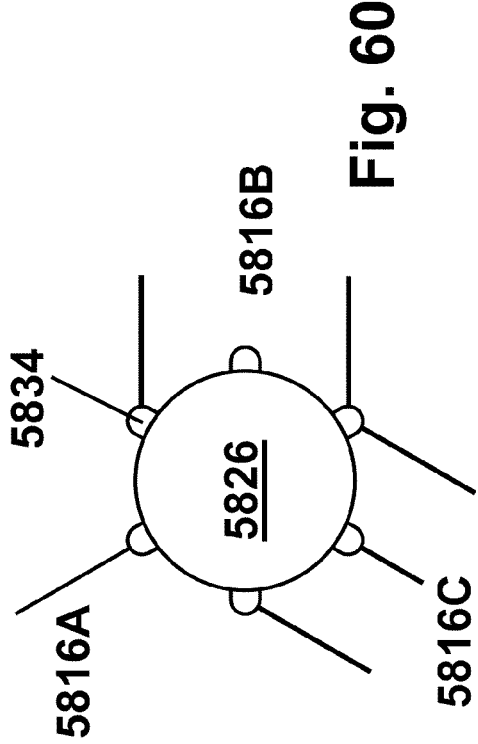

In some cases, no reinforcing structure will be necessary. For example, FIG. 60 illustrates a cylindrical floatation chamber 5826 carrying around its circumference six regularly spaced cable connection projections 5834. One of the projections 5834 is used for a single cable connection 5816A, two other projections are used for a double cable connection 5816B, and three projections are used for a triple cable connection 5816C; note that one projection is used for both connections 5816B and 5816C.

The hexagonal reinforcing structure 5832 shown in FIG. 59 is capable of carrying six cable connections. Reinforcing structures may of course be designed to carry more or fewer cable connections. For examples, FIGS. 61 and 62 illustrate two different types of reinforcing structures each capable of carrying three cable connections. In each of FIGS. 61 and 62, a cylindrical flotation chamber 5826 carries around its circumference three regularly spaced projections 5834. However, in FIGS. 61 and 62 the projections 5834 are not directly connected to cables but instead to reinforcing structures. More specifically, in FIG. 61, each adjacent pair of projections 5834 are interconnected by a substantially U-shaped reinforcing structure 5836. The outer sections of the three reinforcing structures 5836 carry double, triple and quadruple cable connections 5816B, 5816C and 5816D respectively. In FIG. 62, on the other hand, the projections 5834 are secured to the mid-points of the three sections of a triangular reinforcing structure 5838, with these three sections carrying double, triple and quadruple cable connections 5816B, 5816C and 5816D respectively.

The present invention also provides further developments of the apparatus and methods described above for deploying VFF and TLP units, and for assembling such units into assemblies of the present invention. As already described, these methods involve transporting the units to the deployment site in a horizontal position, raising the units to a vertical position, lowering the units into the water, and thereafter assembling them into assemblies of the present invention. Although the methods described above can operate satisfactorily, they are attended by a number of problems. Some wind turbine models are not designed to be transported in a vertical position (i.e., with the axis of the wind turbine vertical, as opposed to the horizontal position in which this axis is disposed during operation), and turbine makers are generally reluctant to modify their turbines to make them transportable in a vertical position. The methods described below have the advantage that the tower structure and the turbine are all fixed to a rigid deployment structure, which makes the installation process substantially less weather-sensitive compared to a conventional offshore wind turbine installation that relies on heavy-duty crane operation at the oceanic deployment site.

The present invention can overcome or reduce the aforementioned problems. Preferred forms of the deployment apparatus allow transport of the nacelle in a nacelle holder that allows the nacelle to remain in a horizontal position throughout its transportation and installation process. As illustrated below, in the preferred apparatus two blades (of a typical three-blade rotor) are attached to the nacelle onshore, and they are fixed at (say) 30° upwardly from the horizontal position, pointing to 2 o'clock and 10 o'clock during transportation. The third blade is held by a blade holder right near its final 6 o'clock position, parallel to the mast. The remainder of the tower structure lies horizontally during transportation as in the original deployment method. After the tower structure has been raised to a vertical position at the installation site, the nacelle and the third blade are attached to the tower structure by adjusting the nacelle holder and the blade holder to precise positions. The positions of the nacelle holder and the blade holder are set onshore to allow a simple one-dimensional installation step, and both holders have three-dimensional adjustment capability for fine tuning Once the nacelle and the blade are attached, the rest of the process is the same as in the original deployment method described above.

Figure 63:
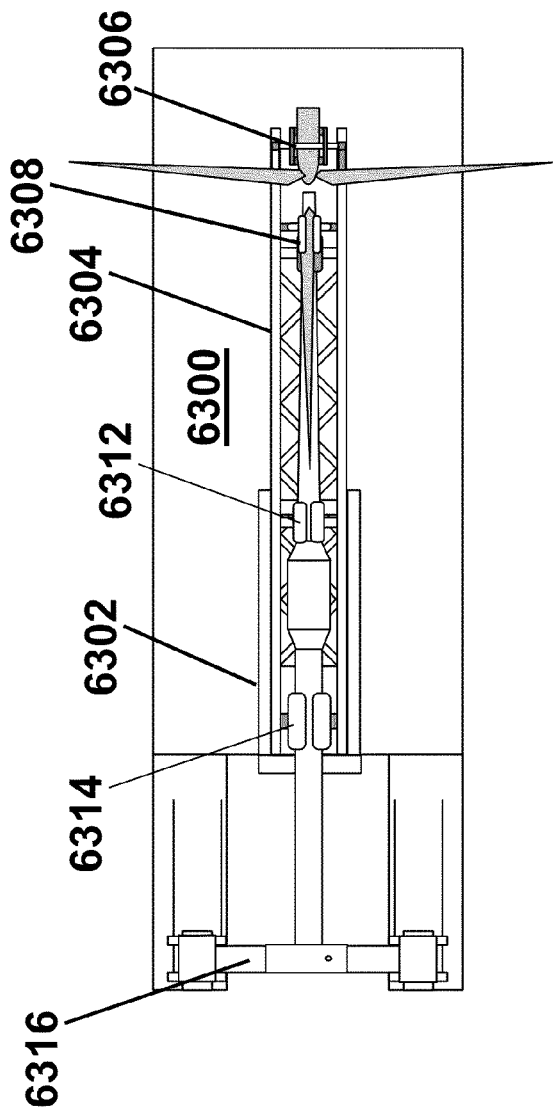
FIG. 63 is a top plan view of a deployment apparatus of the present invention.
Figure 64:
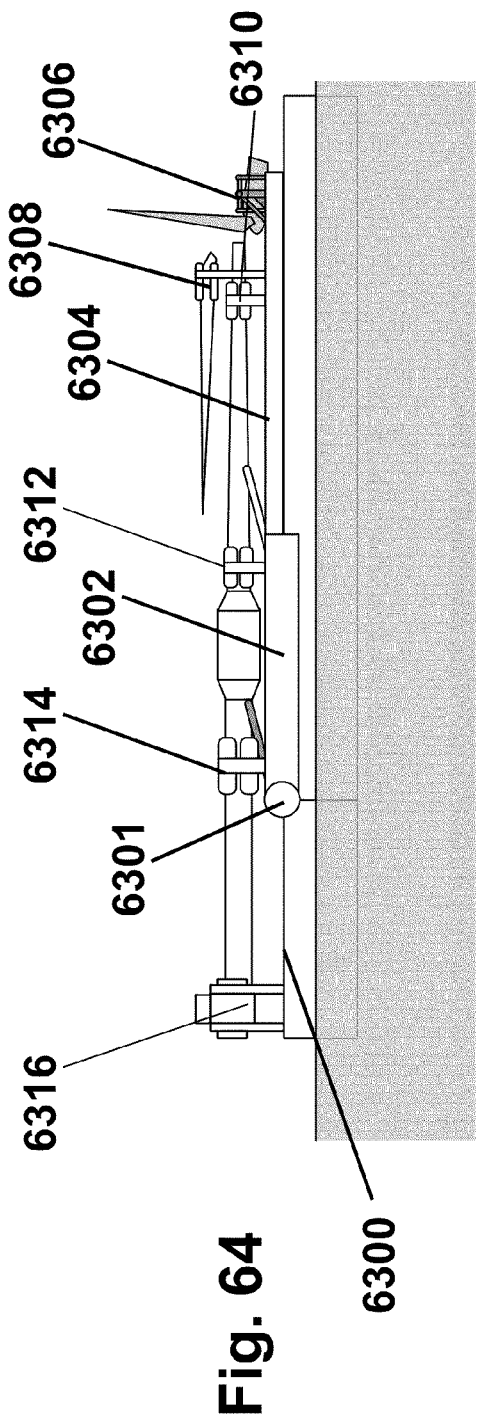
FIG. 64 is a side elevation of the deployment apparatus shown in FIG. 63.

FIG. 63 is a top plan view and FIG. 64 is a side elevation (looking from below in FIG. 63) of a preferred deployment apparatus of the present invention which is shown installed on the flat deck 6300 of a barge or other vessel. For a floating unit having a height of 65 m to the wind turbine hub, the draft of the floating unit would generally be in the range of 40 m to 100 m. A deployment apparatus capable of handling this size of floating unit would typically have a length of 100 to 120 m including the sliding structure section (described below). The weight of the deployment apparatus of this size would be several hundred tons not including the tower base support section (described below). The deployment apparatus comprises a pivotable section 6302 which is pivotally mounted on the deck 6300 by means of a pivot member 6301, and an elongate sliding section 6304, which is slidably mounted on the pivotable section 6302. Mounted on the sliding section 6304 are a nacelle holder 6306, a blade holder 6308, upper and lower mast clamps 6310 and 6312 respectively, a floatation section clamp 6314 and a tower base support section 6316.

FIG. 65A is a top plan view of the portion of the sliding section 6304 carrying the nacelle holder 6306 and the blade holder 6308, while FIG. 65B is a side elevation of the same portion looking from below in FIG. 65A, and FIG. 65C is an end elevation looking from the right in FIG. 65A. As best seen in FIG. 65B, the nacelle holder has the form of a cage pivotally mounted on a cross-member 6318, which is itself supported parallel to the deck 6300 by support members 6320 capable of sliding on rails along the sliding section 6304; the entire nacelle holder can be moved horizontally relative to the sliding section 6304 by hydraulic cylinders 6319. Also, as best seen in FIG. 65C, the blade holder 6308 comprises two vertical support members 6322, the upper portions of which incline inwardly toward each other and each of which bears two clamp members 6324, which hold the third blade, as illustrated in FIGS. 63 and 64. The clamp members 6324 are moveable outwardly, by means of a hydraulic cylinder 6326 to enable the blade to be inserted between them. Furthermore, the entire blade holder 6308 can be slid relative to the sliding section 6304 by means of a hydraulic cylinder 6328 (FIG. 65A).

Figure 66F:
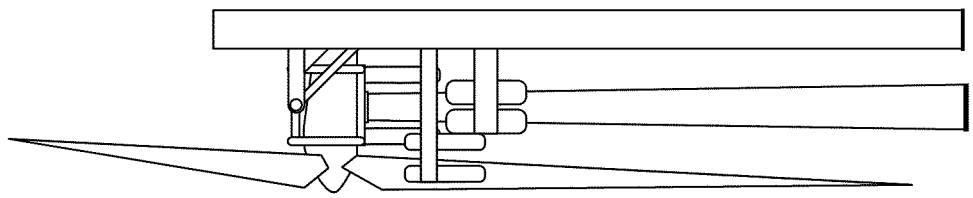
Figure 66E:
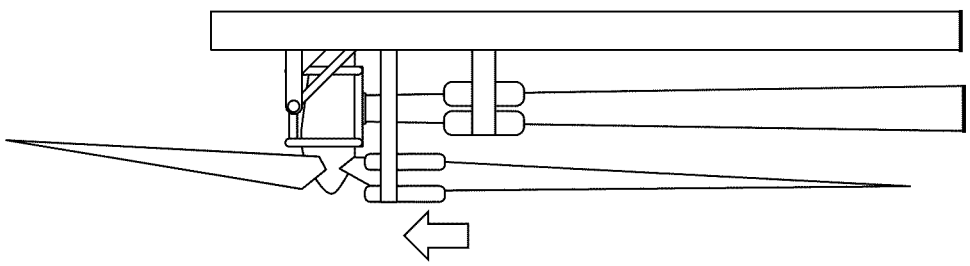
Figure 66D:
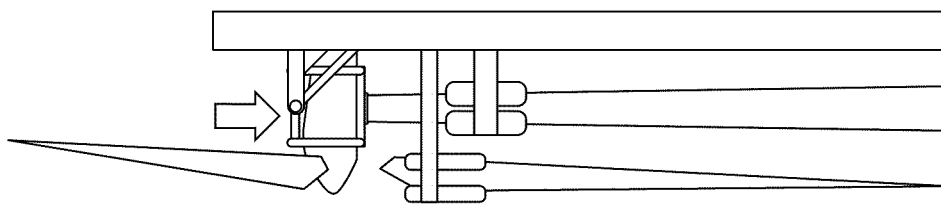

FIGS. 66A-66F illustrate the manner in which a VFF or TLP unit mounted on the deployment apparatus shown in FIGS. 63-65 is deployed on site. As illustrated in FIGS. 66A-66C, the slidable section 6304 is first slid relative to the pivotable section 6302 (the slidable section 6304 moves to the left as illustrated in FIG. 64) to that part of the slidable section which extends beyond the edge of the deck 6300. It will be appreciated that, in order to rotate the unit and the pivotable and slidable sections 6302 and 6304 upwardly as illustrated in FIGS. 66A-66G, it is highly desirable to place the center of gravity of the combined unit and support structure close to the pivot member 6301, and thus necessarily close to the edge of the deck 6300. However, it is typically not desirable to transport the VFF or TLP unit in this position since it is likely to render the barge or other vessel carrying the unit unstable in rough seas. The provision of the slidable section 6304 enables the VFF or TLP unit to be transported in a more stable position on the vessel and then moved to the most favorable position for deployment when the deployment site is reached. The slidable section 6304 holds all parts of the VFF or TLP unit, including all clamps, support beams, the nacelle holder the blade holder, and the whole slidable section 6304 is mounted on the pivotable section 4632 so that the entire structure can be raised to a vertical position at the deployment site.

In more detail, as shown in FIGS. 66A-66F, once the slidable section 6304 has been slid to proper position for deployment relative to the deck 6300 (FIG. 66A), the pivotable section 6302 and the slidable section 6304 mounted there are rotated upwardly, as indicated by the arrows. During this upward rotation, the nacelle section 6306 rotates about the cross-member 6318 so as to keep the axis of the nacelle horizontal, so that when the pivotable section 6302 reaches its vertical position (FIG. 66C), the nacelle is in the ideal position for attachment to the mast of the VFF or TLP unit.

In the next step of the deployment process (FIG. 66D), the nacelle holder 6606 is moved downwardly relative to the mast and the nacelle (and the two blades attached thereto) is secured to the mast. Thereafter (FIG. 66E), the blade holder 6308 is moved upwardly relative to the mast and the third blade is fixed to the nacelle. Finally (FIG. 66F), the nacelle holder and the blade holder open and are retracted horizontally toward the mast. The completed unit is now ready for deployment in the manner described above.

Figure 67A:
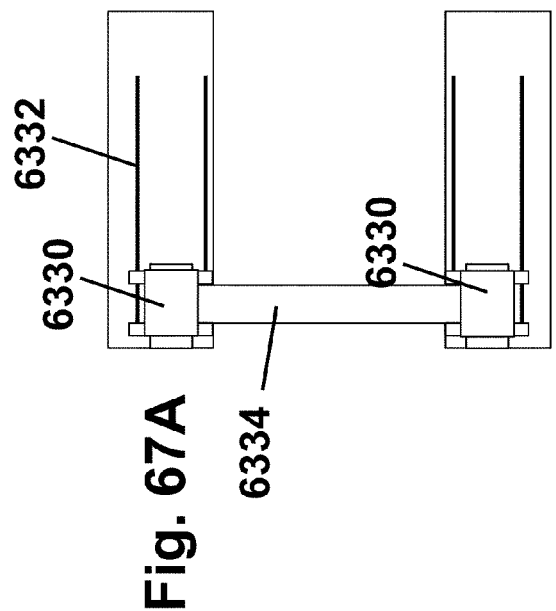
FIG. 67A is an enlarged top plan view of the tower base support section of the deployment apparatus shown in FIGS. 63 and 64.
Figure 67B:
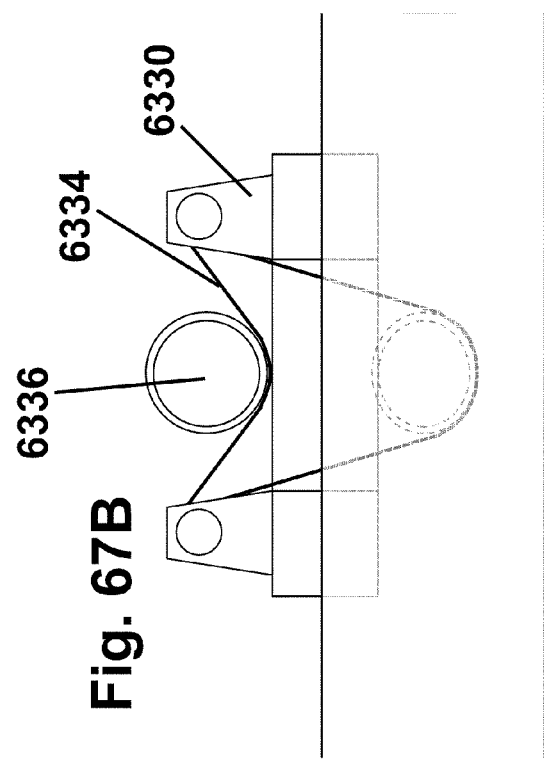
FIG. 67B is an end elevation looking from the left in FIG. 67A.

FIG. 67A is an enlarged top plan view of the tower base support section 6316 shown in FIG. 63, while FIG. 67B is an end elevation looking from the left in FIG. 67A. As shown in FIGS. 67A and 67B, the support section 6316 comprises two winches 6330 movable on rails 6332. A very heavy duty support belt 6334 (a plurality of cables could be substituted for this belt) extends between the winches 6330 and supports weighted base 6336 of the VFF unit.

The weighted base 6336 is often a counterweight section that can comprise 50% of the entire VFF unit weight. Unless appropriate arrangements are made to support such a heavy counterweight section during the transport and installation of the unit, large and possibly damaging loads may be placed upon the unit, especially the lower part of the mast. To avoid these problems, the base 6336 is supported by ultra-heavy-duty belt 6334, which is supported by the winches 6330 on each side of the unit. The position of the winches can be adjusted to parallel direction to the mast by rails. When the mast is raised prior to deployment, as illustrated in FIGS. 66A-66F, the winches 6330 unreel the belt 6334 to lower the weighted base 6336, and the positions of the winches can be adjusted along the rails. This eliminates unnecessary load on the horizontally disposed mast, especially on its lower section, and provides an additional control mechanism during the mast raising process.

Figure 68A:
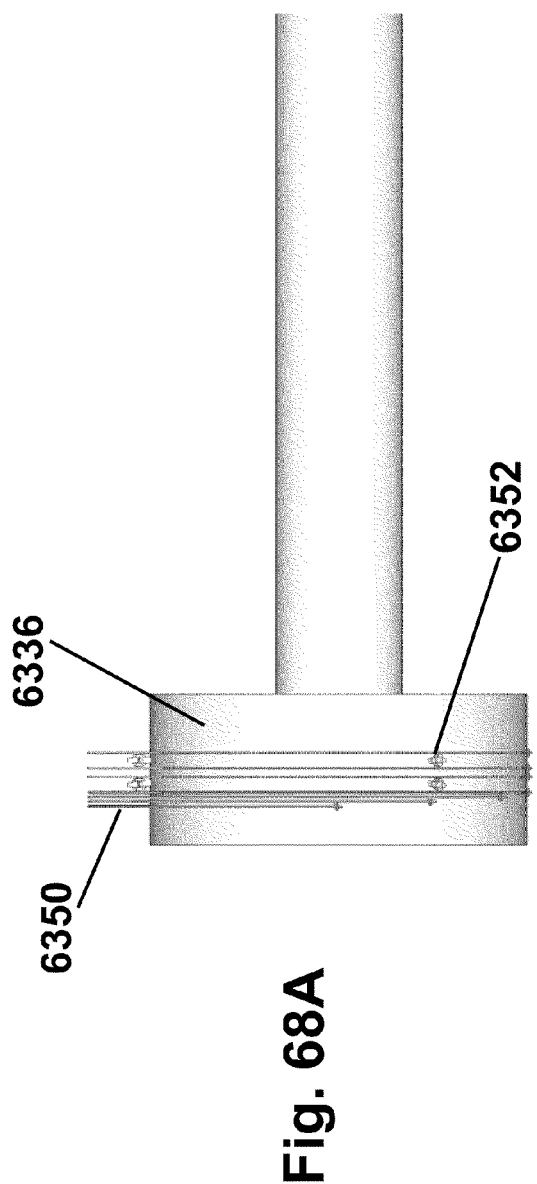
FIG. 68A is a side elevation of a weighted base of a floating unit supported in a first modified form of the deployment apparatus shown in FIGS. 67A and 67B.
Figure 68B:
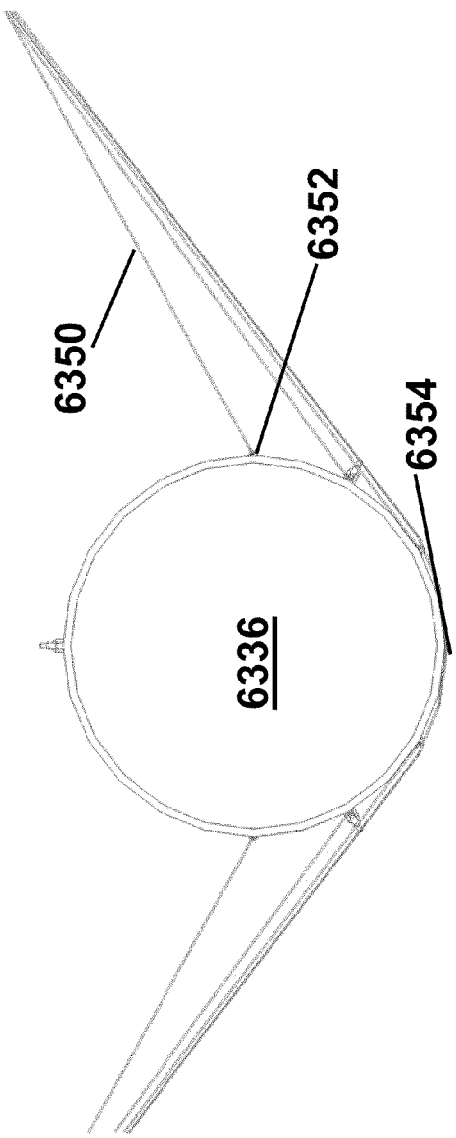
FIG. 68B is an end elevation of weighted base shown in FIG. 68A looking from the left in that Figure.
Figure 68C:
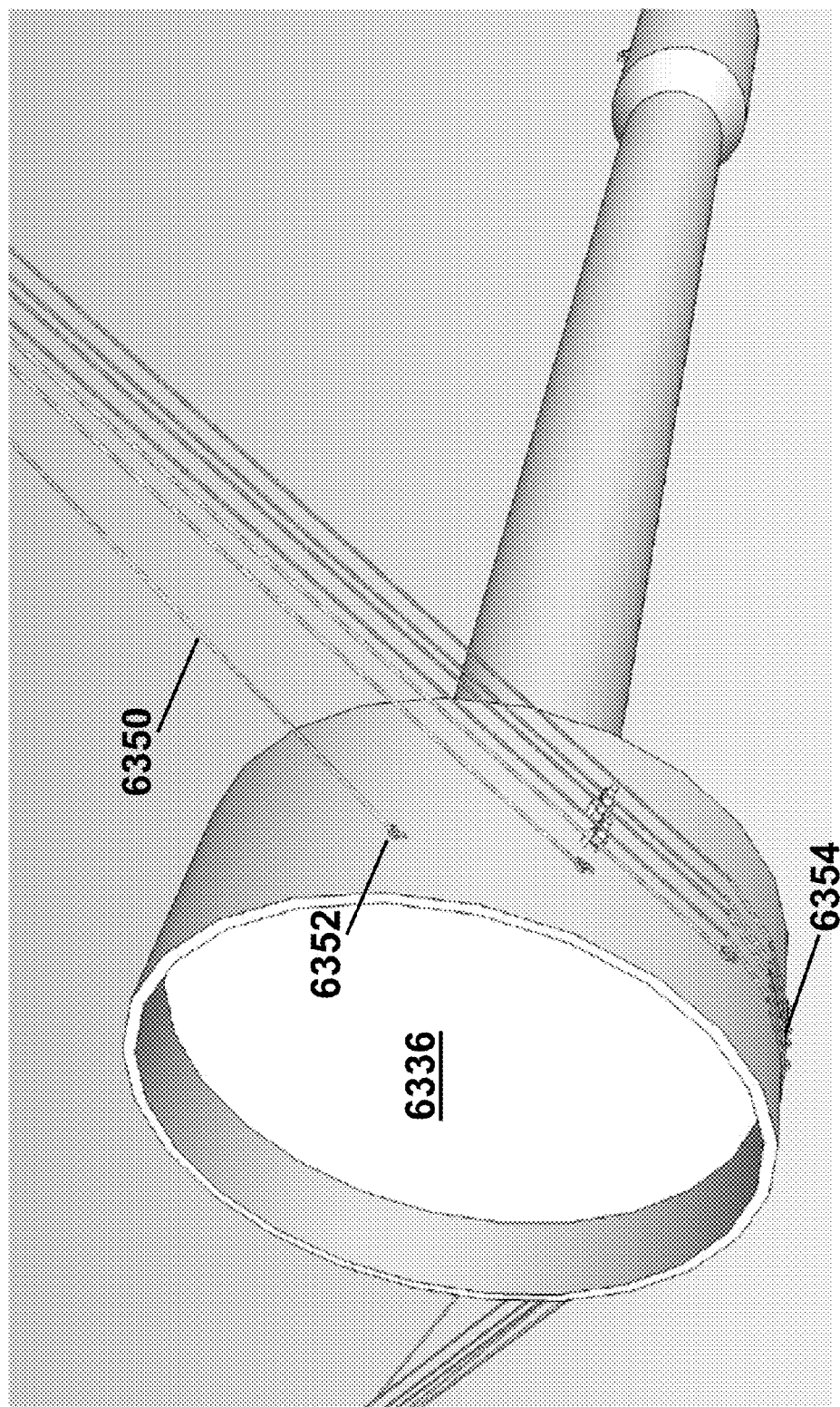
FIG. 68C is a three-quarter view of the weighted base shown in FIGS. 68A and 68B looking from a direction similar to that FIG. 68B but displaced downwardly and to one side.

FIGS. 68A-68C show a weighted base 6336 being supported in a modified form of the support section 6316 shown in FIGS. 67A and 67B. In FIGS. 68A-68C, the belt 6334 shown in FIGS. 67A and 67B is replaced by a plurality of cables 6350; the winches 6330 shown in FIGS. 67A and 67B are retained substantially unchanged in the modified apparatus shown in FIGS. 68A-68C but are not shown in those Figures. As best seen in FIG. 68C, some of the cables 6350 terminate in eyelets 6352 arranged at various points on the cylindrical surface of the base 6336. The remainder of the cables 6350 pass through a row of eyelets 6354 disposed on the lowest portion of the base 6336. All the eyelets 6352 and 6354 are equipped with remotely controlled quick release mechanisms, which permit the cables 6350 to be detached from the base 6336 when the buoy has been lowered a sufficient depth into the water to become buoyant.

Figure 69C:
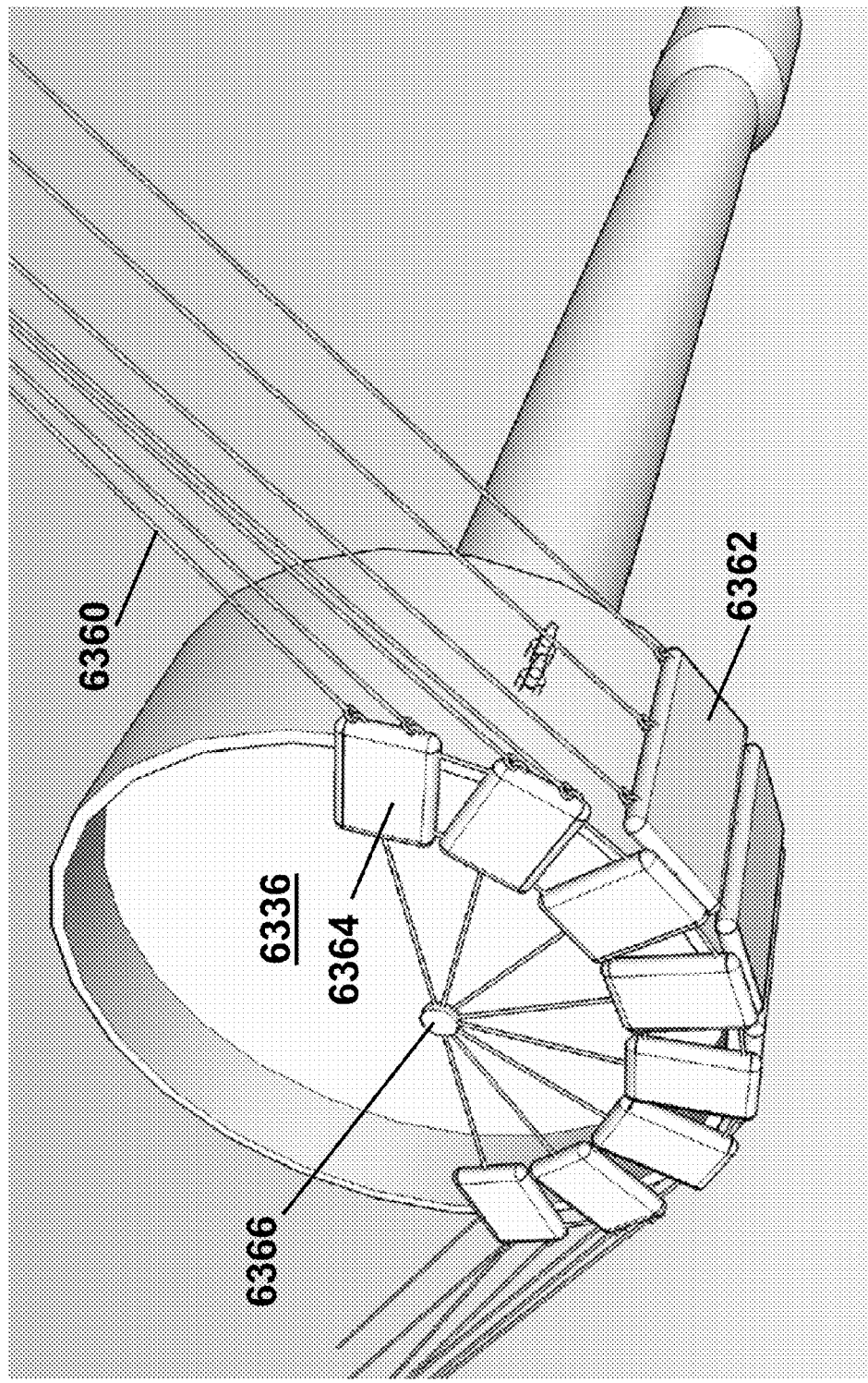

FIGS. 69A-69C show views similar to those of FIGS. 68A-68C respectively of a weighted base 6336 in a second modified form of the deployment apparatus. In FIGS. 69A-

69C, the belt 6334 shown in FIGS. 67A and 67B is again replaced by a plurality of cables, designated 6360. However, unlike the cables 6350 shown in FIGS. 68A-68C, the cables 6360 shown in FIGS. 69A-69C are not directly attached to the base 6336; instead, some of the cables 6360 are attached to an interconnected series of side plates 6362 which extend below the lower end of the base 6336, while the remainder of the cables 6360 are attached to a series of end plates 6364 which abut the end surface of the base 6336, the various end plates 6364 being connected to each other by a hub-and-spoke arrangement 6366. As will readily be seen from FIGS. 69A-69C, the plates 6362 and 6364, and the hub-and-spoke arrangement 6366 together form a "basket", with the adjacent end plates and side plates, and this basket holds the base 6336 in a manner generally similar to the belt 6334 shown in FIGS. 67A and 67B. For obvious reasons, the method of deploying a floating unit using the basket shown in FIGS. 69A-69C is very similar to that using the belt 6334 shown in FIGS. 67A and 67B, and hence need not be described in detail.

It will readily be apparent to those skilled in the art that numerous changes and modifications can be made to the preferred embodiments of the invention described above without departing from the scope of the invention. In particular, the type of floating units described herein are highly scaleable without substantial modification of the design, and accordingly the preferred dimensions, weights and power outputs mentioned above can vary widely depending upon the particular power output desired. Therefore, it is intended that the embodiments described herein be considered as illustrative and not be construed in a limiting sense.

The invention claimed is:

1. A process for placing a floating unit in water, the floating unit comprising a mast which, when floating, extends from above to below the water surface, the process comprising:

providing a vessel having a deck having an edge, a pivotable unit rotatably mounted at a fixed location on the deck adjacent said edge for rotation about a horizontal axis, and a slidable unit slideably mounted on the pivotable unit comprising a base member and two clamping members mounted on the base member and spaced apart from the each other;

clamping the mast with the clamping members, thereby holding the mast in a substantially horizontal position above the deck;

transporting the vessel and mast to a location where the floating unit is to be deployed;

sliding the slidable unit relative to the pivotable unit towards one end of the vessel from which the mast is to be deployed, thereby causing the slidable unit to approach said one end of the vessel;

pivoting the pivotable unit and mast until the mast is in a substantially vertical position; and releasing the mast from the clamping members, thereby allowing the floating unit to float;

wherein the floating unit further comprises a nacelle section having a nacelle axis, the nacelle section having a plurality of blades mounted for rotation about said nacelle axis, which is horizontal when the mast is in a substantially vertical position, and wherein the slidable unit further comprises a nacelle holder arranged to hold the nacelle section with said nacelle axis substantially horizontal while the mast is held in a substantially horizontal position above the deck.

2. A process according to claim 1 wherein the nacelle section is rotatably mounted on the sliding section so that said nacelle axis remains substantially horizontal as the pivotable unit raises the mast from its substantially horizontal position to its substantially vertical position.

3. A process according to claim 1 wherein the pivotable unit comprises at least one support beam pivotally attached to the base member and capable of pivoting between a first position, in which the support beam lies flat against the base member, and a second position, in which the support beam extends substantially perpendicular to the base member.

4. A process according to claim 1 wherein the slidable unit is arranged to vary the distance between the two clamping members.

5. A process according to claim 1 further comprising securing an external floatation device to the floating unit on the deck of the vessel.

6. A process according to claim 1 wherein the pivotable unit is arranged to vary the height, relative to the deck of the vessel, of the axis around which the pivotable unit pivots.

7. A process according to claim 1 wherein the base member is movable relative to the axis around which the pivotable unit pivots so that the clamping members can move vertically during deployment of a floating unit.

8. A process according to claim 1 wherein, during transport of the vessel, the nacelle section is held in the nacelle holder with less than all its blades attached, and the sliding section further comprises a blade holder for holding the blades not attached to the nacelle section.

9. A process according to claim 8 wherein the blade holder is movable relative to the nacelle holder.

* * * * *